United States Patent
Ha et al.

(10) Patent No.: US 12,406,388 B2
(45) Date of Patent: Sep. 2, 2025

(54) HOME APPLIANCE HAVING INTERIOR SPACE FOR ACCOMMODATING TRAY AT VARIOUS HEIGHTS AND METHOD OF OBTAINING IMAGE BY HOME APPLIANCE

(71) Applicant: SAMSUNG ELECTRONICS CO., LTD., Suwon-si (KR)

(72) Inventors: Jihyung Ha, Suwon-si (KR); Jueon Kim, Suwon-si (KR); Sangyong Lee, Suwon-si (KR); Kyungah Chang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 85 days.

(21) Appl. No.: 17/987,198

(22) Filed: Nov. 15, 2022

(65) Prior Publication Data
US 2023/0154029 A1 May 18, 2023

Related U.S. Application Data

(63) Continuation of application No. PCT/KR2022/017287, filed on Nov. 4, 2022.

(30) Foreign Application Priority Data

Nov. 18, 2021 (KR) .......................... 10-2021-0159779

(51) Int. Cl.
*G06T 7/60* (2017.01)
*G01G 19/52* (2006.01)
(Continued)

(52) U.S. Cl.
CPC .................. *G06T 7/60* (2013.01); *G06T 7/13* (2017.01); *G06V 20/68* (2022.01); *H04N 23/71* (2023.01);
(Continued)

(58) Field of Classification Search
None
See application file for complete search history.

(56) References Cited

U.S. PATENT DOCUMENTS

| | | |
|---|---|---|
| 10,398,260 B2 | 9/2019 | Park et al. |
| 10,612,789 B2 | 4/2020 | Park et al. |

(Continued)

FOREIGN PATENT DOCUMENTS

| | | | | |
|---|---|---|---|---|
| DE | 102013110642 A1 | * | 3/2015 | ............. F24C 7/085 |
| DE | 102014210673 A1 | * | 12/2015 | ............. F24C 7/085 |

(Continued)

OTHER PUBLICATIONS

Thampi SM, Gelbukh A, Mukhopadhyay J, editors. Advances in signal processing and intelligent recognition systems. Springer Science & Business Media; Feb. 14, 2014. (Year: 2014).*

(Continued)

*Primary Examiner* — Clifford Hilaire
(74) *Attorney, Agent, or Firm* — STAAS & HALSEY LLP

(57) ABSTRACT

A home appliance includes: a camera arranged in the interior space; and at least one processor, wherein the at least one processor is configured to: obtain, through the camera, a first image including a tray that is inserted into the interior space; identify, by using the first image, a height at which the tray is inserted in the interior space; determine, according to the height at which the tray is inserted, a setting value related to capturing of an image of the interior space; and obtain, based on the determined setting value, a second image including contents placed on the tray.

20 Claims, 31 Drawing Sheets

(51) Int. Cl.
*G06T 7/13* (2017.01)
*G06V 20/68* (2022.01)
*H04N 23/71* (2023.01)
*H04N 23/74* (2023.01)

(52) U.S. Cl.
CPC ............ *H04N 23/74* (2023.01); *G01G 19/52* (2013.01); *G06T 2200/24* (2013.01); *G06T 2207/10048* (2013.01); *G06T 2207/30204* (2013.01)

(56) References Cited

U.S. PATENT DOCUMENTS

| | | | |
|---|---|---|---|
| 10,760,794 | B2 | 9/2020 | Cheng |
| 10,805,523 | B2* | 10/2020 | Lau ........................ H04N 23/63 |
| 2003/0076518 | A1* | 4/2003 | Miyake .................. H04N 1/387 |
| | | | 358/1.9 |
| 2007/0035628 | A1* | 2/2007 | Kanai .................. H04N 23/611 |
| | | | 348/159 |
| 2015/0170537 | A1* | 6/2015 | Super ...................... A61B 5/162 |
| | | | 434/236 |
| 2016/0138860 | A1 | 5/2016 | Kang et al. |
| 2016/0296055 | A1 | 10/2016 | Schilling |
| 2017/0261213 | A1 | 9/2017 | Park et al. |
| 2018/0187899 | A1* | 7/2018 | Matarazzi ................. F24C 7/08 |
| 2018/0324908 | A1 | 11/2018 | Denker et al. |
| 2020/0039250 | A1* | 2/2020 | Kizaki ...................... G01J 3/52 |
| 2020/0253415 | A1* | 8/2020 | Stork genannt Wersborg ............ H05B 6/6447 |
| 2020/0297159 | A1 | 9/2020 | Waitz et al. |
| 2021/0068582 | A1 | 3/2021 | Jung et al. |
| 2021/0231311 | A1 | 7/2021 | Ye et al. |
| 2022/0104654 | A1* | 4/2022 | Wild ...................... H04N 7/188 |

FOREIGN PATENT DOCUMENTS

| | | |
|---|---|---|
| EP | 3 882 520 A1 | 9/2021 |
| JP | 5-302726 | 11/1993 |
| JP | 2019-184140 | 10/2019 |
| KR | 95-33281 | 12/1995 |
| KR | 1997-0016312 | 4/1997 |
| KR | 10-0195466 | 6/1999 |
| KR | 10-0233442 | 1/2000 |
| KR | 10-2009-0095205 | 9/2009 |
| KR | 10-2017-0004523 | 1/2017 |
| KR | 10-2017-0106143 | 9/2017 |
| KR | 10-1775830 | 9/2017 |
| KR | 10-2019-0038184 | 4/2019 |
| KR | 11-2124291 | 6/2020 |
| KR | 10-2242648 | 4/2021 |
| KR | 10-2279259 | 7/2021 |
| KR | 10-2021-0095419 | 8/2021 |
| KR | 10-2022-0011450 | 1/2022 |
| KR | 10-2022-0098482 | 7/2022 |
| KR | 10-2417850 | 7/2022 |
| KR | 10-2022-0112419 | 8/2022 |
| KR | 10-2022-0147826 | 11/2022 |
| WO | WO 2012/062890 A2 | 5/2012 |

OTHER PUBLICATIONS

PCT/ISA/220; PCT/ISA/210; PCT/ISA/237 dated Feb. 16, 2023 in International Patent Application No. PCT/KR2022/017287 (9 pages).
Extended European Search Report dated Oct. 8, 2024 for European Application No. 22895932.6.

* cited by examiner

FIG. 6
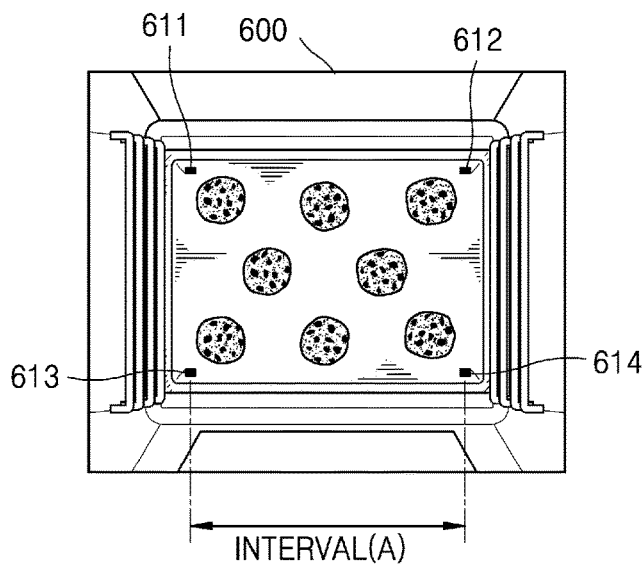
| TRAY | AREA | RATIO |
|---|---|---|
| FIRST LEVEL | 10~12 | 1 |
| SECOND LEVEL | 14~18 | 1.2 |
| THIRD LEVEL | 20~25 | 1.3 |
| FOURTH LEVEL | 28~ | 1.4 |
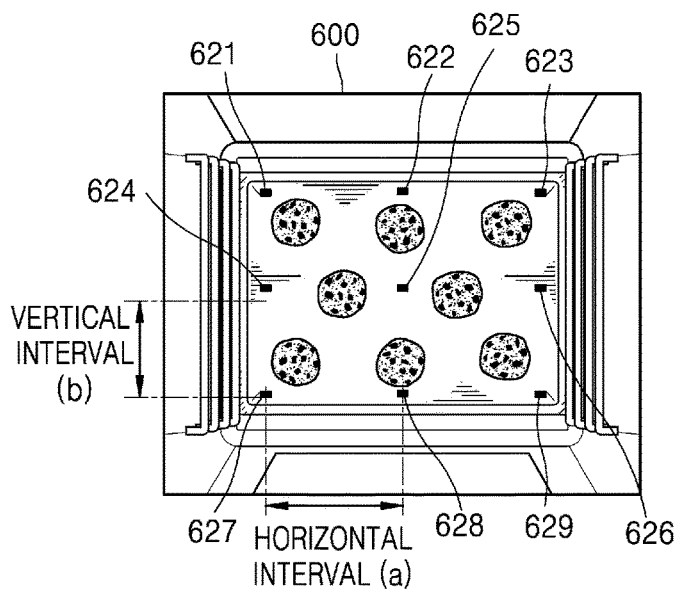
| TRAY | HORIZONTAL INTERVAL | VERTICAL INTERVAL | RATIO |
|---|---|---|---|
| FIRST LEVEL | 5~6 | 3~4 | 1 |
| SECOND LEVEL | 7~9 | 5~7 | 1.2 |
| THIRD LEVEL | 10~13 | 8~10 | 1.3 |
| FOURTH LEVEL | 14~ | 11~ | 1.4 |

FIRST IMAGE picture height distortion
with barrel shape (negative)
1411 picture height distortion
with pincushion shape (positive)
1412

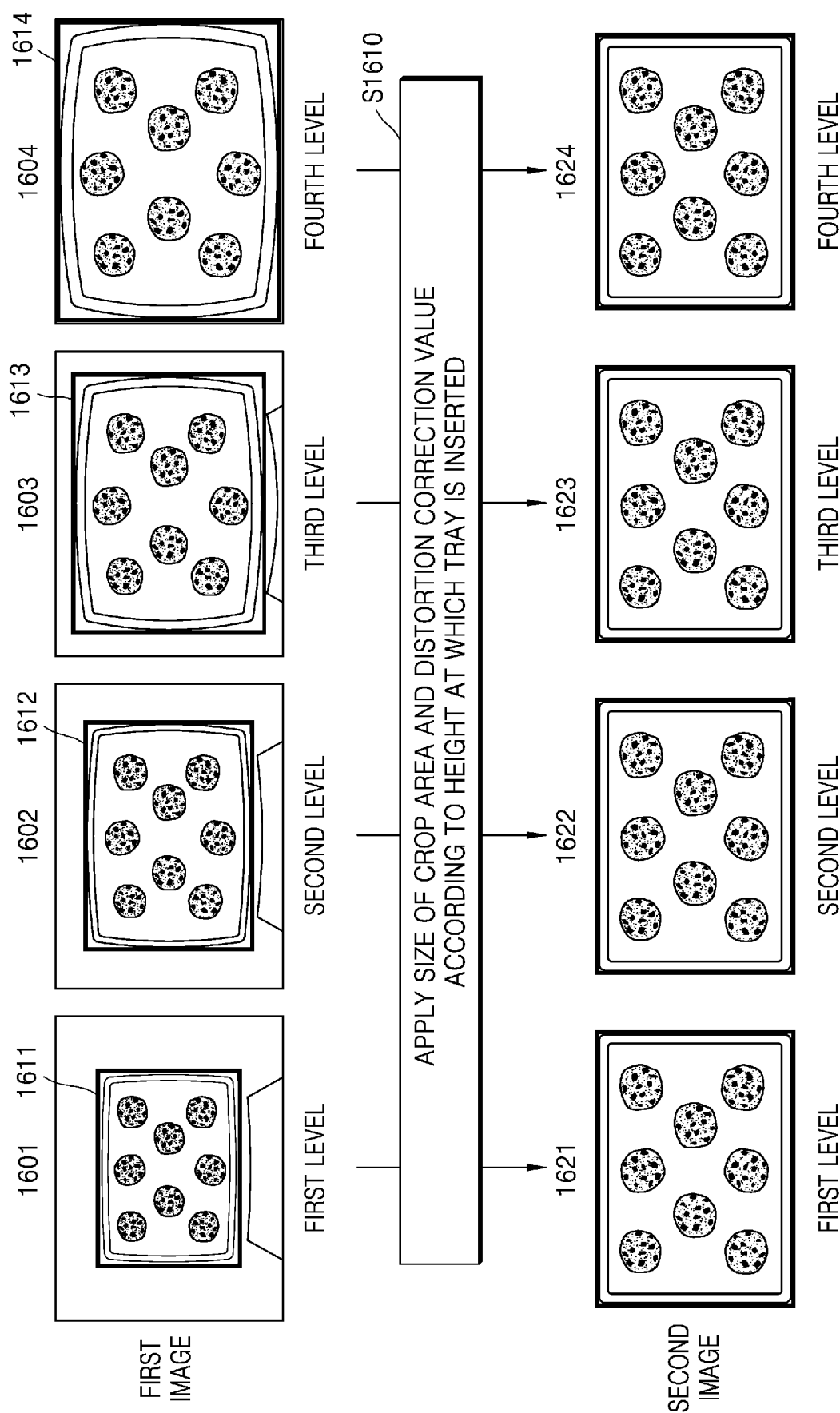

FIG. 25
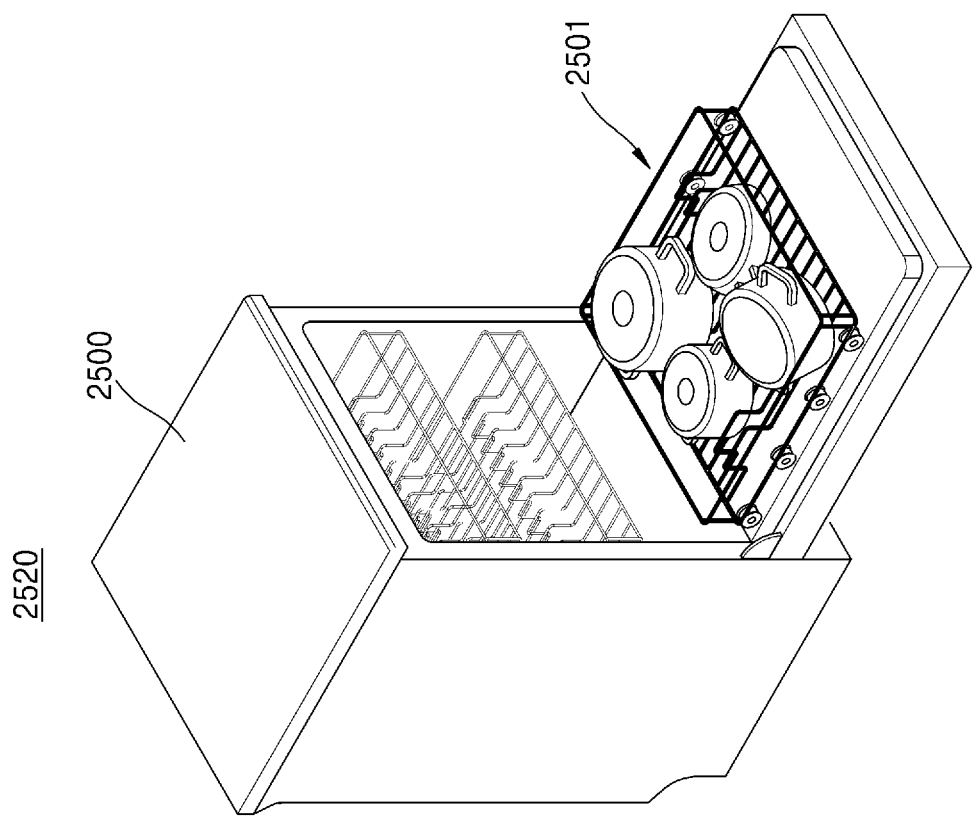
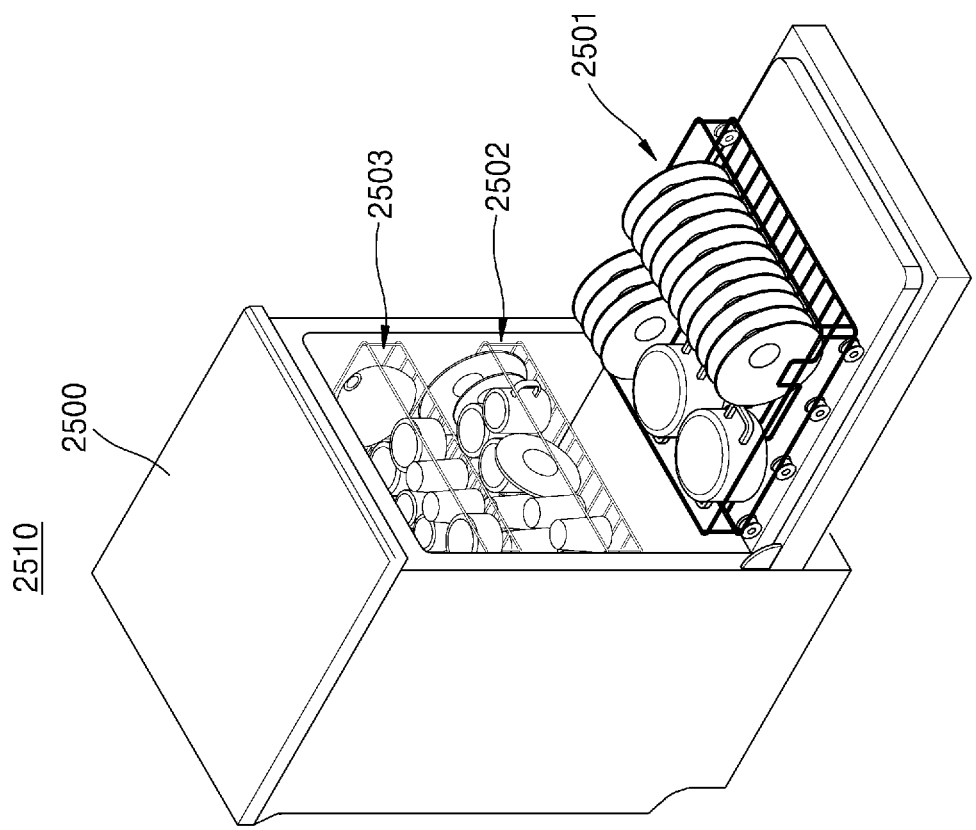

HOME APPLIANCE HAVING INTERIOR SPACE FOR ACCOMMODATING TRAY AT VARIOUS HEIGHTS AND METHOD OF OBTAINING IMAGE BY HOME APPLIANCE

CROSS-REFERENCE TO RELATED APPLICATION(S)

This application is a continuation application, under 35 U.S.C. § 111(a), of international application No. PCT/KR2022/017287, filed on Nov. 4, 2022, which claims priority to Korean Patent Application No. 10-2021-0159779, filed on Nov. 18, 2021, in the Korean Intellectual Property Office, the disclosure of which is incorporated by reference herein in its entirety.

BACKGROUND

1. Field

The disclosure relates to a home appliance having an interior space in which a tray may be accommodated at various heights, and a method, performed by the home appliance, of obtaining an image of the interior space by considering a height at which the tray is inserted.

2. Description of Related Art

Smart home appliances in which a smart function is added to existing products have been released. A smart appliance refers to a home appliance that may be directly or indirectly controlled and managed via the Internet, and may be referred to as a connected home appliance. Smart home appliances, in which products, such as televisions, refrigerators, washing machines, dryers, and ovens as well as air purifiers, coffee makers, and lighting devices, are connected to the Internet, may provide various functions that are more convenient, compared to stand-alone products, and be connected and fused together to constitute a smart home.

In addition, a smart home appliance may also perform object recognition and provide a smart service based on a result of the object recognition. In object recognition, that is, representative technology of intelligent image processing (Vision artificial intelligence (AI)), an object in an image or a video may be identified, and a result value (recognition, classification, and position of the object) thereof may be calculated through an algorithm, such as deep learning and machine learning. For example, a refrigerator may provide a service of recommending a meal suitable for ingredients stored in the refrigerator. In addition, in order for a smart appliance to provide a smart service based on object recognition, it may be necessary to improve an object recognition rate thereof.

SUMMARY

According to an embodiment of the disclosure, a home appliance comprising a camera arranged in an interior space of the home appliance to receive a tray at different heights, and at least one processor configured to obtain, through the camera, a first image including the tray while the tray is received in the interior space, to identify, by using the first image, a height at which the tray is received in the interior space among the different heights of the interior space, to determine, according to the height at which the tray is received, a setting value for adjusting the camera as identified from the first image, and to obtain, based on the determined setting value, a second image including items on the tray.

According to an embodiment of the disclosure, a method of obtaining an image of an interior space of a home appliance, the method comprising obtaining, through a camera arranged in the interior space of the home appliance, a first image including a tray while the tray is received in the interior space, identifying, by using the first image, a height at which the tray is received in the interior space, determining, according to the height at which the tray is received, a setting value for adjusting the camera as identified from the first image, and obtaining, based on the determined setting value, a second image including items on the tray.

BRIEF DESCRIPTION OF DRAWINGS

The above and other aspects, features, and advantages of certain embodiments of the present disclosure will become apparent from the following description taken in conjunction with the accompanying drawings of which:

FIG. 6 is a diagram for describing an operation of identifying, by a home appliance, a height at which a tray is inserted based on an interval between markers included in the tray, according to an embodiment of the disclosure.

FIG. 16 is a diagram for describing an operation of adjusting the size of a crop area and a distortion correction value according to a height at which a tray is inserted, according to an embodiment of the disclosure.

FIG. 25 is a diagram for describing an operation of determining, by a home appliance, an operation mode thereof according to a type or position of tableware placed on a tray, according to an embodiment of the disclosure.

DETAILED DESCRIPTION

Figure 1:
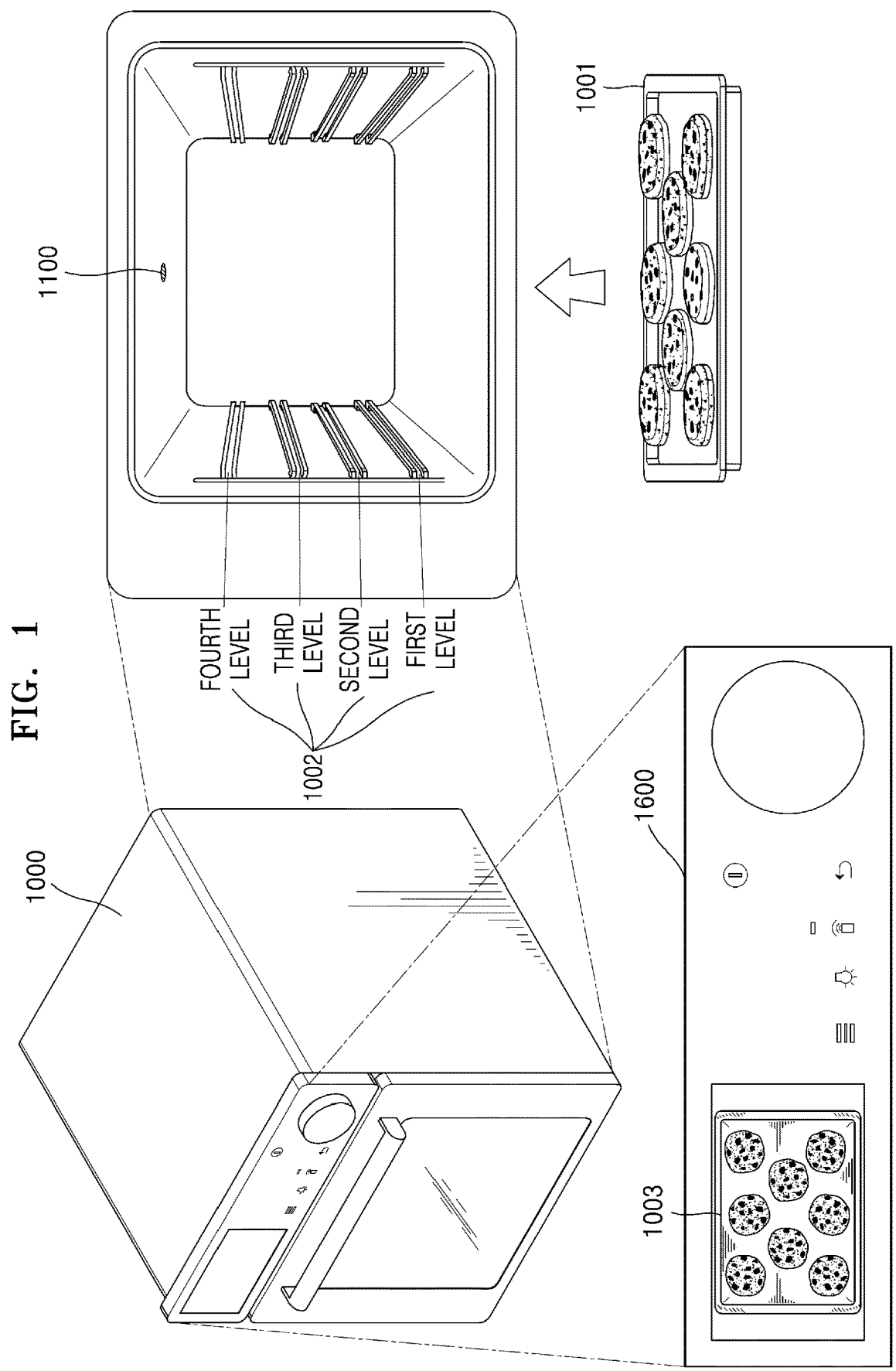
FIG. 1 is a diagram for describing all operations of a home appliance according to an embodiment of the disclosure.

Throughout the disclosure, the expression "at least one of a, b or c" indicates only a, only b, only c, both a and b, both a and c, both b and c, all of a, b, and c, or variations thereof.

Terms used in the disclosure are briefly described, and an embodiment of the disclosure is described in detail.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

When a part "includes" or "comprises" an element, unless there is a particular description contrary thereto, the part may further include other elements, not excluding the other elements. The terms such as "unit", "module", and the like used in the disclosure indicate a unit, which processes at least one function or motion, and the unit and the module may be implemented by hardware or software, or by a combination of hardware and software.

Hereinafter, embodiments of the disclosure will be described in detail with reference to the accompanying drawings such that one of ordinary skill in the art may easily implement the disclosure. However, the disclosure may be implemented in various different forms and is not limited to the embodiments described herein. Also, in the drawings, parts irrelevant to the description are omitted in order to clearly describe the disclosure, and like reference numerals designate like elements throughout the specification.

According to an embodiment of the disclosure, provided is a method of obtaining a monitoring image in a uniform state regardless of a height at which a tray is inserted, by identifying a height at which the tray is inserted and adjusting a setting value (e.g., a lighting brightness value of the interior space, the size of a crop area, and a distortion correction value of a camera) related to capturing of an image according to the height at which the tray is inserted, and a home appliance therefor.

According to an embodiment of the disclosure, provided is a method of providing improved object recognition of contents placed on the tray by obtaining a monitoring image of a uniform state regardless of a height at which the tray is inserted, and a home appliance therefor.

According to an embodiment of the disclosure, provided is a method of providing an appropriate recipe through improved object recognition of contents placed on a tray, and a home appliance therefor.

According to an embodiment of the disclosure, provided is a method of correcting a cooking temperature according to a height at which a tray is inserted or guiding a user to an appropriate cooking temperature, and a home appliance therefor.

FIG. 1 is a diagram for describing all operations of a home appliance according to an embodiment of the disclosure.

A home appliance 1000 according to an embodiment of the disclosure may include an interior space in which a tray 1001 may be accommodated at various heights. For example, the home appliance 1000 may include gas ovens, electric ovens, dishwashers, small refrigerators, etc., but is not limited thereto. For example, a small refrigerator may include cosmetic refrigerators and wine refrigerators (also referred to as wine cellars, caves, cabinet cellars, wine coolers, etc.). When the home appliance 1000 is an oven, an interior space of the oven may be expressed as a cooking chamber, when the home appliance 1000 is a small refrigerator, an interior space of the small refrigerator may be expressed as a storage chamber, and when the home appliance 1000 is a dishwasher, an interior space of the dishwasher may be expressed as a container. In FIG. 1, a case in which the home appliance 1000 is an oven is described as an example.

The tray 1001 may be inserted to the interior space of the home appliance 1000. The tray 1001 may be mounted on shelves 1002 provided at opposite sides of the interior space of the home appliance 1000. The shelves 1002 provided at opposite sides of the interior space may each include guide rails. Moreover, the shelves 1002 may be at different heights in the interior space of the home appliance 1000. For example, a first shelf may be at a first height (first level), a second shelf may be at a second height (second level), a third shelf may be at a third height (third level), and a fourth shelf may be at a fourth height (fourth level). In this case, the first height (first level) may be the lowest, and the fourth height (fourth level) may be the highest. A user may place the tray 1001, on which contents are placed, on one of the first to fourth shelves. When the user places the tray 1001 on the first shelf, a height at which the tray 1001 is inserted (hereinafter, also referred to as "a height of the tray 1001") in the interior space may be the first height (first level). In FIG. 1, the shelves 1002 are installed at four different heights, as an example, but are not limited thereto. For example, the shelves 1002 may be installed at two different heights, three different heights, or five or more different heights.

The tray 1001, on which contents are placed, may include contents, such as food ingredients (meat, vegetables, bread, cookies, etc.), wine, and tableware. However, the disclosure is not limited thereto. When the home appliance 1000 is an oven, the tray 1001 may include a wire rack for roasting meat, a wire rack insert, a baking tray, an extra deep tray, or the like, but is not limited thereto. When the home appliance 1000 is a dishwasher, the tray 1001 may include a dish basket and a cutlery box. When the home appliance 1000 is a small refrigerator, the tray 1001 may include a wine rack, a slidable shelf, a cosmetic basket, or the like.

According to an embodiment of the disclosure, the home appliance 1000 may include a camera 1100 in the interior space of the home appliance 1000. The camera 1100, which monitors the interior space of the home appliance 1000, may capture an image of the interior space. The camera 1100 may capture a still image or a moving image. The camera 1100 may include a wide-angle camera having a view angle at which an image of the interior space may be captured, but is not limited thereto. The camera 1100 may be arranged in the center of the ceiling of the interior space and capture the image of the interior space, but is not limited thereto.

According to an embodiment of the disclosure, the home appliance 1000 may obtain, through the camera 1100, an image of the interior space to which the tray 1001 is inserted and analyze the image of the interior space, so as to identify a height at which the tray 1001 is inserted. For example, when markers are arranged at locations respectively corresponding to the shelves 1002, the home appliance 1000 may identify the height at which the tray 1001 is inserted based on the number of markers in the image of the interior space. In addition, the home appliance 1000 may also identify the height at which the tray 1001 is inserted based on an area of a tray determined by performing edge detection on the image of the interior space. The home appliance 1000 may also identify the height at which the tray 1001 is inserted based on an interval between at least two markers included in the tray 1001, the interval being determined by analyzing the image of the interior space. An operation of identifying, by the home appliance 1000, a height at which the tray 1001 is inserted by analyzing an image of the interior space is described in detail later with reference to FIGS. 5 to 7.

According to another embodiment of the disclosure, the home appliance 1000 may also identify a height at which the tray 1001 is inserted by using at least one sensor in addition to the camera 1100. For example, the home appliance 1000 may identify the height at which the tray 1001 is inserted by using at least one of a depth sensor arranged on the ceiling of the interior space, a weight detection sensor included in the shelves 1002 disposed at different heights, or an infrared sensor included in the shelves 1002 disposed at different heights. An operation of identifying, by the home appliance 1000, a height at which the tray 1001 is inserted by using at least one sensor is described in detail later with reference to FIG. 8.

According to an embodiment of the disclosure, the home appliance 1000 may adjust a setting value related to capturing of an image of the interior space, according to a height at which the tray 1001 is inserted. The setting value related to capturing of an image of the interior space may include at least one of a lamp brightness value of the interior space, the size of a crop area, or a distortion correction value of the camera 1100, but is not limited thereto. In the disclosure, crop may denote an operation of removing the outer portion of an image, and the crop area may denote an area selected without being removed from the image. The crop area may include an area including a central object (e.g., the tray 1001). The distortion correction value of the camera 1100 may be a value for correcting image distortion generated by characteristics of the camera 1100. For example, the home appliance 1000 may reduce the brightness of the interior lighting of the interior space as a height at which the tray 1001 is inserted increases, increase the size of the crop area as the height at which the tray 1001 is inserted increases, and increase a distortion correction value of the camera 1100 as the height at which the tray 1001 is inserted increases. When the setting value related to capturing of an image of the interior space is adjusted according to the height at which the tray 1001 is inserted, the home appliance 1000 may obtain an image (hereinafter, also referred to as "a monitoring image") of a uniform state (e.g., a uniform brightness, uniform size, and uniform shape) with respect to contents placed on the tray 1001, regardless of the height at which the tray 1001 is inserted. An operation of adjusting, by the home appliance 1000, a setting value related to capturing of an image of the interior space, according to a height at which the tray 1001 is inserted is described later with reference to FIGS. 9 to 16.

According to an embodiment of the disclosure, the home appliance 1000 may also perform object recognition on an image obtained by the camera 1100 and identify contents placed on the tray 1001. In this case, because the home appliance 1000 may obtain an image of a uniform state with respect to the contents placed on the tray 1001 regardless of the height at which the tray 1001 is inserted, the object recognition rate of the home appliance 1000 may be improved. In other words, even in a case in which the same ingredient is provided, when an image captured by the camera 1100 varies depending on the height of the tray 1001, deviation in a recognition rate of the ingredient according to the height of the tray 1001 may occur. However, according to an embodiment of the disclosure, because the home appliance 1000 obtains an image of a uniform state, the deviation in the recognition rate of the ingredient according to the height of the tray 1001 may be reduced. According to an embodiment of the disclosure, because the ingredient recognition rate of the home appliance 100 may be improved, the home appliance 1000 may provide sophisticated and customized recipe information according to the ingredient placed on the tray 1001. In addition, the home appliance 1000 may adjust a cooking temperature included in the recipe information according to the height at which the tray 1001 is inserted, or output information guiding to adjust cooking temperature.

According to an embodiment of the disclosure, the home appliance 1000 may include a user interface 1600 that outputs a monitoring image 1003. For example, when a user inserts the tray 1001, on which cookies are placed, into the interior space of the home appliance 1000, the home appliance 1000 may obtain the monitoring image 1003 including the tray 1001 on which the cookies are placed and display, in real time, the monitoring image 1003 on a display included in the user interface 1600. In this case, the user may identify a cooking state of the cookies by identifying the monitoring image 1003.

According to an embodiment of the disclosure, the user may identify the monitoring image 1003 of a uniform state, regardless of a height at which the tray 1001 is inserted. For example, when the user usually inserts the tray 1001 at the first height (first level) to bake cookies, but this time inserts the tray 1001 at the third height (third level), in the monitoring image 1003 displayed on the display, the tray 1001 of the same size and brightness as usual may be identified, without being shown too large or too bright.

Hereinafter, a configuration of the home appliance 1000 that obtains the monitoring image 1003 of a uniform state regardless of a height at which the tray 1001 is inserted is described in greater detail with reference to FIGS. 2 and 3.

Figure 2:
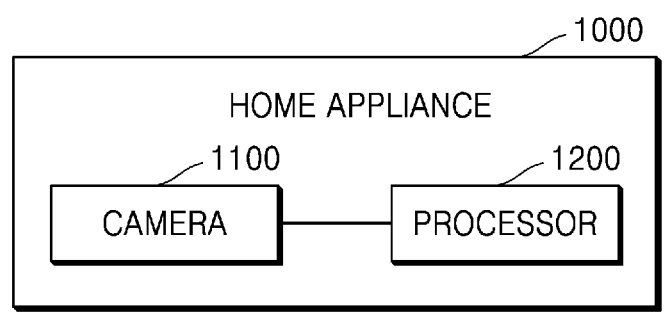
FIG. 2 is a block diagram of a function of a home appliance according to an embodiment of the disclosure.
Figure 3:
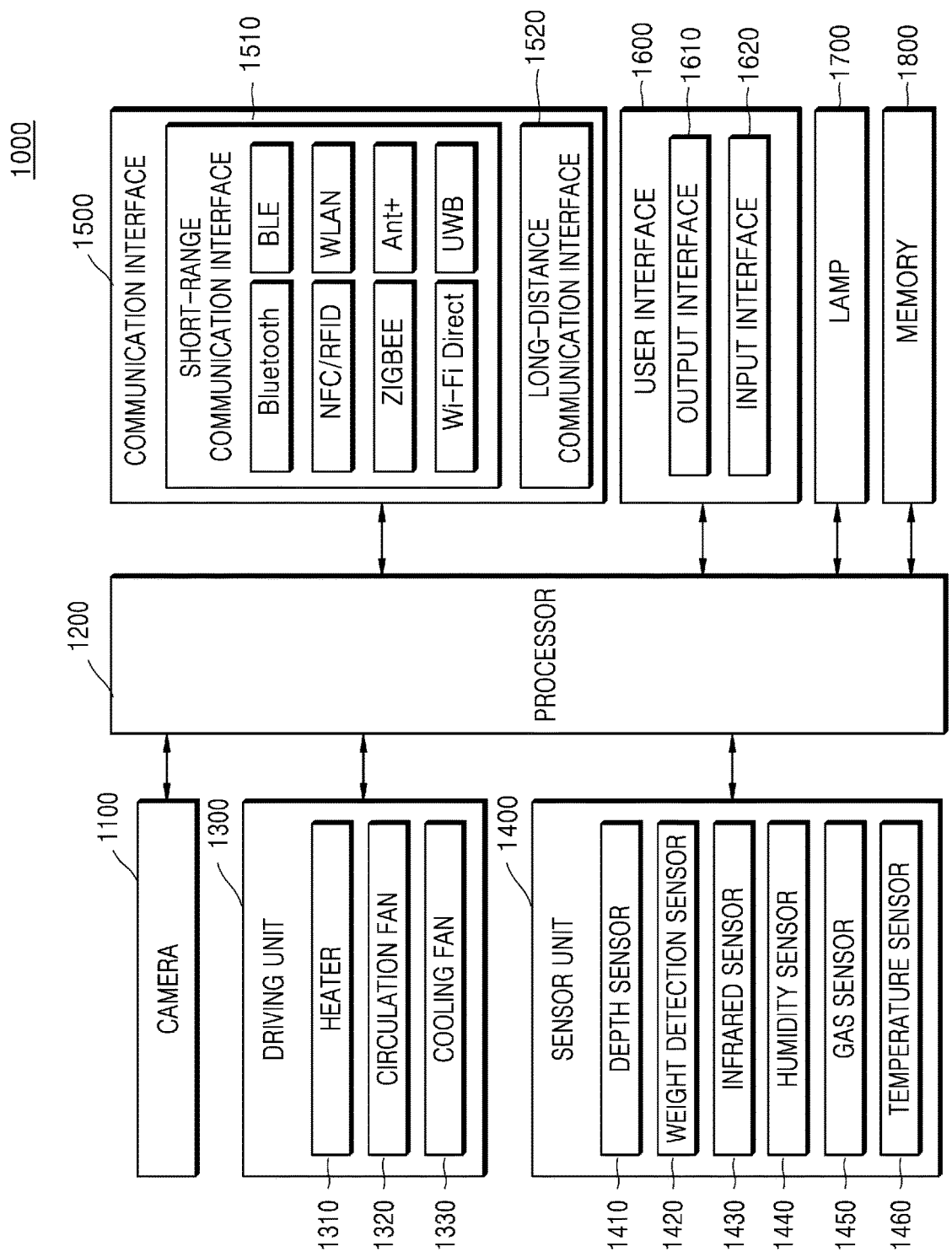
FIG. 3 is a block diagram for describing a function of a home appliance according to an embodiment of the disclosure.

FIGS. 2 and 3 are block diagrams for describing functions of a home appliance according to an embodiment of the disclosure.

As shown in FIG. 2, a home appliance 1000 according to an embodiment of the disclosure may include a camera 1100 and a processor 1200. However, not all of the elements shown are essential. The home appliance 1000 may be implemented by more or less elements than shown. As shown in FIG. 3, the home appliance 1000 according to an embodiment of the disclosure may include, in addition to the camera 1100 and the processor 1200, a driving unit 1300, a sensor unit 1400, a communication interface 1500, a user interface 1600, a lamp 1700, and a memory 1800.

Hereinafter, the above elements are described in order.

The camera 1100 may refer to a device for obtaining at least one frame of an object. Here, the at least one frame may be expressed as an image (a still image or a moving image) or photo.

The camera 1100 may be installed in an interior space of the home appliance 1000. For example, the camera 1100 may be installed in the center or at one side of a ceiling of the home appliance 1000, but is not limited thereto. The camera 1100 may include a wide-angle camera having a viewing angle at which an image of the interior space of the home appliance 1000 may be captured. The camera 1100 may include a micro camera or a pinhole camera. The camera 1100 may have durability to endure high heat and electromagnetic waves, and have a waterproof function. In addition, a coil-heating wire may be wound around the camera 1100 to prevent frost from occurring. According to an implementation, a plurality of cameras 1100 may be installed in the interior space of the home appliance 1000.

The processor 1200 may control all operations of the home appliance 1000. The processor 1200 may execute programs stored in the memory 1800 to control the camera 1100, the driving unit 1300, the sensor unit 1400, the communication interface 1500, the user interface 1600, the lamp 1700, and the memory 1800.

According to an embodiment of the disclosure, the home appliance 1000 may have an artificial intelligence (AI) processor mounted thereon. The AI processor may be manufactured in the form of a AI dedicated hardware chip or as part of a related-art general-purpose processor (e.g., a central processing unit (CPU) or application processor) or graphics-only processor (e.g., a graphics processing unit (GPU), and mounted on the home appliance 1000.

According to an embodiment of the disclosure, the processor 1200 may obtain a first image including a tray 1001 inserted to the interior space of the home appliance 1000 by using the camera 1100, and identify a height at which the tray 1001 is inserted in the interior space by using the first image. In addition, the processor 1000 may also identify the height at which the tray 1001 is inserted based on information obtained from at least one of a depth sensor 1410, a weight detection sensor 1420, or an infrared sensor 1430. An operation of identifying, by the processor 1200, a height at which the tray 1001 is inserted is described below in detail with reference to FIGS. 5 to 8.

According to an embodiment of the disclosure, the processor 1200 may determine a setting value related to capturing an image of the interior space according to the height at which the tray 1001 is inserted, and obtain a second image (hereinafter, also referred to as "a monitoring image") including contents placed on the tray 1001, based on the determined setting value. For example, the processor 1200 may determine a brightness value of lighting in the interior space according to the height at which the tray 1001 is inserted, adjust the brightness of the lamp 1700 arranged in the interior space according to the determined brightness value of the lighting, and then control the camera 1100 to obtain a second image. In addition, the processor 1200 may determine the size of a crop area according to the height at which the tray 1001 is inserted, and crop a portion of a peripheral area of the first image based on the determined size of the crop area, so as to obtain a second image. In addition, the processor 1200 may also determine a distortion correction value of the camera 1100 according to the height at which the tray 1001 is inserted, and apply the distortion correction value to the first image, so as to obtain the second image. An operation of obtaining, by the processor 1200, a second image (a monitoring image) by applying a setting value according to a height at which the tray 1001 is inserted is described later in detail with reference to FIGS. 9 to 16.

According to an embodiment of the disclosure, the processor 1200 may recognize an ingredient placed on the tray 1001 from the second image and provide recipe information appropriate for the ingredient through the user interface 1600. In addition, the processor 1200 may determine an adjustment value of a cooking temperature included in the recipe information according to the height at which the tray 1001 is inserted, and provide the determined adjustment value of the cooking temperature through the user interface 1600.

The driving unit 1300 may include a heater 1310, a circulation fan 1320, and a cooling fan 1330, but is not limited thereto. The driving unit 1300 may differ according to a type of the home appliance 1000. For example, when the home appliance 1000 is a small refrigerator, the driving unit 1300 may further include a compressor and an air-purifying unit. When the home appliance 1000 is a dishwasher, the driving unit 1300 may also include a motor, a spraying unit, a drying unit, a condenser, etc.

When the home appliance 1000 is an oven, the heater 1310 for heating food may be provided in the interior space (e.g., a cooking chamber) of the home appliance 1000. The heater 1310 may include an electric heater including an electric resistor or a gas heater that generates heat by burning gas. The circulation fan 1320 for evenly heating food by circulating internal air and a circulation motor driving the circulation fan 1320 may be provided at the rear of the interior space (cooking chamber). In addition, a fan cover covering the circulation fan 1320 may be provided at the front of the circulation fan 1320, and a through-hole may be defined in the fan cover so that air may flow therethrough. The cooling fan 1330 may include a centrifugal fan that sucks air from an upper side and emits the air in a radial direction. The cooling fan 1330 may be arranged in a cooling path. The cooling fan 1330 may include a rotation plate formed to be flat, a hub to which a rotation axis of the cooling motor is coupled, and a plurality of wings formed from a central portion of the rotation plate to an edge portion of the rotation plate. The hub may be provided in a cone shape with a radius increasing toward a lower portion thereof and thus may diffuse air sucked from the upper side in a radial direction.

The sensor unit 1400 may include the depth sensor 1410, the weight detection sensor 1420, the infrared sensor 1430, a humidity sensor 1440 sensing humidity of the interior space, a gas sensor 1450 sensing a level of gas in the interior space, and a temperature sensor 1460, but is not limited thereto. A function of each of the sensors may be intuitively inferred from the names thereof by a person skilled in the art, and detailed descriptions thereof are omitted.

The communication interface 1500 may include one or more elements that allow communication between the home appliance 1000 and a server device (not shown) or between the home appliance 1000 and a mobile terminal (not shown). For example, the communication interface 1500 may include a short-range wireless communication unit 1510, a long-distance communication interface 1520, etc.

The short-range wireless communication interface 1510 may include a Bluetooth communication interface, a Bluetooth Low Energy communication interface, a near field communication (NFC) unit, a wireless local area network (WLAN) communication interface, a Zigbee communication interface, an Infrared Data Association (IrDA) communication interface, a Wi-Fi Direct (WFD) communication interface, an ultra wideband (UWB) communication interface, an Ant+communication interface, etc., but is not limited thereto. When the home appliance 1000 is remotely controlled by a server device (not shown) in an Internet-of-Things (IoT) environment, the long-distance communication interface 1520 may be used to communicate with the server device. The long-distance wireless communication interface 1520 may include the Internet, a computer network (e.g., a LAN or wide area network (WAN)), and a mobile communication interface. The mobile communication interface may include a $3^{rd}$-Generation (3G) module, a $4^{th}$-Generation (4G) module, a Long-Term Evolution (LTE) module, a Narrowband Internet of Things (NB-IoT) module, a Long-Term Evolution-Machine Type Communication (LTE-M) module, etc., but is not limited thereto.

The user interface 1600 may include an output interface 1610 and an input interface 1620. The output interface 1610 is for outputting of an audio signal or a video signal and may include a display unit, a sound output unit, etc.

When the display unit and a touchpad form a layered structure and constitute a touch screen, the display unit may be used as the input interface 1620 as well as the output interface 1610. The display unit may include at least one of a liquid crystal display, a thin film transistor-liquid crystal display, a light-emitting diode (LED) display, an organic light-emitting diode (OLED), a flexible display, a three-dimensional (3D) display, or an electrophoretic display. In addition, according to an implementation form of the home appliance 1000, the home appliance 1000 may include two or more display units.

The sound output unit may be received from the communication interface 1500 or output audio data stored in the memory 1800. In addition, the sound output unit may output a sound signal related to a function performed by the home appliance 1000. The sound output unit may include a speaker, a buzzer, etc.

According to an embodiment of the disclosure, the display unit may output a monitoring image of the interior space of the home appliance 1000 or output recipe information appropriate for an ingredient. In addition, the display unit may also output an adjustment value of a cooking temperature determined according to the height at which the tray is inserted.

The input interface 1620 is for receiving an input from a user. The input interface 1620 may include at least one of a key pad, a dome switch, a touchpad (a contact capacitive method, a pressure resistance film method, an infrared sensing method, a surface ultrasonic conduction method, an integral tension measurement method, a piezoelectric effect method, etc.), a jog wheel, or a jog switch, but is not limited thereto.

The input interface 1620 may include a voice recognition module. For example, the home appliance 1000 may receive a voice signal that is an analog signal via a microphone, and convert a voice portion into computer-readable text by using an automatic speech recognition (ASR) model. The home appliance 1000 may interpret the text by using a natural language understanding (NLU) model and obtain an intention of the user's utterance. Here, the ASR model or NLU model may include an AI model. The AI model may be processed by an AI dedicated processor that is designed as a hardware structure specialized for processing an AI model. The AI model may be created through training. Here, being created through training denotes that a basic AI model is trained by using a plurality of pieces of training data by a training algorithm, so that a predefined operation rule or AI model set to perform a desired characteristic (or purpose) is created. The AI model may include a plurality of neural network layers. Each of the plurality of neural network layers has a plurality of weight values, and a neural network operation is performed through an operation between an operation result of a previous layer and the plurality of weight values.

Linguistic understanding is technology for recognizing and applying/processing human language/characters and may include natural language processing, machine translation, dialog system, question answering, speech recognition/synthesis, etc.

The lamp 1700 may be arranged at one side of the interior space of the home appliance 1000 and may be expressed internal lighting. For example, the lamp 1700 may be arranged on the ceiling of the interior space or may be arranged on a side of the interior space, but is not limited thereto. The lamp 1700 may be turned on when a door of the home appliance 1000 is opened or the home appliance 100 operates. The lamp 1700 may be protected by a glass cover.

According to an embodiment of the disclosure, the lamp 1700 may have various brightness levels. For example, the lamp 1700 may emit light of a dark level to a bright level. The brightness of the lamp 1700 may be adjusted by the processor 1200. The lamp 1700 may be a halogen light or an LED light, but is not limited thereto.

The memory 1800 may store a program for processing and controlling by the processor 1200 or may store data (e.g., recipe information, area table, interval table, crop area size information, distortion correction value, brightness level table, etc.) to be input or output. The memory 1800 may store an AI model. For example, the memory 1800 may store an AI model for object recognition, an AI model for recipe recommendation, etc.

The memory 1800 may include a storage medium of at least one type from among a flash memory type, a hard disk type, a multimedia card micro type, a card memory type (e.g., a secure digital (SD) or extreme digital (XD) memory), random access memory (RAM), static random access memory (SRAM), read-only memory (ROM), electrically erasable programmable read-only memory (EEPROM), programmable read-only memory (PROM), magnetic memory, a magnetic disk, and an optical disk. In addition, the home appliance 1000 may operate a web storage or cloud server that performs a storage function on the Internet.

Hereinafter, a method of obtaining, by the home appliance 1000, a monitoring image of an interior space of the home appliance 1000 by considering a height of the tray 1001 is described in detail with reference to FIG. 4.

Figure 4:
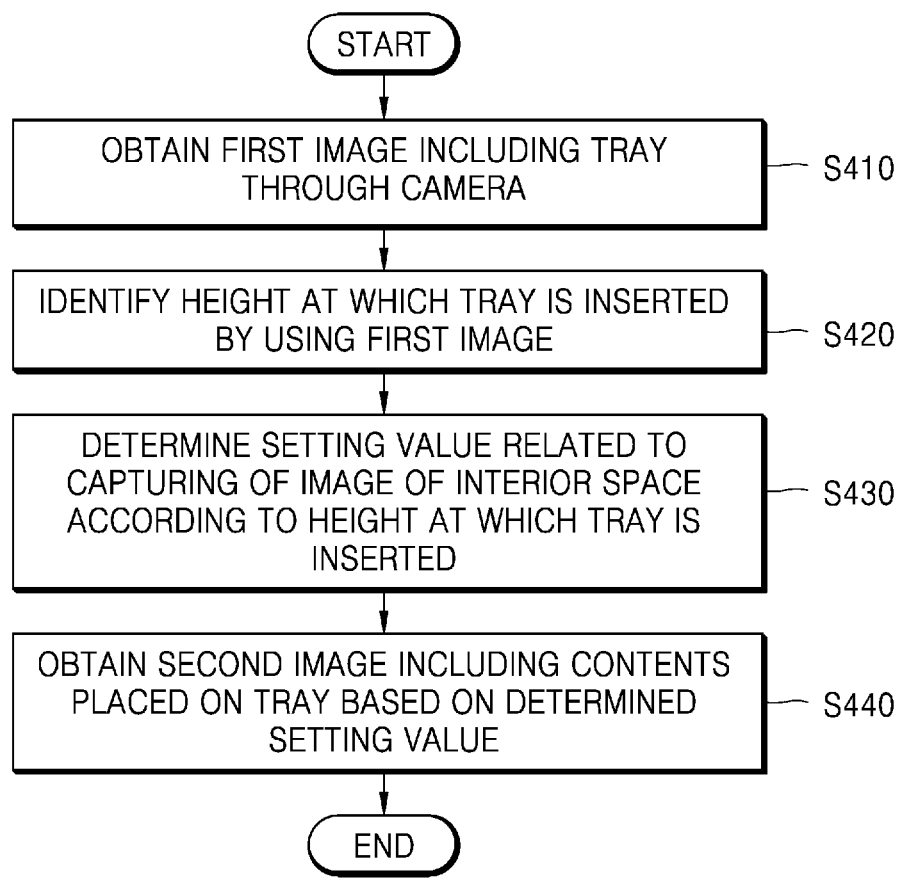
FIG. 4 is a flowchart of a method of obtaining an image by a home appliance, according to an embodiment of the disclosure.

FIG. 4 is a flowchart of a method of obtaining an image by a home appliance, according to an embodiment of the disclosure.

In operation S410, the home appliance 1000 according to an embodiment of the disclosure may obtain a first image including the tray 1001 inserted to the interior space of the home appliance 1000, through the camera 1100 located in the interior space. Here, the first image may include an initial image for identifying a height at which the tray 1001 is inserted. According to an embodiment of the disclosure, the first image may include a color image or a black image.

According to an embodiment of the disclosure, the tray 1001 may be inserted at various heights. For example, shelves of various heights to which the tray 1001 may be inserted may be arranged in the internal space of the home appliance 1000, and the tray 1001 may be placed on one of the shelves of various heights.

According to an embodiment of the disclosure, the home appliance 1000 may obtain the first image by capturing an image of the interior space through the camera 1100 at a preset time point. For example, when a certain time (e.g., three seconds) has elapsed after a door of the home appliance 1000 is opened, the home appliance 1000 may control the camera 1100 to capture an image of the interior space and obtain the first image. According to another embodiment of the disclosure, the home appliance 1000 may control the camera 1100 to capture an image of the interior space within a certain time (e.g., three seconds) after detection of the placement of the tray 1001 in the interior space. The home appliance 1000 may detect that the tray 1001 is placed in the interior space by using at least one of the depth sensor 1410, the weight detection sensor 1420, or the infrared sensor 1430. According to an embodiment of the disclosure, the home appliance 1000 may also control the camera 1100 to capture an image of the interior space within a certain time (e.g., three seconds) after the tray 1001 is placed in the interior space and a door of the home appliance 1000 is closed.

In operation S420, the home appliance 1000 according to an embodiment of the disclosure may identify a height at which the tray 1001 is inserted by using the first image.

According to an embodiment of the disclosure, the home appliance 1000 may identify the height at which the tray 1001 is inserted through edge detection performed on the first image. For example, the home appliance 1000 may perform edge detection on the first image and recognize an edge portion of the tray 1001. An edge is a portion where a brightness changes rapidly in an image, and may mean a boundary line, a contour line, etc., and edge detection refers to a process of finding a pixel corresponding to an edge. Accordingly, when the home appliance 1000 performs edge detection on the first image including the tray 1001, an edge portion (e.g., a contour line) of the tray 1001 may be recognized. For example, the home appliance 1000 may estimate a polygon of a closed shape by an edge from an edge image obtained by performing edge detection on the first image. In this case, the polygon of the closed shape by the edge may be the tray 1001 of a rectangular shape. The home appliance 1000 may determine an area of the tray 1001 based on the edge portion (e.g., the contour line) of the tray 1001. In addition, the home appliance 1000 may compare the area of the tray 1001 with a prestored area table and identify the height at which the tray 1001 is inserted. The prestored area table may include information in which the heights of the shelves 1002 located in the interior space and areas (or area ratios) of the tray 1001 are matched with each other. Because the camera 1100 is arranged on the ceiling of the interior space of the home appliance 1000, an area occupied by the tray 1001 in the first image may increase as the height at which the tray 1001 is inserted increases, and the area occupied by the tray 1001 in the first image may decrease as the height at which the tray 1001 is inserted decreases.

According to an embodiment of the disclosure, the home appliance 1000 may identify the height at which the tray 1001 is inserted based on the number of markers included in the first image. For example, the home appliance 1000 may include the shelves 1002 of different heights to which the tray 1001 may be inserted, and markers at positions respectively corresponding to the shelves 1002. For example, a first marker may be attached to a position corresponding to a shelf of a first level that is disposed at the bottom, a second marker may be attached to a position corresponding to a shelf of a second level that is disposed above the shelf of the first level, a third marker may be attached to a position corresponding to a shelf of a third level that is disposed above the shelf of the second level, and a fourth marker may be attached to a position corresponding to a shelf of a fourth level that is disposed at the top. In this case, the home appliance 1000 may analyze the first image and identify the number of markers included in the first image. Because the camera 1100 is arranged on the ceiling, when the height at which the tray 1001 is inserted increases, the number of markers covered with the tray 1001 increases and thus the number of markers recognized in the first image may decrease, and when the height at which the tray 1001 is inserted decreases, the number of markers recognized in the first image may increase. For example, when the tray 1001 is inserted into the shelf of the first level disposed at the top, a first marker, a second marker, and a third marker may not be visible by being covered with the tray 1001. Accordingly, when only one marker (a fourth marker) is recognized in the first image, the home appliance 1000 may identify that the tray 1001 is inserted into the shelf of the fourth level.

According to an embodiment of the disclosure, the home appliance 1000 may identify the height at which the tray 1001 is inserted based on an interval between at least two markers included in the tray 1001 at a certain interval. A plurality of markers may be attached to the tray 1001 at a certain interval. A total of four markers may be included in the tray 1001 by being attached to the respective edges of the tray 1001, and a total of nine markers may be included in the tray 1001 such that three markers are attached in each of horizontal and vertical directions. However, the disclosure is not limited thereto.

The home appliance 1000 may recognize at least two markers included in the tray 1001 at a certain interval, in the first image. In addition, the home appliance 1000 may compare the interval between the markers with a prestored interval table and identify the height at which the tray 1001 is inserted. The prestored interval table may include information in which heights of the shelves 1002 positioned in the interior space and intervals (or interval ratios) of the markers are respectively matched with each other. Because the camera 1100 is arranged on the ceiling, when the height at which the tray 1001 is inserted increases, an interval between the markers in the first image may increase, and when the height at which the tray 1001 is inserted decreases, the interval between the markers in the first image may decrease.

According to an embodiment of the disclosure, the home appliance 1000 may identify the height at which the tray 1001 is inserted by further using at least one sensor in addition to the first image. For example, the home appliance 1000 may identify the height at which the tray 1001 is inserted by further using at least one of the depth sensor 1410 arranged on the ceiling, the weight detection sensor 1420 included in the shelves 1002, or the infrared sensor 1430 included in the shelves 1002. An operation of using, by the home appliance 1000, at least one sensor to identify a height at which the tray 1001 is inserted is described later in detail with reference to FIG. 8.

In operation S430, the home appliance 1000 according to an embodiment of the disclosure may determine a setting value related to capturing of an image of the interior space according to the height at which the tray 1001 is inserted. The setting value related to capturing of an image of the interior space may include at least one of a lighting brightness value of the interior space, the size of a crop area, or a distortion correction value of the camera 1100.

According to an embodiment of the disclosure, the setting value related to capturing of an image of the interior space may differ according to the height at which the tray 1001 is inserted. For example, when the height at which the tray 1001 is inserted increases, a brightness of an image obtained by using the camera 1100 may increase, and thus, the home appliance 1000 may determine the lighting brightness value to be low.

In addition, because the size of the tray 1001 in the obtained image decreases when the height at which the tray 1001 is inserted decreases, the home appliance 1000 may reduce the size of the crop area so that the tray 1001 maintains a certain size in the monitoring image.

According to an embodiment of the disclosure, because a distance between the camera 1100 arranged on the ceiling and the tray 1001 decreases as the height at which the tray 1001 is inserted increases, Barrel distortion (distortion in the shape of a potbelly in which a line rises convexly outward from the center of the line) may increase. Accordingly, the home appliance 1000 may determine a distortion correction value to be large as the height at which the tray 1001 is inserted increases.

In operation S440, the home appliance 1000 according to an embodiment of the disclosure may obtain a second image including contents placed on the tray 1001, based on the setting value determined according to the height at which the tray 1001 is inserted.

According to an embodiment of the disclosure, the home appliance 1000 may control the camera 1100 to obtain the second image after adjusting the brightness of the lamp 1700 arranged in the interior space, according to the lighting brightness value determined according to the height at which the tray 1001 is inserted. For example, because the brightness of the tray 1001 included in the image may increase with the increase in the height at which the tray 1001 is inserted, the home appliance 1000 may adjust the brightness of the lamp 1700 to be low and then obtain the second image. On the other hand, because the brightness of the tray 1001 included in the image may decrease with the decrease in the height at which the tray 1001 is inserted, the home appliance 1000 may increase the brightness of the lamp 1700 and then obtain the second image. In other words, the home appliance 1000 may control the brightness of the lamp 1700 and obtain the second image including the tray 1001 of a constant brightness (e.g., 800 lux (lx)), even when the height at which the tray 1001 is inserted is changed.

According to an embodiment of the disclosure, the home appliance 1000 may obtain the second image by cropping a portion of a peripheral area of the first image based on the size of the crop area determined according to the height at which the tray 1001 is inserted. For example, when the home appliance 1000 determines a size of an area occupied by the tray 1001 in the first image as the size of the crop area, the home appliance 1000 may crop the peripheral area of the tray 1001 in the first image and obtain the second image including only the tray 1001. According to an embodiment of the disclosure, the home appliance 1000 may also obtain the second image by extracting the crop area including the tray 1001 from the first image and then enlarging the crop area at a certain ratio to fit a size of a display screen. In other words, the second image may include an image obtained by cropping a portion of the peripheral area in the first image based on the size of the crop area determined according to the height of the tray 1001 and then enlarging the cropped area at a certain ratio. Accordingly, according to an embodiment of the disclosure, the home appliance 1000 may obtain the second image including the tray 1001 of a constant size by adjusting the size of the crop area, even when the height at which the tray 1001 is inserted is changed.

According to an embodiment of the disclosure, the second image may be obtained by applying, to the first image, the distortion correction value determined according to the height at which the tray 1001 is inserted. In this case, the second image may include an image obtained by correcting distortion in the first image based on the distortion correction value determined according to the height of the tray 1001. For example, because Barrel distortion increases as the height at which the tray 1001 is inserted increases, the home appliance 1000 may apply a large distortion correction value to the first image and obtain the second image. In this case, the home appliance 1000 may adjust a distortion correction value of the camera 1100 and obtain the second image including the tray 1001 of a constant form, even when the height at which the tray 1001 is inserted is changed.

According to an embodiment of the disclosure, the home appliance 1000 may adjust only one of the lighting brightness value of the interior space, the size of the crop area, and the distortion correction value of the camera 1100 according to the height at which the tray 1001 is inserted, or may adjust two or more. For example, the home appliance 1000 may, according to the height at which the tray 1001 is inserted, adjust the lighting brightness value of the interior space and the size of the crop area, adjust the lighting brightness value of the interior space and the distortion correction value of the camera 1100, adjust the size of the crop area and the distortion correction value of the camera 1100, or adjust the lighting brightness value of the interior space, the size of the crop area, and the distortion correction value of the camera 1100.

According to an embodiment of the disclosure, the home appliance 1000 may output the second image to which the setting value related to capturing of an image of the interior space determined according to the height at which the tray 1001 is inserted, as a monitoring image through the display unit. In this case, a user may be provided with a monitoring image of a uniform state regardless of the height at which the tray 1001 is inserted. Accordingly, even when the user inserts the tray 1001 into a top shelf although the user usually inserts the tray 1001 into a shelf at the lowest height, the tray 1001 may be prevented from being displayed too large or too dark in the monitoring image so that the user is not able to properly identifying a state of an ingredient placed on the tray 1001.

Hereinafter, an operation of identifying, by the home appliance, a height at which the tray 1001 is inserted by using the first image obtained through the camera 1100 is described in greater detail with reference to FIGS. 5 to 7.

Figure 5:
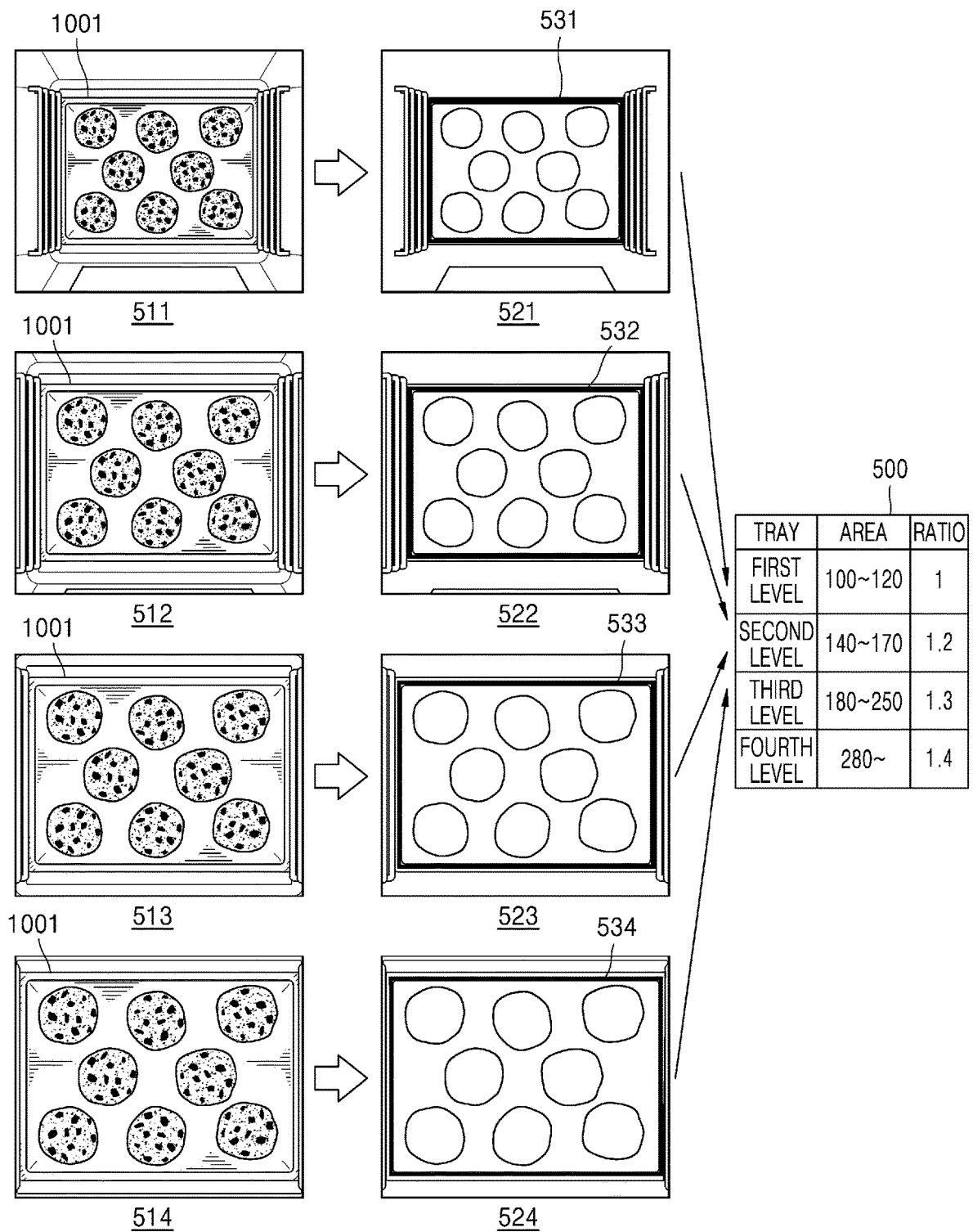
FIG. 5 is a diagram for describing an operation of identifying, by a home appliance, a height at which a tray is inserted based on an area of the tray included in the first image, according to an embodiment of the disclosure.

FIG. 5 is a diagram for describing an operation of identifying, by a home appliance, a height at which a tray is inserted based on an area of the tray included in a first image, according to an embodiment of the disclosure.

Referring to FIG. 5, the home appliance 1000 may obtain a first image including the tray 1001 inserted into the interior space of the home appliance 1000, through the camera 1100. In this case, the first image may include one of a $1^{st}$-$1^{st}$ image 511 including the tray 1001 inserted into a shelf of a first height (first level), a $1^{st}$-$2^{nd}$ image 512 including the tray 1001 inserted into a shelf of a second height (second level), a $1^{st}$-$3^{rd}$ image 513 including the tray 1001 inserted into a shelf of a third height (third level), and a $1^{st}$-$4^{th}$ image 514 including the tray 1001 inserted into a shelf of a fourth height (fourth level).

The home appliance 1000 may compare the area of the tray 1001 determined through edge detection performed on the first image with a prestored area table 500 and identify the height at which the tray 1001 is inserted. The areas included in the area table 500 may be based on an experiment result and may be inferred through an AI model.

For example, when the home appliance 1000 obtains the $1^{st}$-$1^{st}$ image 511, the home appliance 1000 may perform edge detection on the $1^{st}$-$1^{st}$ image 511 and obtain a first edge image 521 corresponding to the $1^{st}$-$1^{st}$ image 511. In addition, the home appliance 1000 may extract an edge portion (e.g., a contour line) of the tray 1001 from the first edge image 521 and determine a first area 531 occupied by the tray 1001 in the $1^{st}$-$1^{st}$ image 511 (or the first edge image 521). For example, the home appliance 1000 may determine the first area 531 of the tray 1001 as 100 cm$^2$ based on the edge portion (e.g., the contour line) of the tray 1001. In this case, the home appliance 1000 may compare the first area 531 of the tray 1001 with the prestored area table 500 and identify the height at which the tray 1001 is inserted. For example, because the first area 531 of the tray 1001 is 100 cm$^2$, the home appliance 1000 may determine that the tray 1001 is inserted into the shelf of the first height (first level).

When the home appliance 1000 obtains $1^{st}$-$2^{nd}$ image 512, the home appliance 1000 may perform edge detection on the $1^{st}$-$2^{nd}$ image 512 and obtain a second edge image 522 corresponding to the $1^{st}$-$2^{nd}$ image 512. In addition, the home appliance 1000 may extract an edge portion (e.g., a contour line) of the tray 1001 from the second edge image 522 and determine a second area 532 occupied by the tray in the $1^{st}$-$2^{nd}$ image 512 (or the second edge image 522). For example, the second area 532 may be 150 cm$^2$. In this case, the home appliance 1000 may compare the second area 532 of the tray 1001 with the prestored area table 500 and identify that the tray 1001 is inserted into the shelf of the second height (second level).

When the home appliance 1000 obtains the $1^{st}$-$3^{rd}$ image 513, the home appliance 1000 may perform edge detection on the $1^{st}$-$3^{rd}$ image 513 and obtain a third edge 523 corresponding to the $1^{st}$-$3^{rd}$ image 513. In addition, the home appliance 1000 may extract an edge portion (e.g., a contour line) of the tray 1001 from the third edge image 523 and determine a third area 533 occupied by the tray 1001 in the $1^{st}$-$3^{rd}$ image 513 (or the third edge image 523). For example, the third area 533 may be 200 cm$^2$. In this case, the home appliance 1000 may compare the third area 533 of the tray 1001 with the prestored area table 500 and determine that the tray 1001 is inserted into the shelf of the third height (third level).

When the home appliance 1000 obtains the $1^{st}$-$4^{th}$ image 514, the home appliance 1000 may perform edge detection on the $1^{st}$-$4^{th}$ image 514 and obtain a fourth edge image 524 corresponding to the $1^{st}$-$4^{th}$ image 514. In addition, the home appliance 1000 may extract an edge portion (e.g., a contour line) of the tray 1001 from the fourth edge image 524 and determine a fourth area 534 occupied by the tray 1001 in the $1^{st}$-$4^{th}$ image 514 (or the fourth edge image 524). For example, the fourth area 534 may be 300 cm$^2$. In this case, the home appliance 1000 may compare the fourth area 534 of the tray 1001 with the prestored area table 500 and determine that the tray 1001 is inserted into the shelf of the fourth height (fourth level).

Meanwhile, an area ratio may be defined in the prestored area table 500. For example, in the prestored area table 500, the first area 513 occupied by the tray 1001 inserted into the shelf of the first height (first level) in the first image may be defined as a reference area. In addition, in the prestored area table 500, an area of the tray 1001 inserted into the shelf of the second height (second level) may be defined as 1.2 times the reference area, an area of the tray 1001 inserted into the shelf of the third height (third level) may be defined as 1.3 times the reference area, and the area of the tray 1001 inserted into the shelf of the fourth height (fourth level) may be defined as 1.4 times the reference area. Area ratios included in the prestored area table 500 may be based on an experiment result and may be a value inferred through an AI model.

According to an embodiment of the disclosure, as a result of performing edge detection on the first image, when an area (e.g., the first area 531) occupied by the tray 1001 in the first image is the reference area, the home appliance may determine that the tray 1001 is inserted into the shelf of the first height (first level), when an area (e.g., the second area 532) occupied by the tray 1001 in the first image is 1.2 times the reference area, determine that the tray 1001 is inserted into the shelf of the second height (second level), when an area (e.g., the third area 533) occupied by the tray 1001 in the first image is 1.3 times the reference area, determine that the tray 1001 is inserted into the shelf of the third height (third stage), and when an area (e.g., the fourth area 534) occupied by the tray 1001 in the first image is 1.4 times the reference area, determine that the tray 1001 is inserted into the shelf of the fourth height (fourth level).

According to an embodiment of the disclosure, because the area occupied by the tray 1001 in the first image increases as the height of the tray 1001 increases, and the area occupied by the tray 1001 in the first image decreases as the height of the tray 1001 decreases, the home appliance 1000 may compare the area occupied by the tray 1001 in the first image with the prestored area table 500 and identify the height of the tray 1001.

FIG. 6 is a diagram for describing an operation of identifying, by a home appliance, a height at which a tray is inserted based on an interval between markers included in the tray, according to an embodiment of the disclosure.

Referring to 610 in FIG. 6, four markers 611 to 614 may be arranged at respective edges of the tray 1001. The home appliance 1000 may extract at least two markers from a first image 600 capturing the interior space including the tray 1001 and determine an interval between the markers. In addition, the home appliance 1000 may compare the interval between the markers with a prestored interval table 601 and identify the height at which the tray 1001 is inserted. In the prestored interval table, an interval may be defined for each height of the tray 1001. In addition, intervals included in the interval table 601 may be based on an experiment result and may have values inferred through an AI model.

For example, the home appliance 100 may extract a first marker 611 and a second marker 612 from the first image 600 and identify that an interval between the first marker 611 and the second marker 612 is 12 cm. Alternatively, the home appliance 1000 may extract the first marker 613 and the third marker 613 from the first image 600 and identify that an interval between the first marker 611 and the third marker 613 is 10 cm. In this case, because the intervals between the markers are in a range of 10 cm and 12 cm, the intervals between the markers may be compared with the interval table 601, and it may be determined that the tray 1001 is inserted into the shelf of the first height (first level).

Meanwhile, an interval ratio may be defined in the prestored interval table 601. For example, in the prestored interval table 601, an interval between markers included in the tray 1001 inserted into the shelf of the first height (first level) may be defined as a reference interval. In addition, in the prestored interval table 601, an interval of markers included in the tray 1001 inserted into the shelf of the second height (second level) may be defined as 1.2 times the reference interval, an interval between markers included in the tray 1001 inserted into the shelf of the third height (third level) may be defined as 1.3 times the reference interval, and an interval between markers included in the tray 1001 inserted into the shelf of the fourth height (fourth level) may be defined as 1.4 times the reference interval. Interval ratios included in the prestored interval table 601 may be based on an experiment result and have values inferred through an AI model.

According to an embodiment of the disclosure, as a result of analysis of the first image 600, when an interval between markers included in the tray 1001 in the first image 600 is a reference interval, the home appliance 1000 may determine that the tray 1001 is inserted into the shelf of the first height (first level), when an interval between the markers included in the tray 1001 in the first image is 1.2 times the reference interval, determine that the tray 1001 is inserted into the shelf of the second height (second level), when an interval between the markers included in the tray 1001 in the first image 600 is 1.3 times the reference interval, determine that the tray 1001 is inserted into the shelf of the third height (third level), and when an interval between the markers included in the tray 1001 in the first image is 1.4 times the reference interval, determine that the tray 1001 is inserted into the shelf of the fourth height (fourth level).

Referring to 620 in FIG. 6, nine markers 621 to 629 may be arranged in the tray 1001 at a constant interval. For example, three markers may be arranged in each of the horizontal and vertical directions. The home appliance 1000 may extract at least two markers from the first image 600 capturing the interior space including the tray 1001 and identify an interval between the markers. In this case, the interval between the markers may include a horizontal interval (a) and a vertical interval (b), and each of the horizontal interval (a) and the vertical interval (b) may denote a minimum interval. The home appliance 1000 may compare the interval (horizontal interval (a) or the vertical interval (b) between the markers with the prestored interval table 602 and identify the height at which the tray 1001 is inserted. In the prestored interval table 602, the horizontal interval (a) and the vertical interval (b) may be defined for each height of the tray 1001. The horizontal interval (a) and the vertical interval (b) included in the interval table 602 may be based on an experiment result and have values inferred by an AI model.

The home appliance 1000 may extract the markers 621 to 629 from the first image 600 and identify that a minimum horizontal interval (a) between the markers 621 to 629 is 6 cm and a minimum vertical interval (b) is 4 cm. In this case, the home appliance 1000 may compare the minimum horizontal interval (a) and the minimum vertical interval (b) of the markers 621 to 629 with the prestored table 602 and determine that the tray 1001 is inserted into the shelf of the first height (first level).

According to an embodiment of the disclosure, because an interval between markers included in the tray 1001 in the first image 600 increases as the height of the tray 1001 increases, and the interval between the markers included in the tray 1001 in the first image decreases as the height of the tray 1001 decreases, the home appliance 1000 may compare the intervals between the markers included in the tray 1001 in the first image 600 with the prestored interval tables 601 and 602 and estimate the height of the tray 1001.

Figure 7:
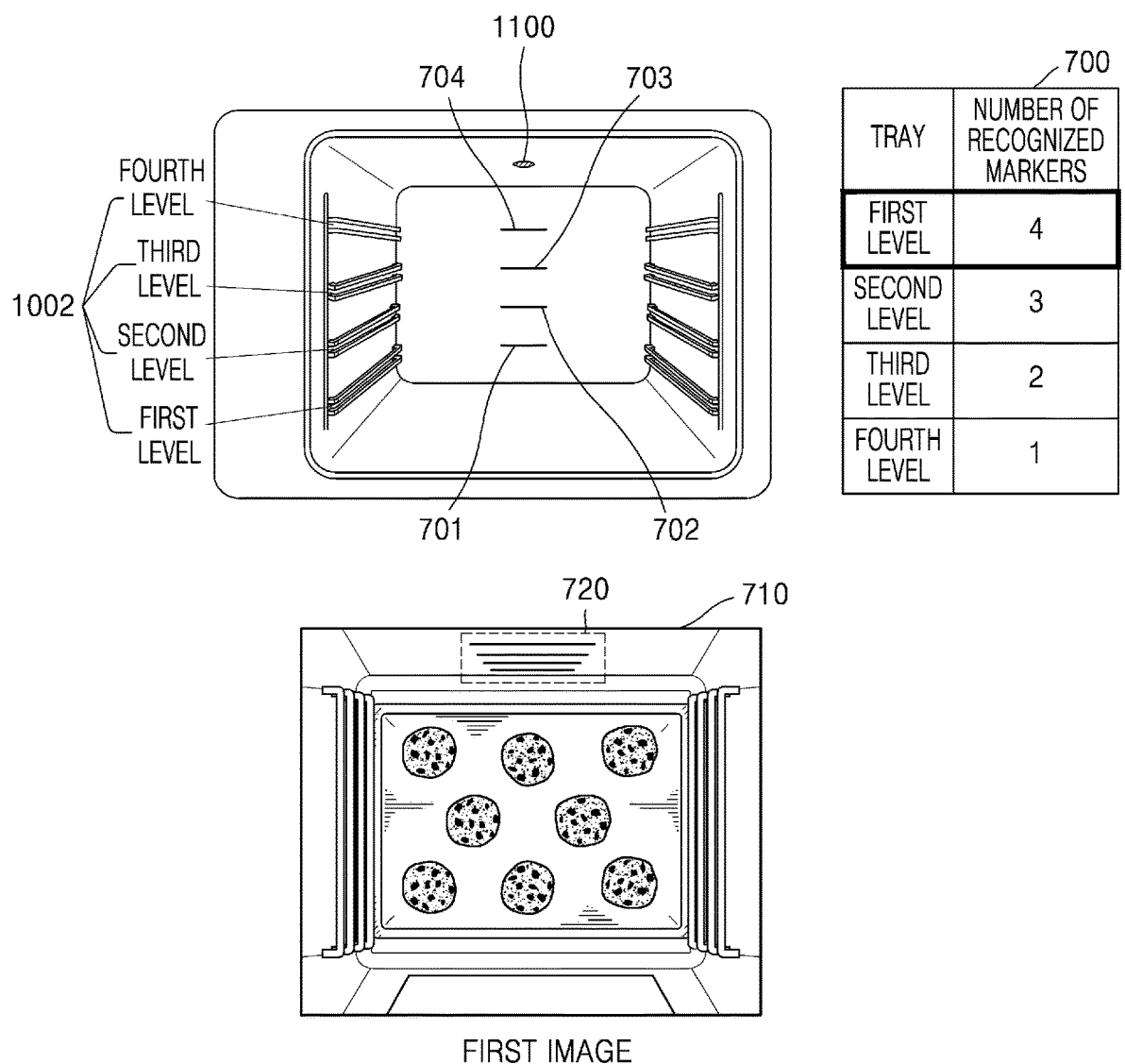
FIG. 7 is a diagram for describing an operation of identifying, by a home appliance, a height at which a tray is inserted based on the number of markers included in a first image, according to an embodiment of the disclosure.

FIG. 7 is a diagram for describing an operation of identifying, by a home appliance, a height at which a tray is inserted based on the number of markers included in a first image, according to an embodiment of the disclosure.

Referring to FIG. 7, the home appliance 1000 may include shelves 1002 of different heights into which the tray 1001 may be inserted, and markers 701 to 704 at positions respectively corresponding to the shelves 1002. For example, when the home appliance 1000 includes four shelves, four markers may be arranged on one surface (e.g., a rear surface) of the interior space. However, the disclosure is not limited thereto. Each of the markers 701 to 704 may be arranged at a slightly greater height than the shelves 1002. For example, a first marker 701 may be attached at a position slightly higher than the shelf of the first level, a second marker 702 may be attached at a position slightly higher than the shelf of the second level, a third marker 703 may be attached at a position slightly higher than the shelf of the third level, and a fourth marker 704 may be attached at a position slightly higher than the shelf of the fourth level.

The home appliance 1000 may obtain a first image 710 including the tray 1001 inserted into the interior space, through the camera 1100. In this case, the home appliance 1000 may analyze the first image and extract the markers and identify the number of the extracted markers. In addition, the home appliance 1000 may identify the height at which the tray 1001 is inserted based on the number of markers. For example, four markers are extracted from a partial area 720 of the first image 710, the home appliance 1000 may compare the number of markers with the number table 700 and determine that the tray 1001 is inserted into the shelf of the first level.

According to an embodiment of the disclosure, because the camera 1100 is arranged on the ceiling, when the height at which the tray 1001 is inserted increases, the number of markers covered with the tray 1001 increases and the number of markers recognized in the first image may be reduced, and when the height at which the tray 1001 is inserted decreases, the number of markers recognized in the first image 710 may increase. Accordingly, the home appliance 1000 may compare the number of markers extracted from the first image 710 with the number table 700 and estimate the height of the tray 1001.

According to an embodiment of the disclosure, the home appliance 1000 may identify the height at which the tray 1001 is inserted by using a sensor other than the camera 1100. An operation of identifying, by the home appliance 1000, a height at which the tray 1001 is inserted by using at least one sensor is described in detail with reference to FIG. 8.

Figure 8:
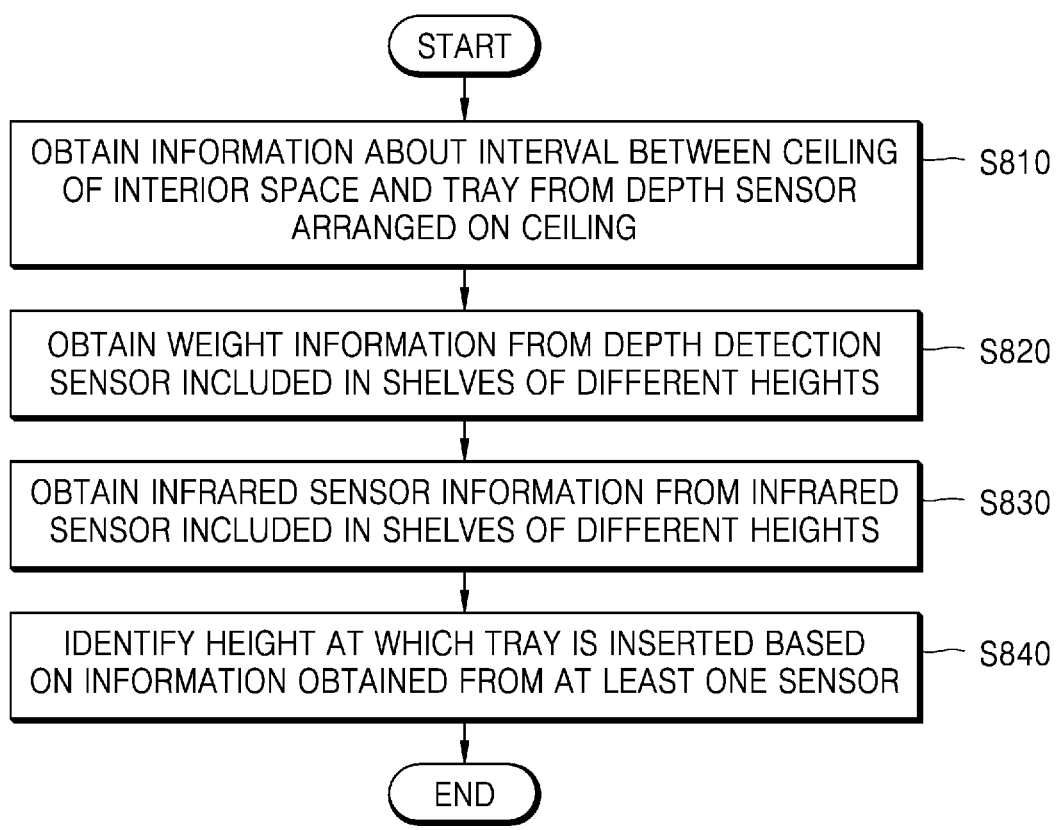
FIG. 8 is a flowchart of a method of identifying, by a home appliance, a height at which a tray is inserted based on information obtained from at least one sensor, according to an embodiment of the disclosure.

FIG. 8 is a flowchart of a method of identifying, by a home appliance, a height at which a tray is inserted based on information obtained from at least one sensor, according to an embodiment of the disclosure.

In operation S810, the home appliance 1000 according to an embodiment of the disclosure may obtain information about an interval between a ceiling of the interior space of the home appliance 1000 and the tray 1001 from the depth sensor 1410. The depth sensor may include a three-dimensional (3D) depth sensor of a time of flight (TOF) type. The TOF type is a 3D sensing technology for recognizing spatial information, movement, etc. of an object by measuring a time light transmitted to an object is reflected and returned.

According to an embodiment of the disclosure, the home appliance 1000 may obtain information about an interval between the ceiling and the tray 1001 from the depth sensor 1410. For example, when the height at which the tray 1001 is inserted increases, the interval between the ceiling and the tray 1001 may decrease, and when the height at which the tray 1001 is inserted decreases, the interval between the ceiling and the tray 1001 may increase.

In operation S820, the home appliance 1000 according to an embodiment of the disclosure may obtain weight information from the weight detection sensor 1420 included in the shelves 1002 of different heights.

The weight detection sensor 1420 may also be expressed as a weight sensor. According to an embodiment of the disclosure, when the home appliance 1000 includes four shelves, four weight detection sensors 1420 may be arranged in the interior space. However, the disclosure is not limited thereto. For example, a first weight detection sensor may be arranged on a first shelf positioned at the first height, a second weight detection sensor may be arranged on a second shelf positioned at the second height, a third weight detection sensor may be arranged on a third shelf positioned at the third height, and a fourth weight detection sensor may be arranged on a fourth shelf positioned at the fourth height.

According to an embodiment of the disclosure, when the tray 1001 is inserted into the first shelf positioned at the first height, a weight value measured by the first weight detection sensor arranged on the first shelf may be changed, and weight values measured by the second, third, and fourth weight detection sensors may not be significantly changed. On the other hand, when the tray 1001 is inserted into the second shelf positioned at the second height, a weight value measured by the second weight detection sensor arranged on the second shelf may be changed, and weight values measured by the first, third, and fourth weight detection sensors may not be significantly changed.

In operation S830, the home appliance 1000 according to an embodiment of the disclosure may obtain infrared sensor information from the infrared sensor 1430 included in the shelves 1002 of different heights.

The infrared sensor 1430 may include a light-emitting unit (e.g., an LED) that generates infrared rays and a light-receiving unit (e.g., a light sensor) that detects infrared rays, and an amount of voltage may vary according to an amount of infrared rays emitted from the light-emitting unit and received by the light-receiving unit. In other words, infrared rays radiated from an external material may change a polarization of a ferroelectric within the infrared sensor 1430 and generate external free electrons so that the infrared sensor 1430 detects the external material.

According to an embodiment of the disclosure, when the home appliance 1000 includes four shelves, four infrared sensors 1430 may be arranged in the interior space of the home appliance 1000. However, the disclosure is not limited thereto. For example, a first infrared sensor may be arranged on the first shelf positioned at the first height, a second infrared sensor may be arranged on the second shelf positioned at the second height, a third infrared sensor may be arranged on the third shelf positioned at the third height, and a fourth infrared sensor may be arranged on the fourth shelf positioned at the fourth height.

According to an embodiment of the disclosure, when the tray 1001 is inserted into the first shelf positioned at the first height, a sensor value measured by the first infrared sensor arranged on the first shelf may be significantly changed, and when the tray 1001 is inserted into the second shelf positioned at the second height, a sensor value measured by the second infrared sensor arranged on the second shelf may be significantly changed.

All of operations S810 to S830 may be performed, or only some of them may be performed. For example, when the home appliance 100 does not include the weight detection sensor 1420 and the infrared sensor 1430, but includes only the depth sensor 1410, the home appliance 1000 may omit operations S820 and S830.

In operation S840, the home appliance 1000 according to an embodiment of the disclosure may identify the height at which the tray 1001 is inserted based on information obtained from at least one sensor.

According to an embodiment of the disclosure, the home appliance 1000 may determine the height at which the tray 1001 is inserted based on information about an interval between the ceiling and the tray 1001 obtained from the depth sensor 1410. For example, the home appliance 1000 may determine that the tray 1001 is inserted into the shelf of the first height, when the interval between the ceiling and the tray 1001 is within a first threshold range, and the home appliance 1000 determine that the tray is inserted into the shelf of the second height, when the interval between the ceiling and the tray 1001 is within a second threshold range. In other words, the home appliance 1000 may determine that a height at which the tray 1001 is inserted increases as the interval between the ceiling and the tray 1001 decreases, and determine that the height at which the tray 1001 is inserted decreases as the interval between the ceiling and the tray 1001 increases.

According to an embodiment of the disclosure, the home appliance 1000 may identify the height at which the tray 1001 is inserted based on weight information obtained from the weight detection sensor 1420. For example, the home appliance 1000 may determine that the tray 1001 is inserted into the first shelf positioned at the first height, when a weight value measured by the first weight detection sensor arranged on the first shelf increases, and determine that the tray 1001 is inserted into the second shelf positioned at the second height, when a weight value measured by the second weight detection sensor increases.

According to an embodiment of the disclosure, the home appliance 1000 may also identify the height at which the tray 1001 is inserted based on infrared sensor information obtained from the infrared sensor 1430. For example, when a sensor value measured by the first infrared sensor arranged on the first shelf is significantly changed (or when the first infrared sensor detects the tray 1001), the home appliance 1000 may determine that the tray 1001 is inserted into the first shelf.

According to an embodiment of the disclosure, the home appliance 1000 may identify the height at which the tray 1001 is inserted by collectively using information about an interval between the ceiling and the tray 1001 obtained from the depth sensor 1410, weight information obtained from the weight detection sensor 1420, and infrared sensor information obtained from the infrared sensor 1430, or may identify the height at which the tray 1001 is inserted by using part of the information. Meanwhile, when the home appliance 1000 uses at least one of the depth sensor 1410, the weight detection sensor 1420, or the infrared sensor 1430, the height at which the tray 1001 is inserted may be identified without a separate marker.

According to an embodiment of the disclosure, the home appliance 1000 may also identify the height at which the tray 1001 is inserted by using at least one of information about the interval between the ceiling and the tray 1001 obtained from the depth sensor 1410, the weight information obtained from the weight detection sensor 1420, or the infrared sensor information obtained from the infrared sensor 1430, and information obtained from analysis of the first image obtained through the camera 1100. When the home appliance 1000 further uses information about measurements by at least one sensor in addition to the information obtained from the analysis of the first image obtained through the camera 1100, the home appliance 1000 may more accurately identify the height at which the tray 1001 is inserted.

Hereinafter, a method of adjusting, by the home appliance 1000, a setting value related to capturing of an image of an interior space of the home appliance 1000 according to an identified height of the tray 1001.

Figure 9:
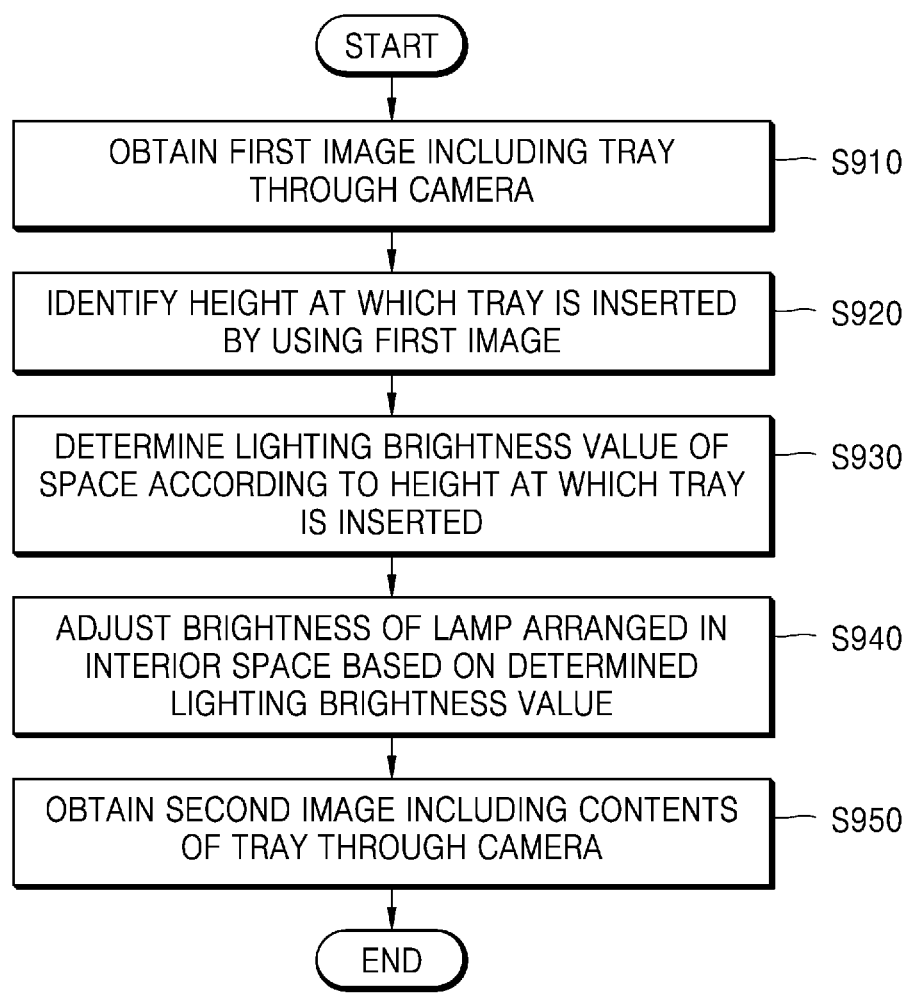
FIG. 9 is a flowchart of a method of adjusting, by a home appliance, a lamp brightness value of an interior space according to a height at which a tray is inserted, according to an embodiment of the disclosure.

FIG. 9 is a flowchart of a method of adjusting, by a home appliance, a lighting brightness value of an interior space of the home appliance according to a height at which a tray is inserted, according to an embodiment of the disclosure.

In operation S910, the home appliance 1000 according to an embodiment of the disclosure may obtain a first image including the tray 1001 through the camera 1100. Here, the first image may include an initial image for identifying a height at which the tray 1001 is inserted. Operation S910 corresponds to operation S410 in FIG. 4, and redundant descriptions thereof are omitted.

In operation S920, the home appliance 1000 according to an embodiment of the disclosure may identify the height at which the tray 1001 is inserted by using the first image. For example, the home appliance 1000 may perform edge detection on the first image and determine an area occupied by the tray 1001 in the first image, and identify the height at which the tray 1001 is inserted based on the area occupied by the tray 1001. The home appliance 1000 may also identify the height at which the tray 1001 is inserted based on the number of markers included in the first image. The home appliance 1000 may analyze the first image and extract at least two markers arranged at a constant interval, and identify the height at which the tray 1001 is inserted based on the extracted interval between the markers. Operation S920 in FIG. 9 corresponds to operation S420 in FIG. 4, and redundant descriptions thereof are omitted.

In operation S930, the home appliance 1000 according to an embodiment of the disclosure may determine a lighting brightness value of the interior space according to the height at which the tray 1001 is inserted.

According to an embodiment of the disclosure, the lamp 1700 may be positioned on the ceiling. In this case, when the height at which the tray 1001 is inserted increases, an amount of light may be increased so that a brightness of the tray 1001 in the first image increases, and when the height at which the tray 1001 is inserted decreases, the amount of light may decrease so that the brightness of the tray 1001 in the first image decreases. Accordingly, the home appliance 1000 may determine a lighting brightness value of the interior space to be small when the height at which the tray 1001 is inserted increases, and determine a lighting brightness value of the interior space to be large when the height at which the tray 1001 is inserted decreases, so that the brightness of the tray 1001 in the first image maintains a constant brightness (e.g., 800 lx).

Figure 10:
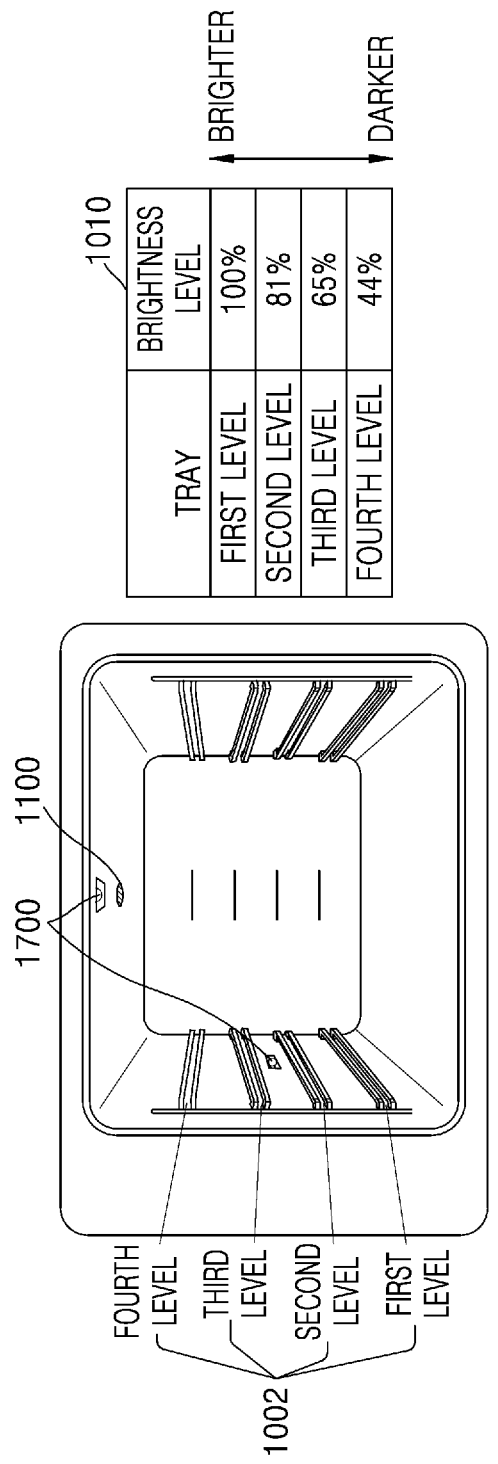
FIG. 10 is a diagram for describing an operation of adjusting, by a home appliance, a lamp brightness value of an interior space according to a height at which a tray is inserted, according to an embodiment of the disclosure.

Referring to FIG. 10, a brightness level table 1010 in which a height of the tray 1001 (e.g., a height of a shelf into which the tray 1001 is inserted) is matched with a lighting brightness value of the interior space of the home appliance 1000 are matched with each other may be stored in the memory 1800 of the home appliance 1000. In this case, the home appliance 1000 may search the brightness level table 1010 for a lighting brightness value of the interior space based on the height of the tray 1001. Lighting brightness values included in the brightness level table 1010 may be values that may form a brightness (e.g., 800 lx) at which the tray 1001 may be easily recognized. For example, when it is identified that the tray 1001 is inserted into the shelf of the first level positioned at the bottom of the shelves 1002, the home appliance 1000 may determine the lighting brightness value as 100% (maximum) based on the brightness level table 1010. In addition, the home appliance 1000 may, when it is identified that the tray 1001 is inserted into the shelf of the second level, determine the lighting brightness value as 81%, when it is identified that the tray 1001 is inserted into the shelf of the third level, determine the lighting brightness value as 65%, and when the tray 1001 is inserted into the shelf of the fourth level, determine the lighting brightness level as 44%.

In operation S940, the home appliance 1000 according to an embodiment of the disclosure may adjust the brightness of the lamp 1700 arranged in the interior space based on the lighting brightness value determined according to the height at which the tray 1001 is inserted. For example, the home appliance 1000 may adjust the brightness of the lamp 1700 to be low as the height at which the tray 1001 is inserted increases, and adjust the brightness of the lamp 1700 to be high as the height at which the tray 1001 is inserted decreases. Referring to FIG. 10, the home appliance 1000 may adjust an intensity of the brightness of the lamp 1700 to be highest (e.g., 100%) when the tray 1001 is inserted into the shelf of the first level, and adjust an intensity of the brightness of the map 1700 to be lowest (e.g., 44%) when the tray 1001 is inserted into the shelf of the fourth level.

In operation S950, the home appliance 1000 according to an embodiment of the disclosure may obtain a second image including contents of the tray 1001 through the camera 1100.

According to an embodiment of the disclosure, because the brightness of the lamp 1700 installed in the interior space is adjusted according to the height at which the tray 1001 is inserted, the home appliance 1000 may obtain the second image including an image of the tray 1001 having a uniform brightness, even when the height at which the tray 1001 is inserted is changed. Further, the home appliance 1000 may provide, to a user, the second image including the image of the tray 1001 having a uniform brightness as a monitoring image.

In a general home appliance in which there is no change in a brightness of a lamp, food placed on the tray 1001 is shown too bright or too dark according to whether the tray 1001 is inserted into a high shelf or a low shelf. However, in the home appliance 1000 according to an embodiment of the disclosure, different lighting brightness values are applied according to the height of the tray 1001, and thus, a monitoring image including food of the same brightness may be provided to the user, even when the height of the tray 1001 is changed.

Figure 11:
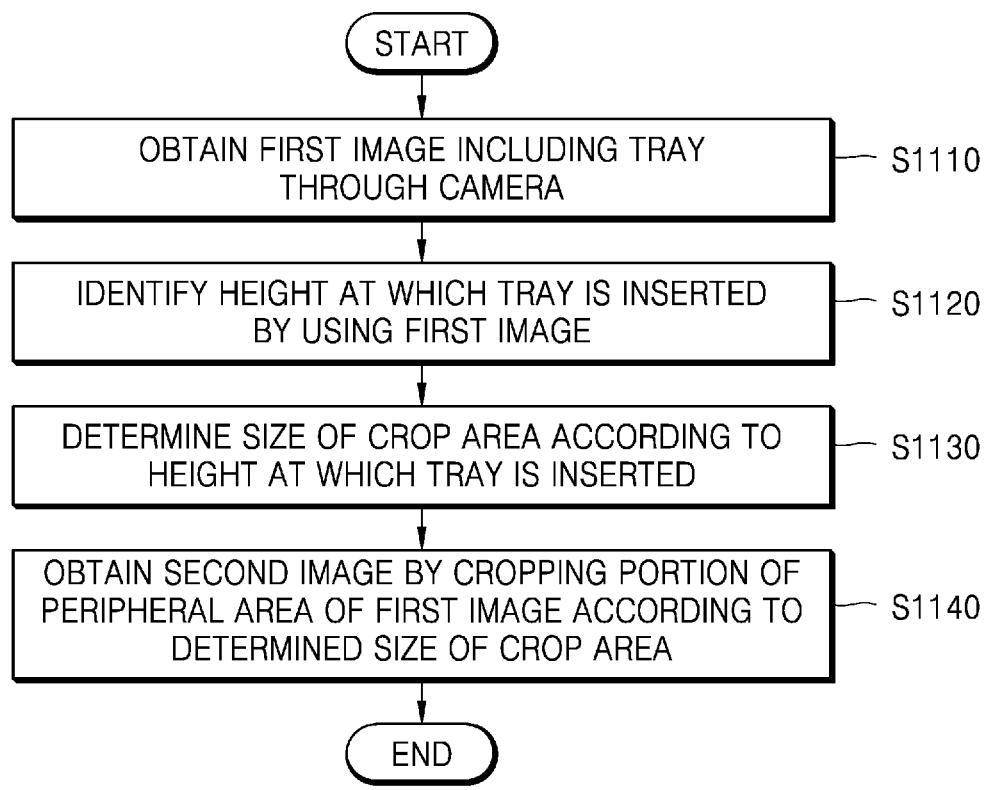
FIG. 11 is a flowchart of a method of determining, by a home appliance, the size of a crop area according to a height at which a tray is inserted, according to an embodiment of the disclosure.

FIG. 11 is a flowchart of a method of determining, by a home appliance, the size of a crop area according to a height at which a tray is inserted, according to an embodiment of the disclosure.

In operation S1110, the home appliance 1100 according to an embodiment of the disclosure may obtain a first image including the tray 1001 through the camera 1100. Here, the first image may include an initial image for identifying a height at which the tray 1001 is inserted. Operation S1110 corresponds to operation S410 in FIG. 4, and redundant descriptions thereof are omitted.

In operation S1120, the home appliance 1000 according to an embodiment of the disclosure may identify the height at which the tray 1001 is inserted by using the first image. For example, the home appliance 1000 may perform edge detection on the first image and determine an area occupied by the tray 1001 in the first image, and identify the height at which the tray 1001 is inserted based on the area occupied by the tray 1001. The home appliance 1000 may also identify the height at which the tray 1001 is inserted based on the number of markers included in the first image. The home appliance 1000 may analyze the first image and extract at least two markers arranged at a constant interval on the tray 1001, and identify the height at which the tray 1001 is inserted based on an interval between the extracted markers. Operation S1120 corresponds to operation S420 in FIG. 4, and redundant descriptions thereof are omitted.

In operation S1130, the home appliance 1000 according to an embodiment may determine the size of a crop area according to the height at which the tray 1001 is inserted. In the disclosure, cropping may denote removing the outer portion of an image, and a crop area may denote a selected area without being removed from the image. According to an embodiment of the disclosure, the size of the crop area may correspond to a size of the tray 1001 included in the first image.

Because an area occupied by the tray 1001 in the monitoring image increases as the height at which the tray 1001 is inserted increases, food placed on the tray 1001 may be shown to have a large size, and because an area occupied by the tray 1001 in the monitoring image decreases as the height at which the tray 1001 is inserted decreases, food placed on the tray 1001 may be shown to have a small size. Accordingly, according to an embodiment of the disclosure, the home appliance 1000 may adjust the size of the crop area according to the height at which the tray 1001 is inserted, so as to provide a monitoring image including the tray 1001 (or food) having a uniform size, even when the height at which the tray 1001 is inserted is changed. For example, the size of the crop area may be increased as the height at which the tray 1001 is inserted increases, and the size of the crop area may be reduced as the height at which the tray 1001 is inserted decreases.

According to an embodiment of the disclosure, the home appliance 1000 may determine the height at which the tray 1001 is inserted, with a crop table prestored in the memory 1800, and determine the size of the crop area. For example, referring to FIG. 12A, a crop table 1210 in which a height of the tray 1001 (e.g., a height of a shelf at which the tray 1001 is inserted) and the size of a crop area are matched with each other may be stored in the memory 1800 of the home appliance 1000. In this case, the home appliance 1000 may search the crop table 1210 for the size of the crop area based on the height of the tray 1001. An area and ratio of a crop area included in the crop table 1210 may correspond to an area and ratio occupied by the tray 1001 in the first image. For example, the crop table 1210 may correspond to the area table 500 in FIG. 5.

According to an embodiment of the disclosure, when it is identified that the tray 1001 is inserted into the shelf of the first level positioned lowest from among the shelves 1002, the home appliance 1000 may determine the size of the crop area as a first size (e.g., 100-120 cm$^2$) based on the crop table 1210. In addition, the home appliance 100 may, when it is identified that the tray 1001 is inserted into the shelf of the second level, determine the size of the crop area as a second size (e.g., 140-170 cm$^2$), when it is identified that the tray 1001 is inserted into the shelf of the third level, determine the size of the crop area as a third size (e.g., 180-250 cm$^2$), and when the tray 1001 is inserted into the shelf of the fourth level, determine the size of the crop area as a fourth size (e.g., 280 cm$^2$).

In addition, a ratio of a crop area may be defined in the crop table 1210. For example, in the crop table 1210, a first area occupied by the tray 1001 inserted into the shelf of the first height (first level) in the first image may be defined as a reference size of a crop area. In addition, in the crop table 1210, a size of a crop area corresponding to the height of the first level may be defined as 1 times the reference size, a size of a crop area corresponding to the height of the second level may be defined as 1.2 times the reference size, a size of a crop area corresponding to the height of the third level may be defined as 1.3 times the reference size, and a size of a crop area corresponding to the height of the fourth level may be defined as 1.4 times the reference size. Sizes of a crop area included in the crop table 210 may be based on an experiment result and may have values inferred through an AI model.

According to an embodiment of the disclosure, the home appliance may, based on the crop table 1210, determine the size of the crop area as the reference size when the tray 1001 is inserted into the shelf of the first level, determine the size of the crop area as 1.2 times the reference size when the tray 1001 is inserted into the shelf of the second level, determine the size of the crop area as 1.3 times the reference size when the tray 1001 is inserted into the shelf of the third level, and determine the size of the crop area as 1.4 times the reference size when the tray 1001 is inserted into the shelf of the fourth level.

In operation S1140, the home appliance 1000 according to an embodiment may obtain a second image by cropping a portion of a peripheral area of the first image based on the size of the crop area determined according to the height at which the tray 1001 is inserted. According to an embodiment of the disclosure, because the size of the crop area is determined in proportion to the height at which the tray 1001 is inserted, a ratio occupied by the tray 1001 (or food) in the second image may be constant, even when the height at which the tray 1001 is inserted is changed.

Figure 12A:
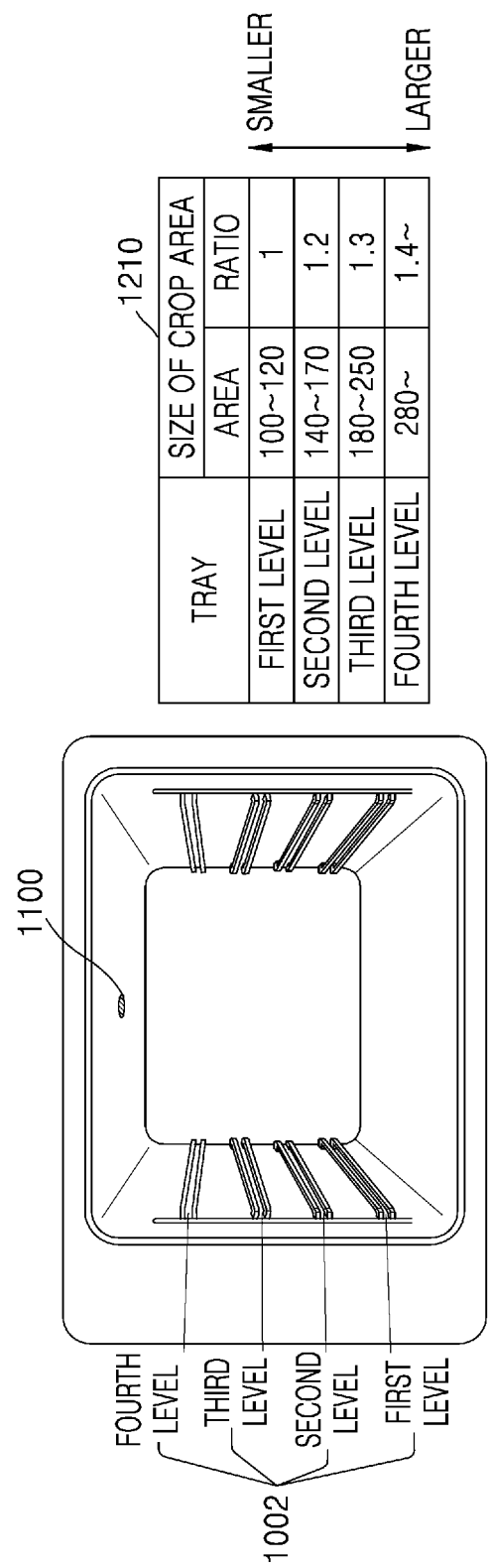
FIG. 12A is a diagram for describing an operation of determining, by the home appliance, the size of a crop area according to a height at which a tray is inserted, according to an embodiment of the disclosure.
Figure 12B:
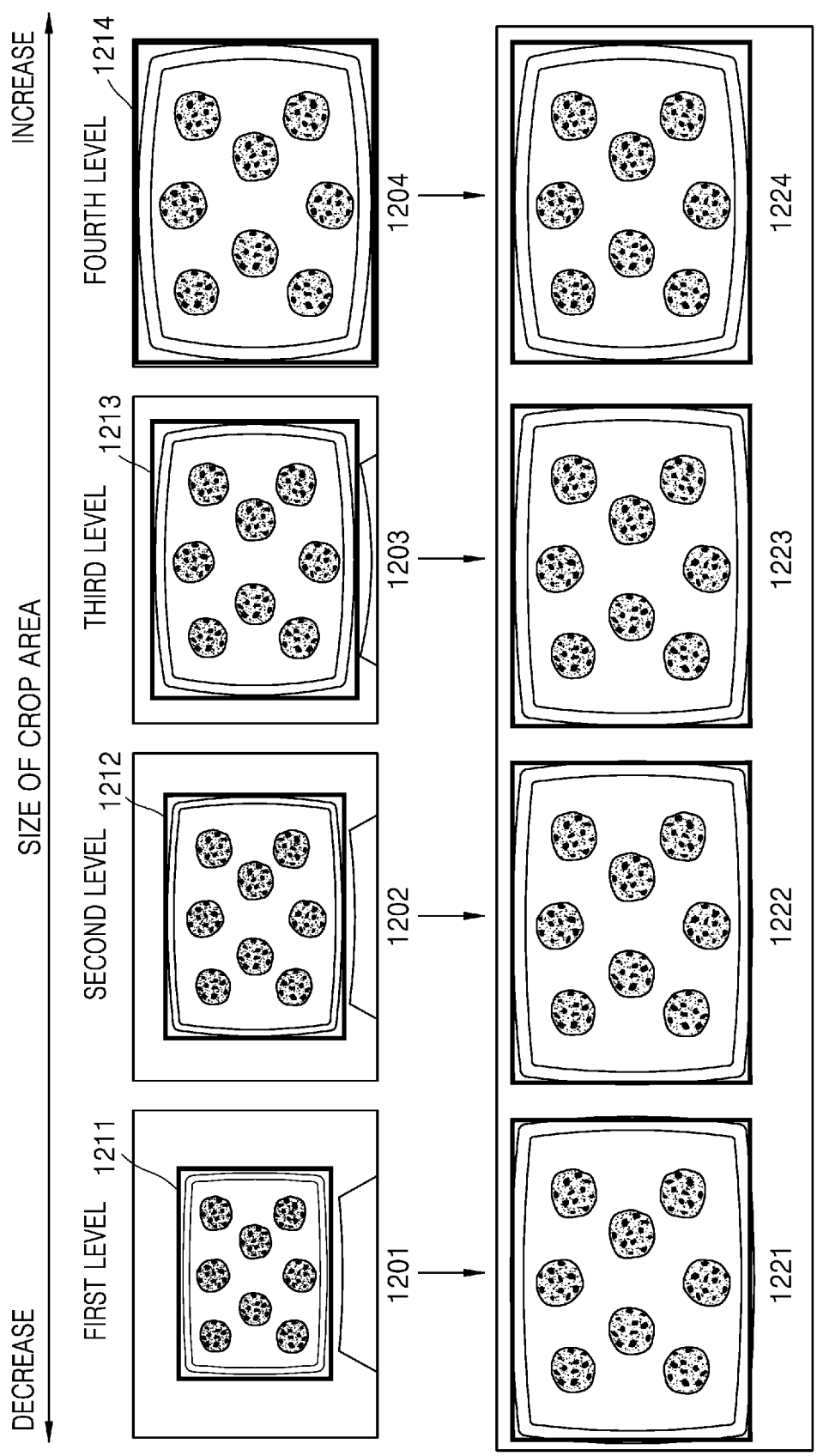
FIG. 12B is a diagram for describing an operation of obtaining, by a home appliance, a monitoring image by applying the size of a crop area, according to an embodiment of the disclosure.

Referring to FIG. 12B, the home appliance 1000 may obtain a $1^{st}$-$1^{st}$ image 1201 including the tray 1001 inserted into the shelf of the first level. In this case, the home appliance 1000 may determine a size of a crop area as the first size (100-120 cm$^2$) based on the height of the tray 1001. The home appliance 1000 may determine a first crop area 1211 in the $1^{st}$-$1^{st}$ image 1201 based on the first size. In this case, the home appliance 1000 may remove a portion of the $1^{st}$-$1^{st}$ area 1201 other than the first crop area and then enlarge the first crop area 1211 at a certain ratio, so that a $2^{nd}$-$1^{st}$ image 1221 is obtained.

In addition, when a $1^{st}$-$2^{nd}$ image 1202 including the tray 1001 inserted into the shelf of the second level is obtained, the home appliance 1000 may determine a size of a crop area as the second size (140-170 cm$^2$) based on the height of the tray 1001. The home appliance 1000 may determine a second crop area 1212 in the $1^{st}$-$2^{nd}$ image 1202 based on the second size and enlarge the second crop area 1212 at a certain ratio, so that a $2^{nd}$-$2^{nd}$ image 1222 is obtained.

When a $1^{st}$-$3^{rd}$ image 1203 including the tray 1001 inserted into the shelf of the third level is obtained, the home appliance 1000 may determine a size of a crop area as the third size (180-250 cm$^2$) based on the height of the tray 1001. The home appliance 1000 may determine a third crop area 1213 in the $1^{st}$-$3^{rd}$ image 1203 based on the third size and enlarge the third crop area 1213 at a certain ratio, so that a $2^{nd}$-$3^{rd}$ image 1223 is obtained.

When a $1^{st}$-$4^{th}$ image 1204 including the tray 1001 inserted into the shelf of the fourth level is obtained, the home appliance 1000 may determine a size of a crop area as the fourth size (280 cm$^2$) based on the height of the tray 1001. The home appliance 1000 may determine a fourth crop area 1214 in the $1^{st}$-$4^{th}$ image 1204 based on the fourth size and enlarge the fourth crop area 1214 at a certain ratio, so that a $2^{nd}$-$4^{th}$ image 1224 is obtained.

According to an embodiment of the disclosure, the $2^{nd}$-$1^{st}$ image 1221, the $2^{nd}$-$2^{nd}$ image 1222, the $2^{nd}$-$3^{rd}$ image 1223, and the $2^{nd}$-$4^{th}$ image 1224 may be output through a display unit of the home appliance 1000 as monitoring images. In this case, in the $2^{nd}$-$1^{st}$ image 1221, the $2^{nd}$-$2^{nd}$ image 1222, the $2^{nd}$-$3^{rd}$ image 1223, and the $2^{nd}$-$4^{th}$ image 1224, food placed on the tray 1001 may be shown of a constant size. Accordingly, according to an embodiment of the disclosure, a size of food that appears in a monitoring image is constant, even when the height at which the tray 1001 is inserted is changed, so that a user may easily identify a cooking state of the food.

Figure 13:
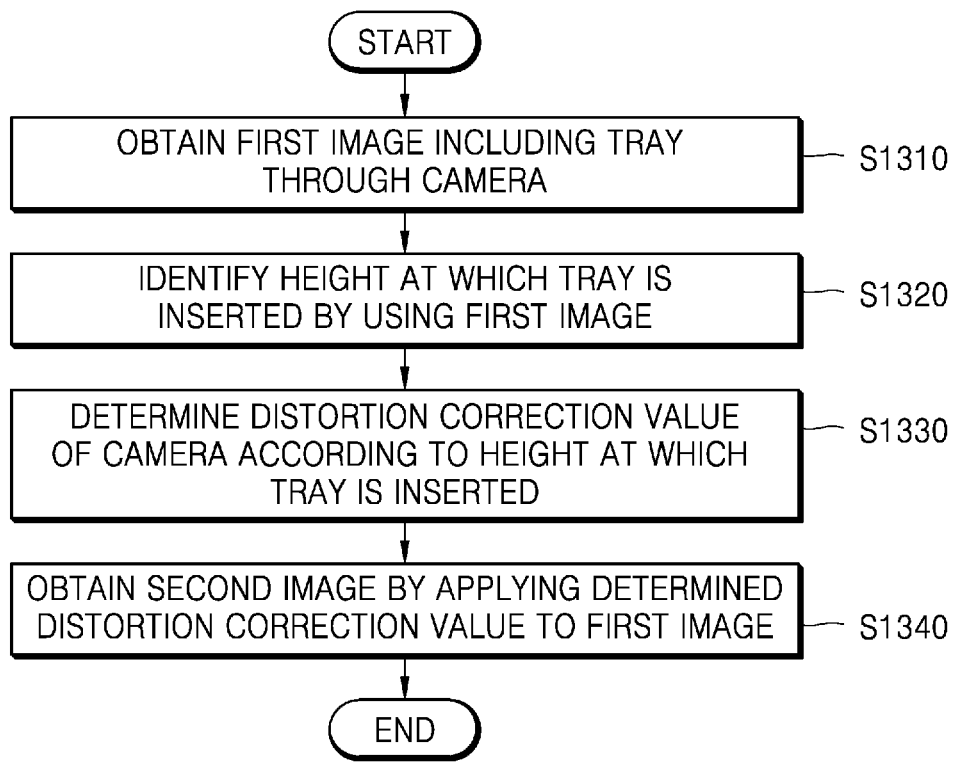
FIG. 13 is a flowchart of a method of determining, by a home appliance, a distortion correction value of a camera according to a height at which a tray is inserted, according to an embodiment of the disclosure.

FIG. 13 is a flowchart of a method of determining, by a home appliance, a distortion correction value of a camera according to a height at which a tray is inserted, according to an embodiment of the disclosure.

In operation S1310, the home appliance 1000 according to an embodiment of the disclosure may obtain a first image including the tray 1001 through the camera 1100. Here, the first image may include an initial image for identifying a height at which the tray 1001 is inserted. Operation S1310 corresponds to operation S410 in FIG. 4, and redundant descriptions thereof are omitted.

In operation S1320, the home appliance 1000 according to an embodiment of the disclosure may identify the height at which the tray 1001 is inserted by using the first image. For example, the home appliance 1000 may perform edge detection on the first image and determine an area occupied by the tray 1001 in the first image, and identify the height at which the tray 1001 is inserted based on the area occupied by the tray 1001. The home appliance 1000 may also identify the height at which the tray 1001 is inserted based on the number of markers included in the first image. The home appliance 1000 may analyze the first image and extract at least two markers arranged at a constant interval on the tray 1001, and identify the height at which the tray 1001 is inserted based on an interval between the extracted markers. Operation S1320 corresponds to operation S420 in FIG. 4, and redundant descriptions thereof are omitted.

In operation S1330, the home appliance 1000 according to an embodiment of the disclosure may determine a distortion correction value of the camera 1100 according to the height at which the tray 1001 is inserted.

When the camera 1100 is a wide-angle camera, distortion by a wide-angle lens may occur in the first image. For example, referring to FIG. 14A, in a wide-angle camera, when a shooting distance to a subject decreases, Barrel distortion 1411 in which a central portion becomes large and prominent may occur, and in contrast, when a shooting distance to the subject increases, a pincushion distortion 1412 in the form of a depression in the middle may occur. In a case of the interior space of the home appliance 1000, a distance between the camera 1100 and the tray 1001 is not far, and thus, Barrel distortion 1411 may occur rather than pincushion distortion 1412. Meanwhile, because the camera 1100 is arranged on the ceiling of the interior space, the distance between the camera 1100 and the tray 1001 decreases as the height at which the tray 1001 is inserted increases, and thus, in the first image, a distortion value (ΔH) by the Barrel distortion 1411 may increase.

Figure 14A:
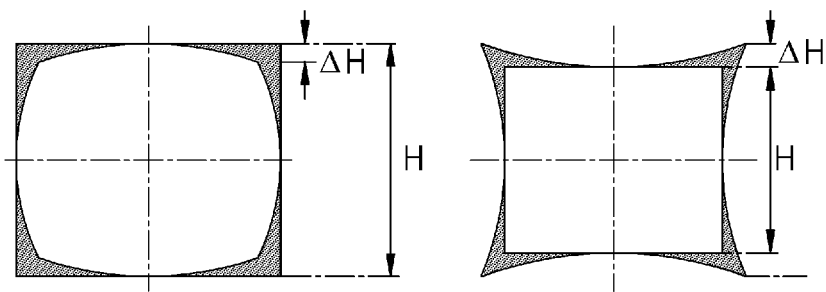
FIG. 14A is a diagram for describing distortion by a camera according to an embodiment of the disclosure.
Figure 14B:
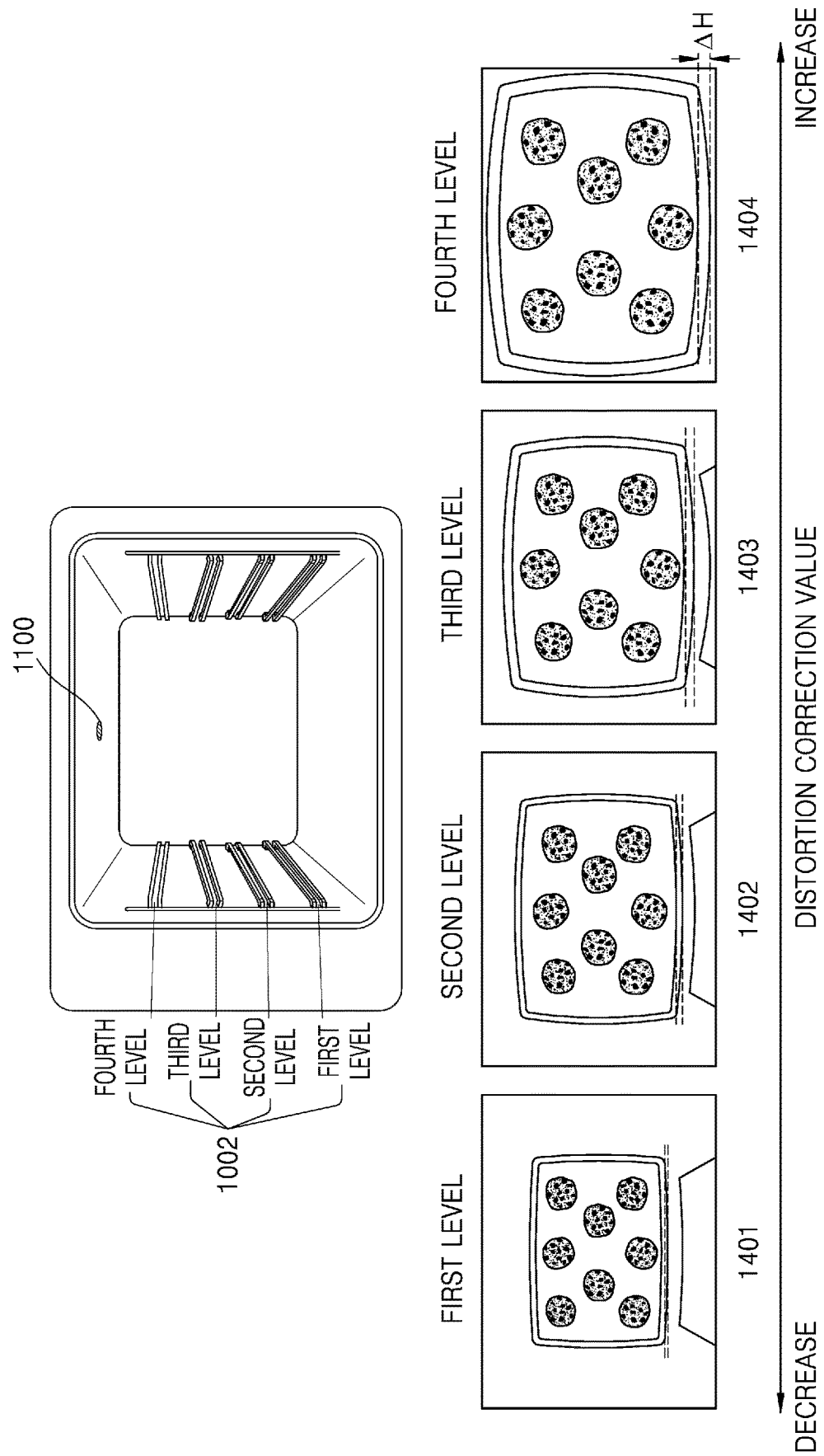
FIG. 14B is a diagram for describing an operation of determining, by a home appliance, a distortion correction value of a camera according to a height at which a tray is inserted, according to an embodiment of the disclosure.

Accordingly, referring to FIG. 14B, the home appliance 1000 may determine a distortion correction value (also referred to as a distortion coefficient) to be high as the height at which the tray 1001 is inserted increases, and determine a distortion correction value to be low as the height at which the tray 1001 is inserted decreases. Here, the distortion correction value may include a value for canceling a distortion value (ΔH) appearing in the first image. The distortion correction value may be based on an experiment result and may be a value inferred through an AI model.

According to an embodiment of the disclosure, the home appliance 1000 may determine a distortion correction value according to the height of the tray 1001 by using a distortion correction table prestored in the memory 1800. The distortion correction table may include a table in which a height of the tray 1001 and a distortion correction value are matched with each other. For example, the home appliance 1000 may, when a $1^{st}$-$1^{st}$ image 1401 including the tray 1001 inserted into the shelf of the first level is obtained, determine a first distortion correction value corresponding to a height of the first level, when a $1^{st}$-$2^{nd}$ image 1402 including the tray 1001 inserted into the shelf of the second level is obtained, determine a second distortion correction value corresponding to a height of the second level, when a $1^{st}$-$3^{rd}$ image 1403 including the tray 1001 inserted into the shelf of the third level is obtained, determine a third distortion correction value corresponding to a height of the third level, and when a $1^{st}$-$4^{th}$ image 1404 including the tray 1001 inserted into the shelf of the fourth level is obtained, determine a fourth distortion correction value corresponding to a height of the fourth level. In this case, the second distortion correction value may be greater than the first distortion correction value, the third distortion correction value may be greater than the second distortion correction value, and the fourth distortion correction value may be greater than the third distortion correction value.

In operation S1340, the home appliance 1000 according to an embodiment may obtain a second image by applying, to the first image, a distortion correction value determined according to the height at which the tray 1001 is inserted. For example, the home appliance 1000 may obtain a second image by post-processing the first image based on the distortion correction value. In this case, as distortion increases in the first image, a larger distortion correction value is applied to the first image to obtain the second image. Thus, a monitoring image of a constant shape (e.g., an image in which distortion is almost canceled) may be obtained, even when the height of the tray 1001 is changed.

Figure 15A:
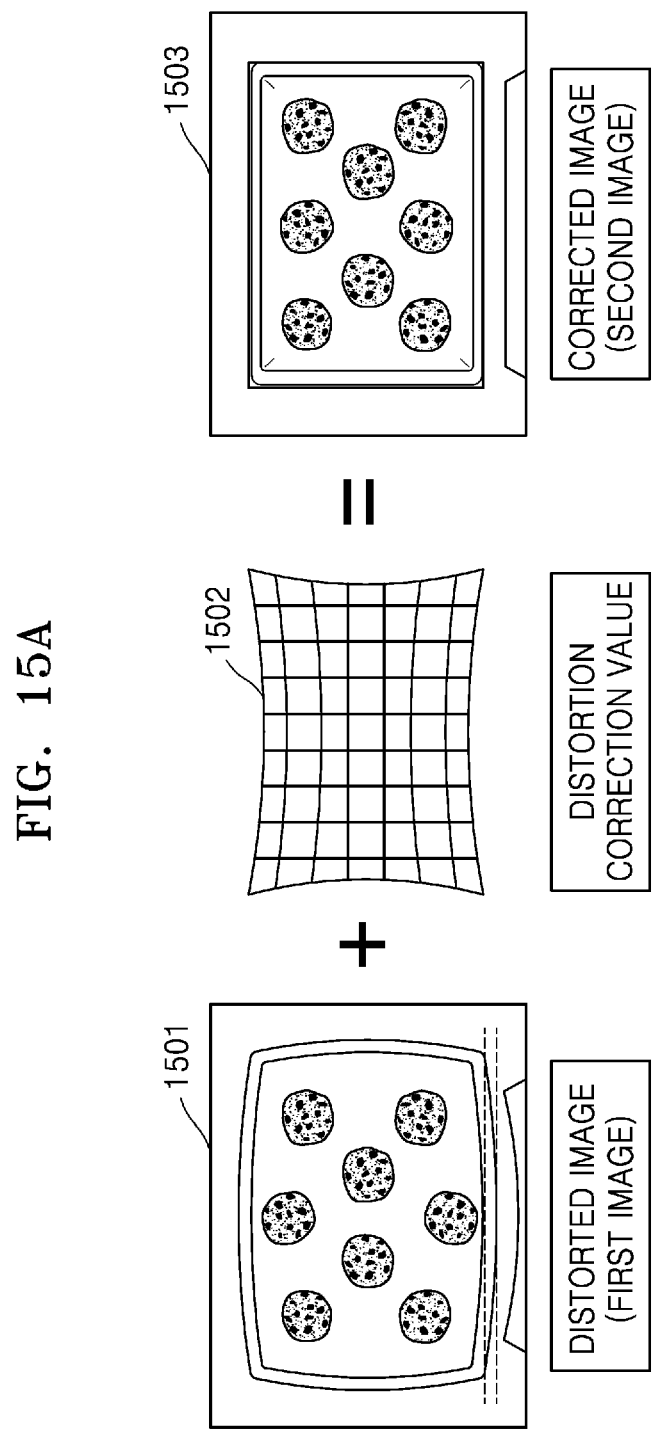
FIGS. 15A and 15B are diagrams for describing an operation of applying, by a home appliance, a distortion correction value of a camera, according to an embodiment of the disclosure.
Figure 15B:
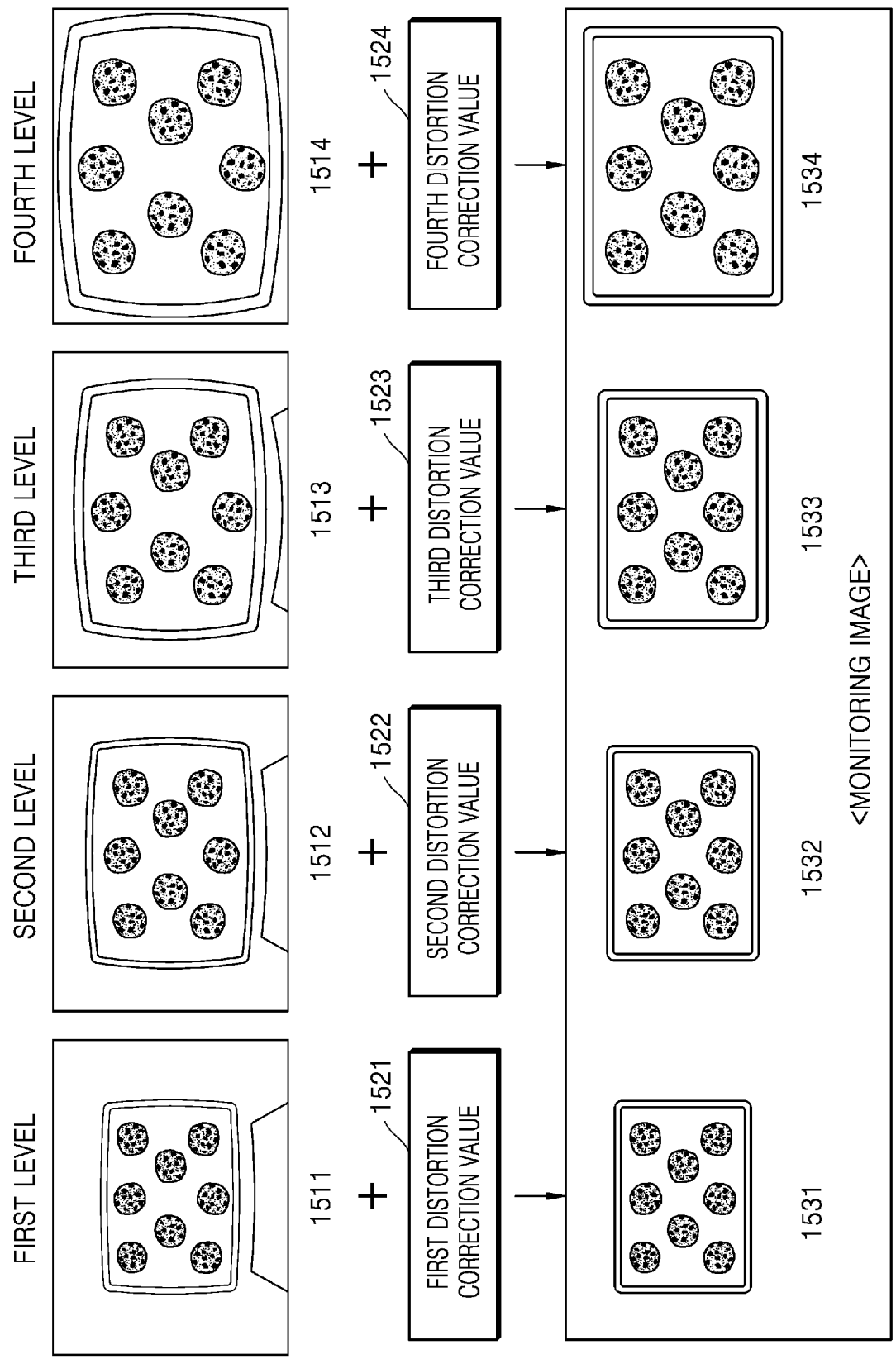

FIGS. 15A and 15B are diagrams for describing an operation of applying, by a home appliance, a distortion correction value of a camera, according to an embodiment of the disclosure.

Referring to FIG. 15A, the home appliance 1000 may obtain a first image 1501 including the tray 1001. The first image 1501 may include a distorted image including Barrel distortion. The home appliance 1000 may identify a height at which the tray 1001 is inserted, and determine a distortion correction value 1502 corresponding to the height at which the tray 1001 is inserted, by using a prestored distortion correction table. In addition, the home appliance 1000 may obtain a second image 1503 by post-processing by applying the distortion correction value 1502 to the first image 1501. The second image 1503 may be a corrected image in which distortion is canceled.

Referring to FIG. 15B, when a $1^{st}$-$1^{st}$ image 1511 including the tray 1001 inserted into the shelf of the first level is obtained, the home appliance 1000 may determine a first distortion correction value 1521 corresponding to a height of the first level and apply the first distortion correction value 1521 to the $1^{st}$-$1^{st}$ image 1511 so that a $2^{nd}$-$1^{st}$ image 1531 is obtained.

When a $1^{st}$-$2^{nd}$ image 1512 including the tray 1001 inserted into the shelf of the second level is obtained, the home appliance 1000 may determine a second distortion correction value 1522 corresponding to a height of the second level and apply the second distortion correction value 1522 to the $1^{st}$-$2^{nd}$ image 1512 so that a $2^{nd}$-$2^{nd}$ image 1532 is obtained.

When a $1^{st}$-$3^{rd}$ image 1513 including the tray 1001 inserted into the shelf of the third level is obtained, the home appliance 1000 may determine a third distortion correction value 1523 corresponding to a height of the third level and apply the third distortion correction value 1523 to the $1^{st}$-$3^{rd}$ image 1513 so that a $2^{nd}$-$3^{rd}$ image 1533 is obtained.

When a $1^{st}$-$4^{th}$ image 1514 including the tray 1001 inserted into the shelf of the fourth level is obtained, the home appliance 1000 may determine a fourth distortion correction value 1524 corresponding to a height of the fourth level and apply the fourth distortion correction value 1524 to the $1^{st}$-$4^{th}$ image 1514 so that a $2^{nd}$-$4^{th}$ image 1534 is obtained.

According to an embodiment of the disclosure, the $2^{nd}$-$1^{st}$ image 1531, the $2^{nd}$-$2^{nd}$ image 1532, the $2^{nd}$-$3^{rd}$ image 1533, and the $2^{nd}$-$4^{th}$ image 1534 may be output through a display unit of the home appliance 1000 as monitoring images. In this case, in the $2^{nd}$-$1^{st}$ image 1531, the $2^{nd}$-$2^{nd}$ image 1532, the $2^{nd}$-$3^{rd}$ image 1533, and the $2^{nd}$-$4^{th}$ image 1534, food placed on the tray 1001 may be shown in a shape in which distortion is corrected. Accordingly, according to an embodiment of the disclosure, a shape of food that appears in a monitoring image is constant, even when the height at which the tray 1001 is inserted is changed, so that a user may easily identify a cooking state of the food.

In addition, the home appliance 1000 may recognize food ingredients placed on the tray 1001 from the $2^{nd}$-$1^{st}$ image 1531, the $2^{nd}$-$2^{nd}$ image 1532, the $2^{nd}$-$3^{rd}$ image 1533, and the $2^{nd}$-$4^{th}$ image 1534, and provide recipe information appropriate for the food ingredients. In this case, in the $2^{nd}$-$1^{st}$ image 1531, the $2^{nd}$-$2^{nd}$ image 1532, the $2^{nd}$-$3^{rd}$ image 1533, and the $2^{nd}$-$4^{th}$ image 1534, because the food ingredients placed on the tray 1001 are shown where distortion thereof is canceled, a food ingredient recognition rate of the home appliance 1000 may increase.

FIG. 16 is a diagram for describing an operation of adjusting the size of a crop area and a distortion correction value according to a height at which a tray is inserted, according to an embodiment of the disclosure.

Referring to FIG. 16, the home appliance 1000 may determine a size of a crop area and a distortion correction value according to a height at which the tray 1001 is inserted. For example, the home appliance 1000 may determine the size of the crop area and the distortion correction value by using a crop table and a distortion correction table. In addition, when a first image of the interior space of the home appliance is obtained through the camera 1100, the home appliance 1000 may apply the size of the crop area and the distortion correction value to the first image (operation S1610) and obtain a second image.

For example, the home appliance 1000 may obtain a $1^{st}$-$1^{st}$ image 1601 including the tray 1001 inserted into the shelf of the first level. In this case, the home appliance 1000 may determine the size of the crop area as the first size (100-120 cm$^2$) based on a height of the tray 1001, and determine the distortion correction value as a first distortion correction value. The home appliance may determine a first crop area 1611 in the $1^{st}$-$1^{st}$ image 1601 based on the first size and the first distortion correction value and perform distortion correction on the first crop area 1611. In this case, the home appliance 1000 may remove a portion other than the first crop area 1611 from the $1^{st}$-$1^{st}$ image 1601, then enlarge the first crop area 1611 at a certain ratio, and correct distortion in the first crop area 1611, so that a $2^{nd}$-$1^{st}$ image 1621 is obtained.

In addition, when a $1^{st}$-$2^{nd}$ image 1602 including the tray 1001 inserted into the shelf of the second level is obtained, the home appliance 1000 may determine the size of the crop area as the second size (140-170 cm$^2$), and determine the distortion correction value as a second distortion correction value. In this case, the second distortion correction value may be greater than the first distortion correction value. The home appliance 1000 may determine a crop area 1612 in the $1^{st}$-$2^{nd}$ image 1602 based on the second size and the second distortion correction value, enlarge the second crop area 1612 at a certain ratio, and perform distortion correction on the second crop area 1612, so that a $2^{nd}$-$2^{nd}$ image 1622 is obtained.

When a $1^{st}$-$3^{rd}$ image 1603 including the tray 1001 inserted into the shelf of the third level is obtained, the home appliance 1000 may determine the size of the crop area as the third size (180-250 cm$^2$) based on the height of the tray 1001 and determine the distortion correction value as a third distortion correction value. In this case, the third distortion correction value may be greater than the second distortion correction value. The home appliance 1000 may determine a third crop area 1613 in the $1^{st}$-$3^{rd}$ image 1603 based on the third size and the third distortion correction value, enlarge the third crop area 1613 at a certain ratio, and perform distortion correction on the third crop area 1613, so that a $2^{nd}$-$3^{rd}$ image 1623 is obtained.

When a $1^{st}$-$4^{th}$ image 1604 including the tray 1001 inserted into the shelf of the fourth level is obtained, the home appliance 1000 may determine the size of the crop area as the fourth size (280 cm$^2$) based on the height of the tray 1001 and determine the distortion correction value as a fourth distortion correction value. In this case, the fourth distortion correction value may be greater than the third distortion correction value. The home appliance 1000 may determine a fourth crop area 1614 in the $1^{st}$-$4^{th}$ image 1604 based on the fourth size and the fourth distortion correction value, enlarge the fourth crop area 1614 at a certain ratio, and perform distortion correction on the fourth crop area 1614, so that a $2^{nd}$-$4^{th}$ image 1624 is obtained.

According to an embodiment, the $2^{nd}$-$1^{st}$ image 1621, the $2^{nd}$-$2^{nd}$ image 1622, the $2^{nd}$-$3^{rd}$ image 1623, and the $2^{nd}$-$4^{th}$ image 1624 may be output through the display unit of the home appliance 1000 as monitoring images. In this case, in the $2^{nd}$-$1^{st}$ image 1621, the $2^{nd}$-$2^{nd}$ image 1622, the $2^{nd}$-$3^{rd}$ image 1623, and the $2^{nd}$-$4^{th}$ image 1624, food placed on the tray 100 may be shown in a constant size and shape. Accordingly, according to an embodiment of the disclosure, even when the height at which the tray 1001 is inserted is changed, a size and shape of food shown in a monitoring image is constant, and thus, a user may easily identify a cooking state of the food.

In addition, the home appliance 1000 may recognize food ingredients placed on the tray 1001 from the $2^{nd}$-$1^{st}$ image 1621, the $2^{nd}$-$2^{nd}$ image 1622, the $2^{nd}$-$3^{rd}$ image 1623, and the $2^{nd}$-$4^{th}$ image 1624, and provide recipe information appropriate for the food ingredients. In this case, in the $2^{nd}$-$1^{st}$ image 1621, the $2^{nd}$-$2^{nd}$ image 1622, the $2^{nd}$-$3^{rd}$ image 1623, and the $2^{nd}$-$4^{th}$ image 1624, sizes of the food ingredients placed on the tray 1001 are the same as each other, and distortion of the food ingredients are corrected, and thus, a food ingredient recognition rate of the home appliance 1000 may increase.

Figure 17:
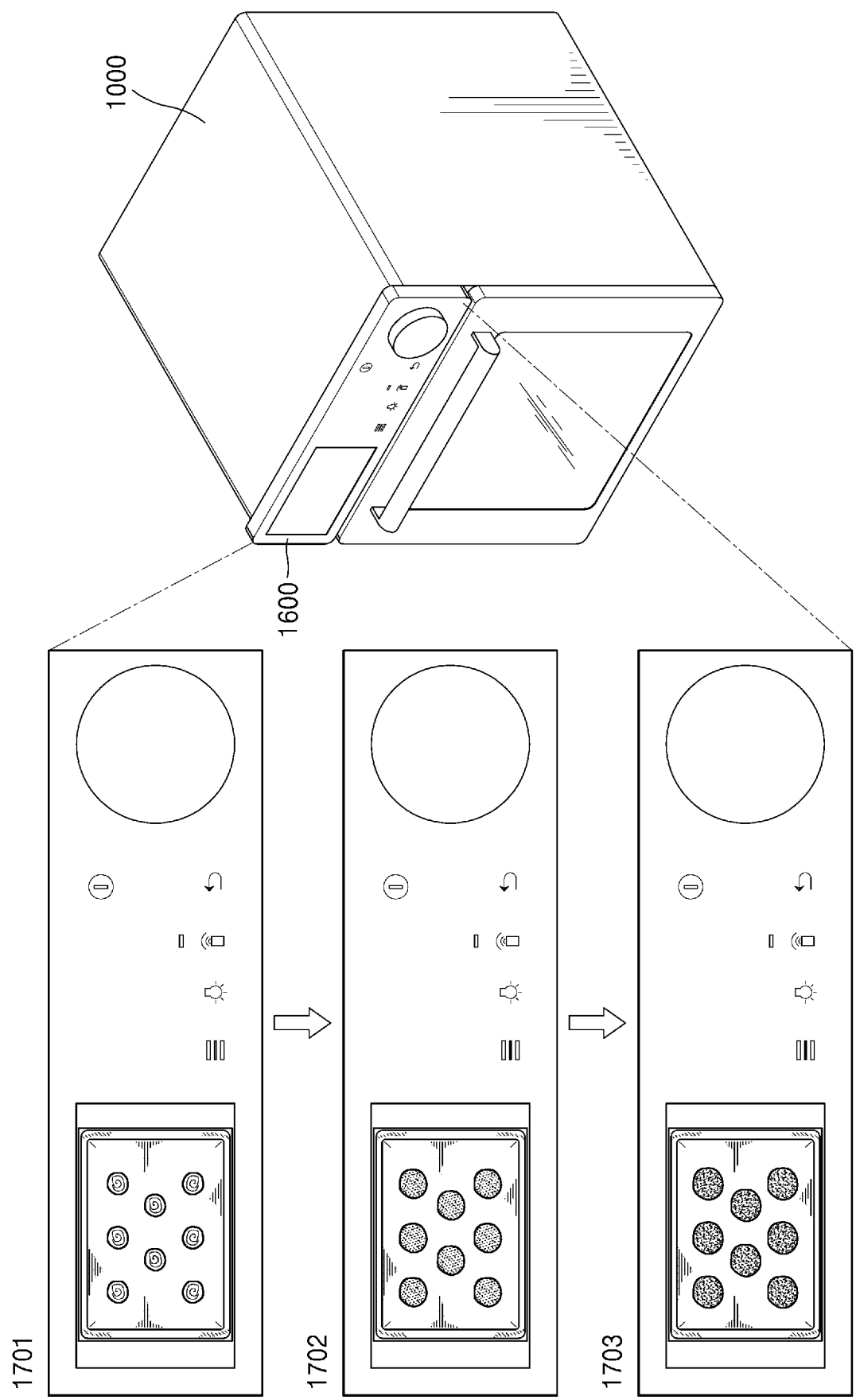
FIG. 17 is a diagram for describing an operation of outputting a second image by a home appliance, according to an embodiment of the disclosure.

FIG. 17 is a diagram for describing an operation of outputting a second image by a home appliance, according to an embodiment of the disclosure.

According to an embodiment of the disclosure, the home appliance 1000 may output, through the user interface 1600, a monitoring image to which a setting value related to capturing of an image of an interior space of the home appliance 2000 determined according to a height of the tray 1001 is applied. For example, the home appliance 1000 may adjust a brightness of the internal lighting 1700 according to a height of the tray 1001, determine the size of a crop area according to the height of the tray 1001, determine a distortion correction value according to the height of the tray 1001 and obtain a monitoring image through the camera 110 in real time. The monitoring image may include an image of the tray 1001 inserted into the interior space. Accordingly, a user may observe a state change of contents placed on the tray 1001 through the monitoring image.

For example, when the user places dough on the tray 1001 and inserts the tray 1001 into the home appliance 1000 to bake bread, the home appliance 1000 may output a monitoring image in real time so that the user may monitor a state of the dough placed on the tray 1001. The home appliance 1000 may output the monitoring image including the contents placed on the tray 1001 from when the operation is started until the operation is finished. Referring to FIG. 17, the home appliance 1000 may output an image of an initial state of dough 1701, an image of an intermediate state of dough 1702, an image of a final state of dough 1703, and the like, so that the user may easily recognize the state of the dough.

According to an embodiment of the disclosure, the home appliance 1000 may also output a monitoring image through a mobile terminal (not shown) of the user. An operation of outputting a monitoring image by a mobile terminal of a user is described later in detail with reference to FIGS. 22 and 23.

Figure 18:
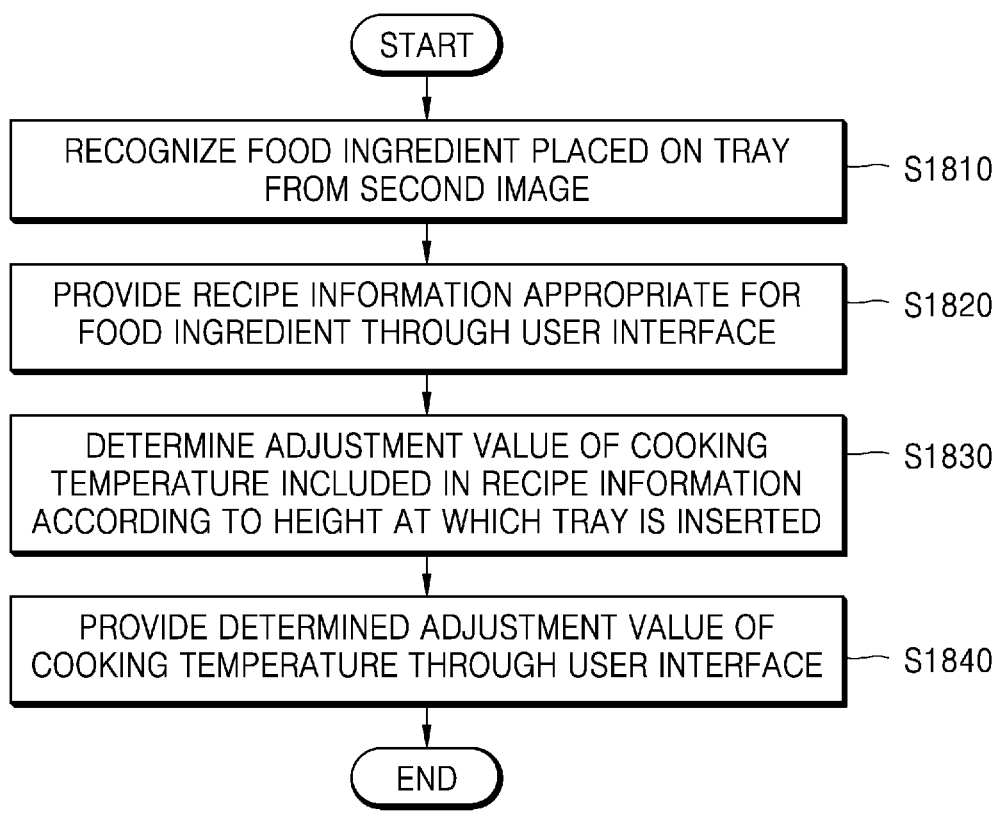
FIG. 18 is a flowchart of a method of determining, by a home appliance, an adjustment value of a cooking temperature included in recipe information according to a height at which a tray is inserted, according to an embodiment of the disclosure.

FIG. 18 is a flowchart of a method of determining, by a home appliance, an adjustment value of a cooking temperature included in recipe information according to a height at which a tray is inserted, according to an embodiment of the disclosure. In FIG. 18, a case in which the home appliance 1000 is an oven is described as an example.

In operation S1810, the home appliance 1000 according to an embodiment of the disclosure may recognize a food ingredient placed on the tray 1001 from a second image. The food ingredient may include meat (beef, pork, chicken, lamb, duck meat, etc.), vegetables (mushroom, broccoli, onion, garlic, etc.), fish, pizza, bread, cookies, etc., but is not limited thereto. The second image may include an image to which a setting value related to capturing of an image of the interior space determined according to a height at which the tray 1001 is inserted is applied. For example, the second image may include an image obtained by adjusting a brightness of the lamp 1700 according to the height at which the tray 1001 is inserted. The second image may include an image which is post-processed based on a size of a crop area or a distortion correction value determined according to the height at which the tray 1001 is inserted.

According to an embodiment of the disclosure, the home appliance 1000 may recognize the food ingredient placed on the tray 1001 by comparing the second image with a prestored food ingredient image list or by using an AI model for object recognition. In this case, when a second image of a similar state to that of a training image of the AI model is obtained, an object recognition rate of the home appliance 1000 may be improved.

For example, in a case in which the brightness of the lamp 1700 is constant regardless of the height of the tray 1001, when the tray 1001 is inserted into the shelf of the fourth level, the food ingredient is recognized too bright, and when the tray 1001 is inserted into the shelf of the first level, the food ingredient is recognized too dark, and thus, the same food ingredient may be recognized as different food ingredients according to the height of the tray 1001. In addition, when distortion is changed according to the height of the tray 1001, the same food ingredient may be recognized as different food ingredients according to the height of the tray 1001. However, according to an embodiment of the disclosure, when the height of the tray 1001 is changed, the home appliance 1000 may adjust the setting value related to capturing of an image and obtain a second image of a uniform state (e.g., uniform brightness, uniform size, and uniform shape). In this case, a state of the second image may be similar to a state of an image provided as training data for an AI model. For example, a size, distortion degree, and brightness of a food ingredient included in the second image may be similar to a size, distortion degree, and brightness of a food ingredient included in the training data for the AI model. Accordingly, the home appliance 1000 may well recognize the food ingredient placed on the tray 1001, regardless of the height of the tray 1001, and thus, the food ingredient recognition rate of the home appliance 1000 may be improved.

In operation S1820, the home appliance 1000 according to an embodiment of the disclosure may provide recipe information appropriate for the food ingredient through the user interface 1600.

According to an embodiment of the disclosure, the home appliance 1000 may store, in the memory 1800, a recipe information in which a food ingredient and recipe information are matched with each other. In the recipe table, a type of food ingredient, a weight of food ingredient, a recipe, a cooking temperature, a cooking mode, a cooking time, a type of the tray 1001, a height of the tray 1001, etc. may be defined. However, the disclosure is not limited thereto.

When the food ingredient placed on the tray 1001 is recognized through an AI model, the home appliance 1000 may search the recipe table for recipe information appropriate for the food ingredient. In addition, the home appliance 1000 may provide the found recipe information to a user through the user interface 1600. For example, when the food ingredient placed on the tray 1001 is scones, the home appliance 1000 may recognize the scones from the second image and search the recipe table for first recipe information appropriate for scones. In addition, the home appliance 1000 may provide the first recipe information (e.g., cooking temperature: 180-190, time: 30-35) appropriate for scones. In this case, when the user presses a start button, the home appliance 1000 may cook the scones according to the recipe information (e.g., cooking temperature: 180-190, time 30-35). Accordingly, according to an embodiment of the disclosure, because the home appliance 1000 automatically recognizes the food ingredient and provides recipe information appropriate for the food ingredient, it is not necessary for the user to additionally set a cooking temperature or cooking time, and thus, the user convenience may be improved.

According to an embodiment of the disclosure, the home appliance 1000 may also output information about the recognized food ingredient together with the recipe information. For example, when the home appliance 1000 recognizes the scones placed on the tray 1001, the home appliance 1000 may display an icon of the scones on the display unit.

In operation S1830, the home appliance 1000 according to an embodiment of the disclosure may determine an adjustment value of a cooking temperature included in the recipe information according to the height at which the tray 1001 is inserted.

According to an embodiment of the disclosure, when an actual height at which the tray 1001 is inserted and a height of the tray 1001 defined in the recipe information are different from each other, the home appliance 1000 may determine the adjustment value of the cooking temperature defined in the recipe information. For example, when the height at which the tray 1001 is actually inserted is greater than the height of the tray 1001 defined in the recipe information, the cooking temperature may be corrected to decrease, and when the height at which the tray 1001 is actually inserted is less than the height of the tray 1001 defined in the recipe information, the cooking temperature may be corrected to increase. For example, in the recipe information, a first cooking temperature when the tray 1001 is inserted into the shelf of the third level is defined. However, when the tray 1001 is actually inserted into the shelf of the first level that is lower than the third level, the home appliance may correct the first cooking temperature included in the recipe information to a second cooking temperature appropriate for the tray 1001 inserted into the shelf of the first level. Here, the second cooking temperature may be greater than the first cooking temperature.

According to an embodiment of the disclosure, the adjustment value of the cooking temperature may be based on an experiment result and may have a value inferred through an AI model. The adjustment value of the cooking temperature may be prestored in the memory 1800 of the home appliance 1000.

According to an embodiment of the disclosure, the home appliance 1000 may an adjustment value of the cooking time included in the recipe information according to the height at which the tray 1001 is inserted. For example, in the recipe information, a first cooking time when the tray 1001 is inserted into the shelf of the third level is defined. However, when the tray 1001 is actually inserted into the shelf of the first level, the home appliance 1000 may correct the first cooking time included in the recipe information to a second cooking time appropriate for the tray 1001 inserted into the shelf of the first level.

In operation S1840, the home appliance 1000 according to an embodiment of the disclosure may provide the determined adjustment value of the cooking temperature through the user interface 1600. The home appliance 1000 may output the adjustment value of the cooking temperature through the display unit or may output the adjustment value of the cooking temperature through a speaker as voice.

According to an embodiment of the disclosure, the home appliance 1000 may display basic recipe information appropriate for the food ingredient together with corrected recipe information including the adjustment value of the cooking temperature. According to another embodiment of the disclosure, the home appliance 1000 may display the corrected recipe information including the adjustment value of the cooking temperature, instead of the basic recipe information appropriate for the food ingredient.

Figure 19:
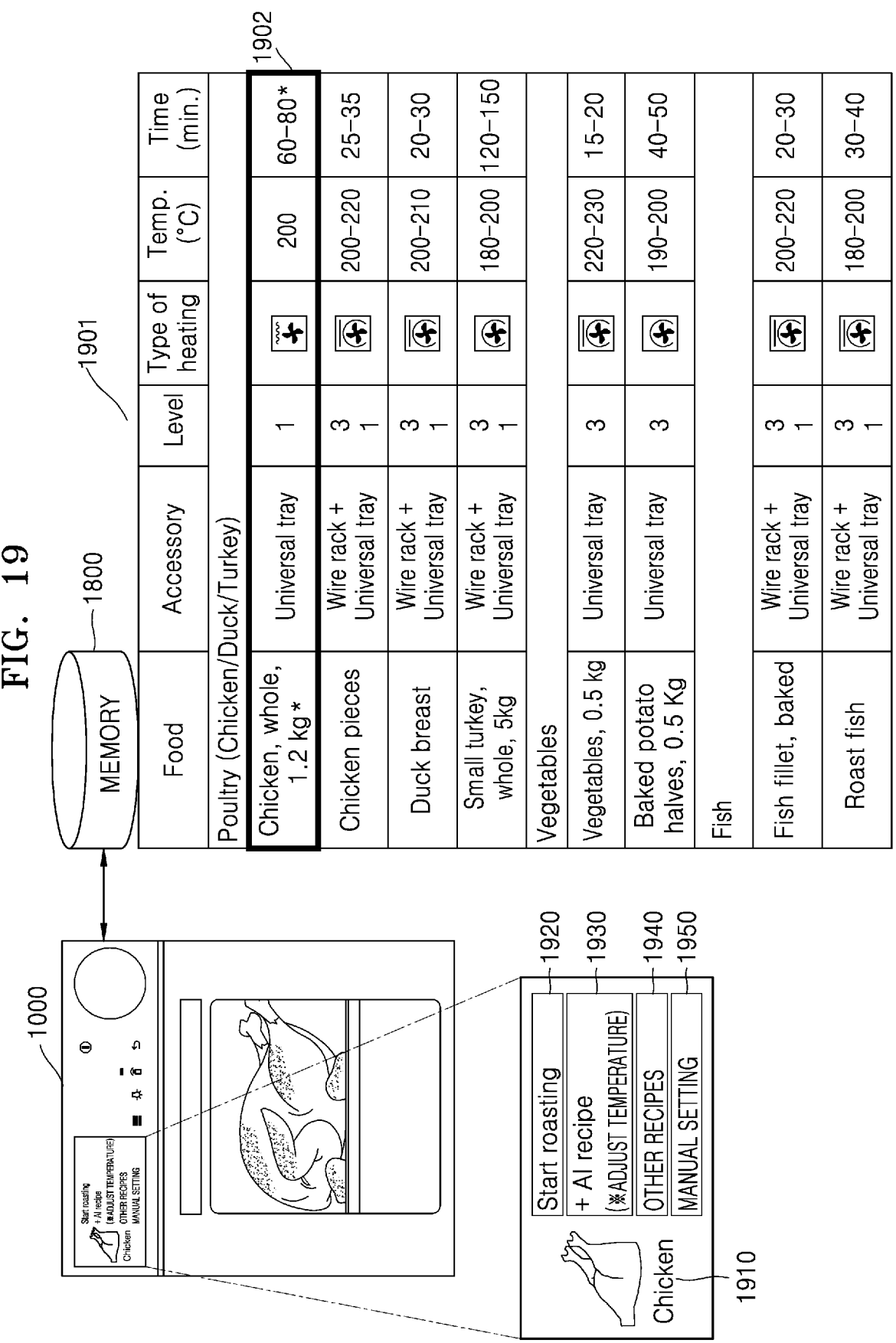
FIG. 19 is a diagram for describing an operation of providing, by a home appliance, recipe information appropriate for food ingredients, according to an embodiment of the disclosure.

According to an embodiment of the disclosure, when the home appliance 1000 displays the basic recipe information and the corrected recipe information together, the user may select one of the basic recipe information and the corrected recipe information. For example, when the user selects the basic recipe information and then presses the start button, the home appliance 1000 may start cooking according to a basic temperature included in the basic recipe information. When the user selects the corrected recipe information and then presses the start button, the home appliance 1000 may start cooking according to a corrected temperature included in the corrected recipe information. FIG. 19 is a diagram for describing an operation of providing, by a home appliance, recipe information appropriate for a food ingredient. In FIG. 19, a case in which the home appliance 1000 is an oven is described as an example.

Referring to FIG. 19, a user may open a door of the home appliance 1000, insert the tray 1001 on which a chicken is placed into the shelf of the third level, and then close the door of the home appliance 1000. In this case, the home appliance 1000 may identify a height at which the tray 1001 is inserted by using one of the methods described with reference to FIGS. 5 to 8. In addition, the home appliance 1000 may obtain a monitoring image by applying a setting value related to capturing of an image of an interior space of the home appliance 1000 determined according to the height at which the tray 1001 is inserted. In this case, the home appliance 1000 may obtain an image of the interior space through the camera 1100 and analyze the image so that the food ingredient placed on the tray 1001 is identified. For example, the home appliance 1000 may identify that the food ingredient placed on the tray 1001 is a chicken by using an AI model for object recognition.

The home appliance 1000 may obtain basic recipe information 1902 corresponding to a chicken from a recipe table 1901 stored in the memory 1800. For example, when the food ingredient is a chicken, the home appliance may obtain the basic recipe information 1902 in which the tray 1001 is inserted into the shelf of the first level, the home appliance 1000 is operated in a fan grill mode, a cooking temperature is set to 200° C., and a cooking time is set to 60 to 80 minutes. Here, the fan grill mode, which is a mode used when grilling meat or fish, may include a mode in which two top heating elements generate heat to be dispersed by a fan.

Meanwhile, when the height at which the tray 1001 is actually inserted and the height of the tray 1001 included in the basic recipe information 1902 are different from each other, the home appliance 1000 may determine an adjustment value of the cooking temperature included in the basic recipe information 1902. For example, in the basic recipe information 1902, it is defined that a cooking temperature when the tray 1001 is inserted into the shelf of the first level is set to 200° C. However, when the tray 1001 is actually inserted into the shelf of the third level that is higher than the first level, the home appliance 1000 may correct the cooking temperature to be reduced from 200° C. to 180° C. Because the home appliance 1000 may include a heating element on the ceiling of the interior space of the home appliance 1000, when the height of the tray 1001 exceeds the height defined in the basic recipe information, the food ingredient may burn or overcook and be improperly cooked, unless the cooking temperature is adjusted.

The home appliance 1000 may provide corrected recipe information including an adjustment value of the corrected cooking temperature together with the basic recipe information corresponding to chicken. In this case, the home appliance 1000 may also display that the food ingredient is a chicken. For example, the home appliance 1000 may provide, through the user interface 1600, identification information 1910 of the food ingredient (e.g., an image of an icon of the food ingredient), a first menu 1920 corresponding to the basic recipe information, and a second menu 1930 corresponding to the corrected recipe information. The second menu 1930 may be displayed as an AI recipe. In addition, the home appliance 1000 may provide, through the user interface 1600, a third menu 1940 for setting another recipe, and a fourth menu 1950 for manually setting a cooking time and a cooking temperature.

In FIG. 19, a case in which a heating element is arranged at an upper end of the interior space of the home appliance 1000 is described as an example. However, the heating element may be arranged at a lower end of the interior space of the home appliance 1000. When the heating element is arranged at the lower end of the interior space, the home appliance 1000 may determine an adjustment value of a cooking temperature differently from when the heating element is arranged at the upper end of the interior space. For example, in the recipe information, it is defined that a cooking temperature when the tray 1001 is inserted into the shelf of the first level is set to 200° C. However, when the tray 1001 is actually inserted into the shelf of the third level that is higher than the first level, the home appliance 1000 may correct the cooking temperature to increase from 200° C. to 220° C.

Figure 20:
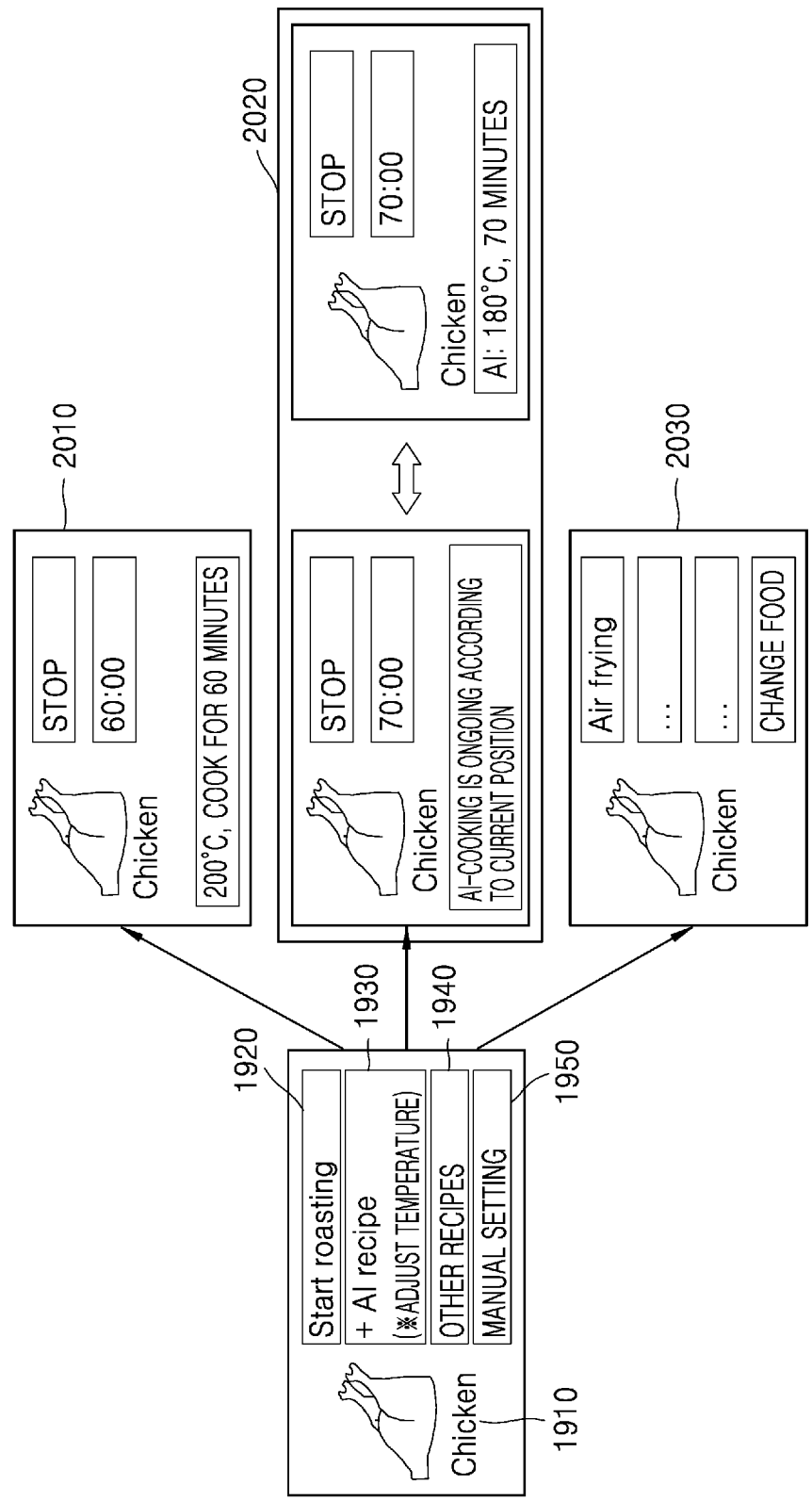
FIG. 20 is a diagram for describing an operation of providing, by a home appliance, an adjustment value of a cooking temperature according to a height at which a tray is inserted, according to an embodiment of the disclosure.

FIG. 20 is a diagram for describing an operation of providing, by a home appliance, an adjustment value of a cooking temperature according to a height at which a tray is inserted, according to an embodiment of the disclosure.

Referring to 2010 in FIG. 20, when the user selects the first menu 1920 from among menus displayed on the user interface 1600 in FIG. 19, the home appliance 1000 may start cooking (e.g., roasting) according to the basic recipe information and display the basic recipe information on the screen. For example, because the food ingredient placed on the tray 1001 is a chicken, the home appliance 1000 may display the first cooking temperature (200° C.) and the first cooking time (60 minutes) corresponding to grilling chicken.

Referring to 2020 in FIG. 20, when the user selects the second menu 1930 from among the menus displayed on the user interface 1600 in FIG. 9, the home appliance 100 may start cooking (e.g., roasting) according to the corrected recipe information and display the corrected recipe information on the screen. For example, in the basic recipe information corresponding to chicken, a first cooking temperature when the tray 1001 is inserted into the shelf of the first level is defined. However, when the tray 1001 is inserted into the shelf of the third level that is higher than the first level, the home appliance 1000 may correct the cooking temperature to be low from the first cooking temperature (200° C.) to the second cooking temperature (180° C.). In this case, because the home appliance 1000 adjusts the cooking temperature to be low, a cooking time may be additionally increased, or an intensity of hot air may be further increased. For example, the home appliance 1000 may change the first cooking time (60 minutes) to the second cooking time (70 minutes), or may adjust the intensity of hot air from a first intensity to a second intensity. In addition, when the user selects the second menu 1930, the home appliance 1000 may perform a cooking operation at the second cooking temperature (180° C.) and the second cooking time (70 minutes) and display, on the display unit, a notification that cooking is being performed (e.g., AI is cooking according to current tray position) according to the corrected recipe information, or the second cooking temperature (180° C.) and the second cooking time (70 minutes).

According to an embodiment of the disclosure, when the height at which the tray 1001 is actually inserted and the height of the tray 1001 included in the basic recipe information are the same as each other, the home appliance 1000 may not provide the second menu 1930.

Referring to 2030 in FIG. 20, when the user selects the third menu 1940 from among the menus displayed on the user interface 1600 in FIG. 19, the home appliance 1000 may provide a graphical user interface (GUI) for selecting other recipes. In this case, the user may change the cooking method from roasting to air frying. In addition, when the home appliance 1000 erroneously recognizes the food ingredient, the user may change the food through the GUI. For example, although the actual food ingredient is a duck meat, when the home apparatus 100 recognizes the duck meat as a chicken, the user may change chicken to duck meat through the GUI. In this case, the home appliance 100 may display a duck meat icon instead of a chicken icon and recommend recipe information appropriate for duck meat.

In FIGS. 19 and 20, when the height at which the tray 1001 is actually inserted and the height of the tray 1001 included in the basic recipe information are different from each other, the home appliance 1000 corrects the cooking temperature according to the actual height of the tray 100. However, the disclosure is not limited thereto. According to another embodiment of the disclosure, when the height of the tray 1001 included in the basic recipe information and the height at which the tray 1001 is actually inserted are different from each other, the home appliance 1000 may provide a notification to change the height of the tray 1001 to the height of the tray 1001 included in the basic recipe information. For example, in the basic recipe information, a cooking temperature when the tray 1001 is inserted into the shelf of the first level is defined. However, when the tray 1001 is actually inserted into the shelf of the third level that is higher than the first level, the home appliance 1000 may provide a notification to insert the tray 1001 into the shelf of the first level.

Figure 21:
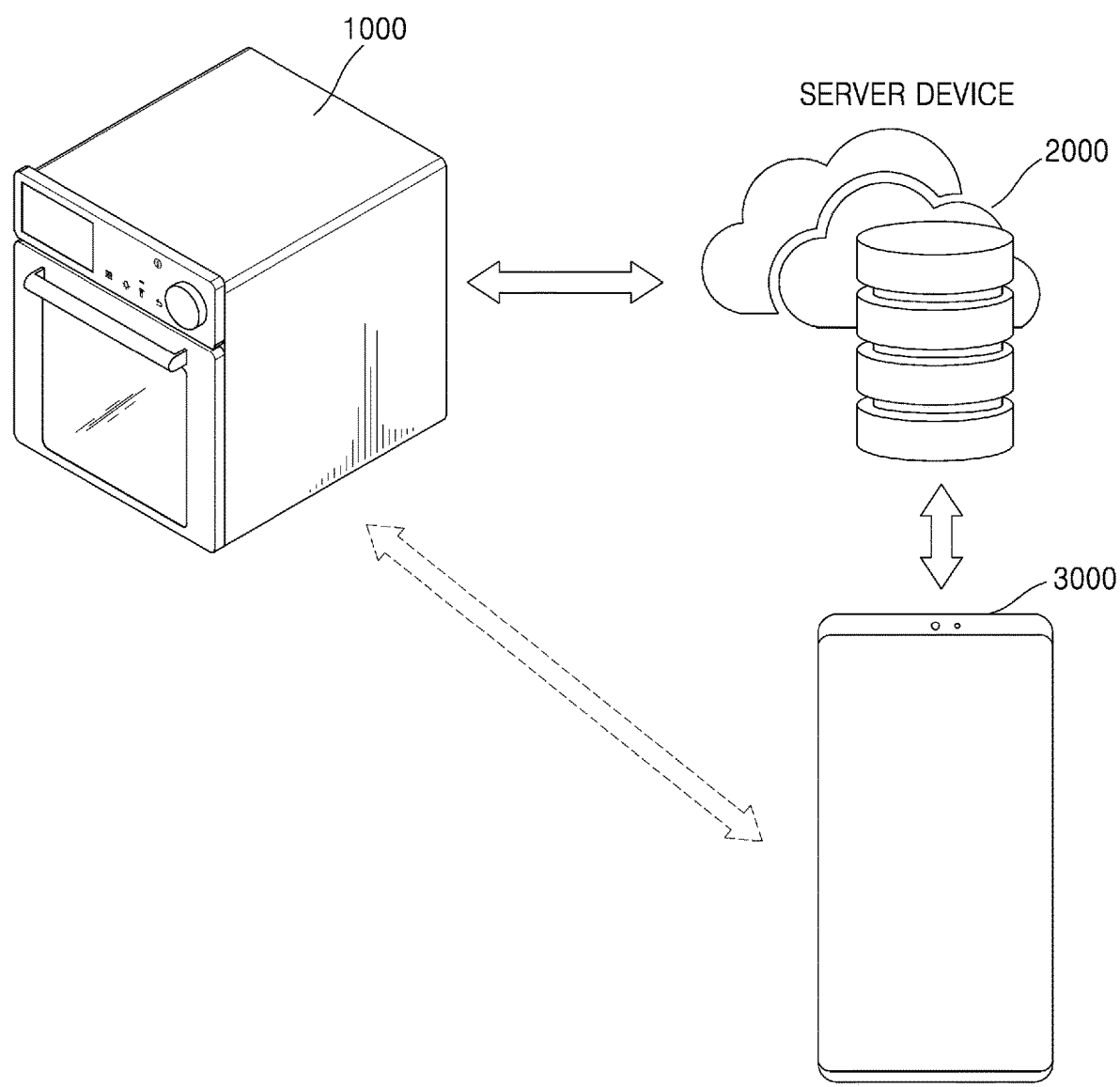
FIG. 21 is a diagram for describing an operation of a home appliance interworking with a server device, according to an embodiment of the disclosure.

FIG. 21 is a diagram for describing an operation of a home appliance interworking with a server device, according to an embodiment of the disclosure.

Referring to FIG. 21, according to an embodiment of the disclosure, the home appliance 1000 may interwork with a server device 2000 and a display device 3000.

According to an embodiment of the disclosure, the server device 2000 may include a communication interface for performing communication with an external device. The server device 2000 may perform communication with the home appliance 1000 or the display device 3000 via the communication interface. According to an embodiment of the disclosure, the home appliance 1000 may access the server device 2000 by transmitting identification information of the home appliance 1000 or identification information (login information and account information) of a user to the server device 2000 and receiving, from the server device 2000, authentication as to the identification information of the home appliance 1000 or the identification information (login information and account information) of the user.

According to an embodiment of the disclosure, the server device 2000 may include an AI processor. The AI processor may train an artificial neural network and generate an AI model for recognizing an object (e.g., a food ingredient, tableware, etc.). "Training" an artificial neural network may denote creating a mathematical model that allows optimal decision-making by connecting neurons included in the artificial neural network while appropriately changing weights based on data.

The display device according to an embodiment of the disclosure may include a device which is connected to the server device 2000 and displays information received from the server device 2000. According to an embodiment of the disclosure, the display device 3000 may transmit and receive information to and from the server device 2000 through a specific application (e.g., a home appliance management application) installed in the display device 3000.

According to an embodiment of the disclosure, the display device 3000 may include a device connected to the same account information as the home appliance 1000. The display device 3000 may be directly connected to the home appliance 1000 through a short-range wireless communication channel, or may be indirectly connected to the home appliance 1000 through the server device 2000.

The display device 3000 according to an embodiment of the disclosure may be implemented in various forms. For example, the display device 3000 described in the disclosure may include a mobile terminal, a refrigerator including a display, a television (TV), a computer, etc., but is not limited thereto. In addition, the mobile terminal may include a smartphone, a laptop computer, a tablet personal computer (PC), a digital camera, an electronic book terminal, a terminal for digital broadcasting, a personal digital assistant (PDA), a portable multimedia player (PMP), a navigation, a moving picture experts group layer-3 audio (MP3) player, etc., but is not limited thereto. For example, the mobile terminal may include a wearable device that may be worn by a user. Hereinafter, for convenience of explanation, a case in which the display device 3000 is a smartphone is described as an example.

According to an embodiment of the disclosure, the display device 3000 or the home appliance 1000 may receive a voice signal that is an analog signal through a microphone, and convert a voice portion thereof into computer-readable text by using an ASR model. The display device 3000 or the home appliance 1000 may interpret the text by using an NLU model, so that an intention of the user's utterance may be obtained. Here, the ASR model or the NLU model may be an AI model. The AI model may be processed by an AI dedicated processor which is designed with a hardware structure specialized for processing AI models. The AI model may be created through training. Such training may be performed in a device itself (e.g., the display device 3000 or the home appliance 1000) on which AI according to the disclosure is performed, or may be performed through an additional server device 2000 and/or system. Examples of the learning algorithm may include supervised learning, unsupervised learning, semi-supervised learning, or reinforcement learning, without being limited thereto.

The AI model may include a plurality of neural network layers. Each of the plurality of neural network layers may have a plurality of weight values, and perform neural network operation through operation between an operation result of the previous layer and the plurality of weight values. The plurality of weight values owned by the plurality of neural network layers may be optimized by training results of the AI model. For example, the plurality of weight values may be updated to reduce or minimize a loss value or a cost value obtained by the AI model during a training procedure. An artificial neural network may include, for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), or a deep Q-network, without being limited thereto.

According to an embodiment of the disclosure, the display device 3000 may execute a specific application (e.g., a home appliance management application) provided from the server 2000, based on a user input. In this case, the user may identify a monitoring image of the interior space of the home appliance 1000 or a cooking process image through an execution screen of the application. An operation of identifying, by a user, a monitoring image or a cooking process image by using a specific application (e.g., a home appliance management application) provided from the server device 2000 is described in detail with reference to FIGS. 22 to 23.

Figure 22:
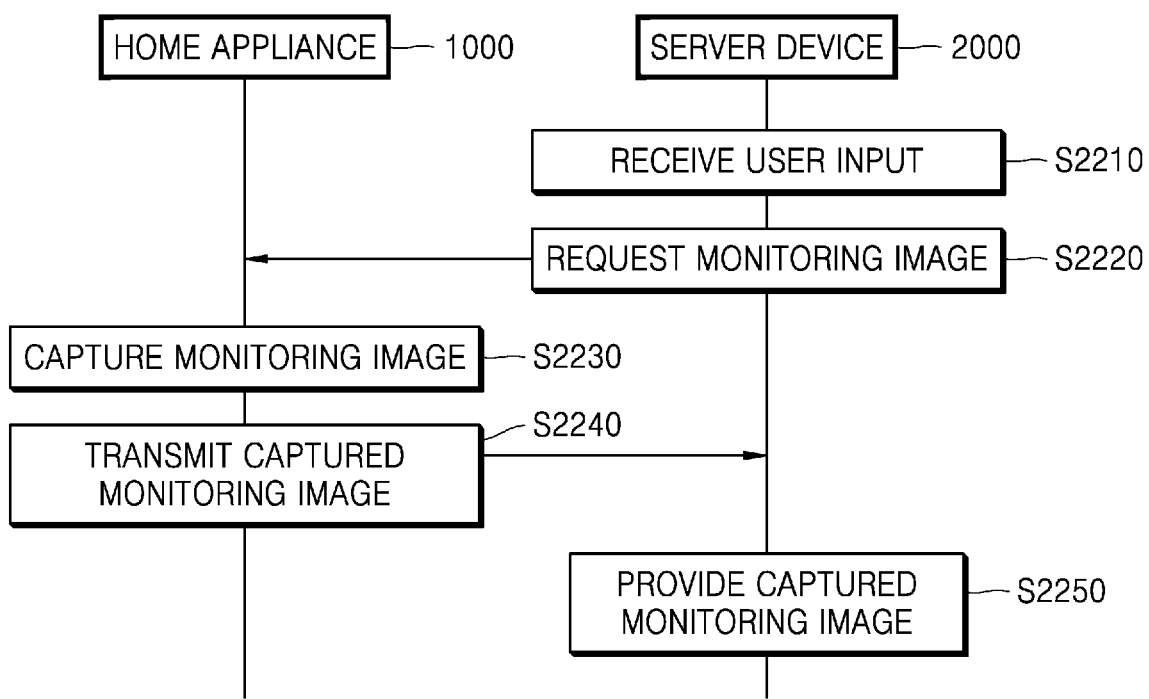
FIG. 22 is a diagram for describing an operation of providing a monitoring image to a server device by a home appliance, according to an embodiment of the disclosure.

FIG. 22 is a diagram for describing an operation of providing a monitoring image to a server device by a home appliance, according to an embodiment of the disclosure.

In operation S2210, the server device 2000 according to an embodiment of the disclosure may receive a user input through the display device 3000. The server device 2000 may receive the user input through an execution screen of a specific application installed in the display device 3000. Here, the user input may include an input for requesting a monitoring image (or live screen) of the interior space of the home appliance 1000, an input for executing an application that provides information about the home appliance 1000, etc., but is not limited thereto. The user input may include an input for requesting a cooking process image of the home appliance 1000. The cooking process image may denote a moving image including frames from the start of cooking to the present or frames from the start of cooking to the completion of cooking. The cooking process image may also include a time-lapse video.

In operation S2220, the server device 2000 according to an embodiment of the disclosure may request a monitoring image to the home appliance 1000 based on the user input.

According to an embodiment of the disclosure, when a user input for requesting a monitoring image of the home appliance 1000 is received through the display device 3000, the server device 2000 may transmit, to the home appliance 1000, a signal requesting a monitoring image of the interior space of the home appliance 1000. In addition, when a user input for requesting a cooking process image is received through the display device 3000, the server device 2000 may transmit a signal requesting a cooking process image to the home appliance 1000.

In operation S2230, the home appliance 1000 may capture a monitoring image obtained through the camera 1100. For example, the home appliance 1000 may capture a frame obtained by the camera 1100 at a time point at which a signal requesting a monitoring image is received, from among a plurality of frames obtained through the camera 1100.

According to an embodiment of the disclosure, when the signal requesting the cooking process image is received, the home appliance 1000 may connect frames stored (or captured) at a certain time interval to each other and produce the cooking process image as a time-lapse video.

In operation S2240, the home appliance 1000 may transmit the captured monitoring image to the server device 2000. According to an embodiment of the disclosure, the home appliance 1000 may transmit, to the server device 2000, the cooking process image produced as a time-lapse video.

In operation S2250, the server device 2000 may provide the captured monitoring image through the display device 3000. For example, the server device 2000 may display the monitoring image as a live screen on an execution screen of an application installed in the display device 3000.

According to an embodiment of the disclosure, the server device 2000 may provide, to a user, the cooking process image produced as a time-lapse video through the execution screen of the application installed in the display device 3000.

In FIG. 22, the home appliance 1000 captures a monitoring image at a time point when a signal for requesting a monitoring image is received, and transmits the captured image to the server device 2000. However, the disclosure is not limited thereto. Even when such a request is not received from the server 2000, the home appliance 1000 may capture a monitoring image at a certain cycle and transmit the captured image to the server device 2000.

According to an embodiment of the disclosure, a user may identify a monitoring image of the home appliance 1000 through an execution screen of an application installed in the display device 3000, thereby identifying, in real time, an image of an interior space of the home appliance 1000 or a state of contents placed on the tray 1001.

Figure 23:
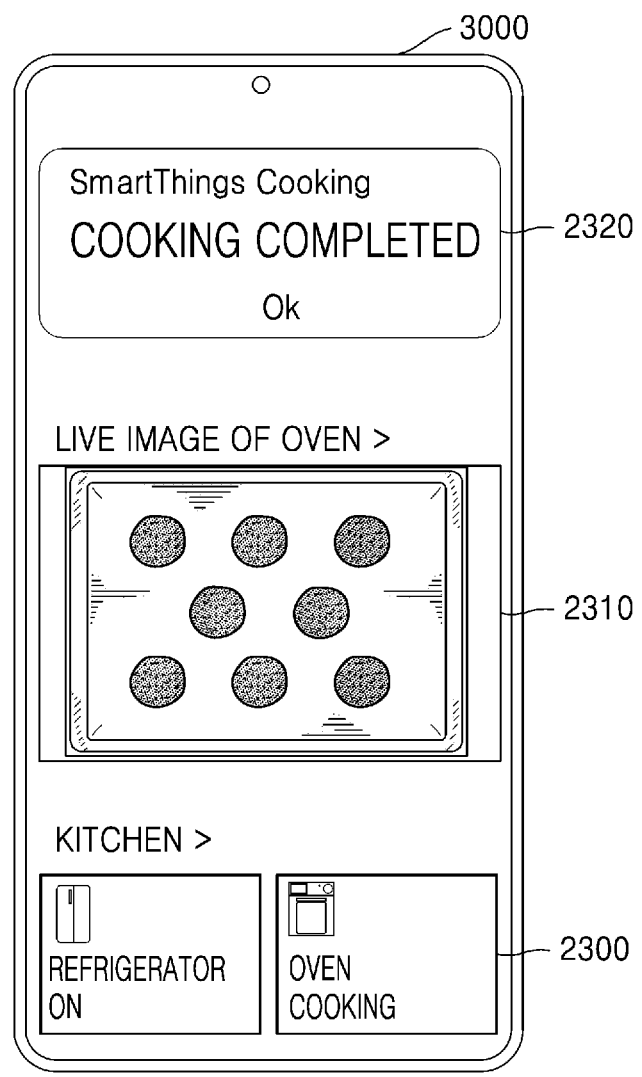
FIG. 23 is a diagram for describing an operation of providing a monitoring image of a home appliance by a server device through a display device, according to an embodiment of the disclosure.

FIG. 23 is a diagram for describing an operation of providing, by a server device, a monitoring image of a home appliance through a display device, according to an embodiment of the disclosure. In FIG. 23, a case in which the home appliance 1000 is an oven is described as an example.

Referring to FIG. 23, the display device 3000 may be connected to the home appliance 1000 through the server device 2000. When a user executes the application on the display device 3000, the display device 3000 may receive information from the server device 2000 and display a list of home appliances 2300 on an execution screen of the application. For example, the display device 3000 may display a list of icons indicating an induction, an oven, etc., on the execution screen of the application.

According to an embodiment of the disclosure, when the user executes the application on the display device 3000, the server device 2000 may request a monitoring image to the home appliance 1000. In this case, the home appliance 1000 may transmit a monitoring image obtained through the camera 1100 to the server device 2000. The monitoring image may include an image which is obtained by applying a setting value (e.g., a lighting brightness value, a size of a crop area, and a distortion correction value) determined according to a height at which the tray 1001 is inserted. In addition, the monitoring image may include a real-time image obtained at a time point when the request is received from the server device 2000.

The server device 2000 may provide a real-time monitoring image 2310 of the home appliance 1000 through the application execution screen displayed on the display device 3000. The user may easily identify a state of food placed on the tray 1001 through the real-time monitoring image 2310, even without looking directly into the interior space of the home appliance 1000.

According to an embodiment of the disclosure, when the cooking operation in the home appliance 1000 is completed, the home appliance 1000 may transmit a notification of the completion of the cooking operation to the server device 2000. In this case, the server device 2000 may output a notification message 2320 indicating that the cooking operation is completed, through the application installed on the display device 3000. The display device 3000 may output the notification message 2320 on the execution screen of the application, when the application is being executed, and display the notification message 2330 on the home screen of the display device 3000, when the application is not being executed.

Figure 24:
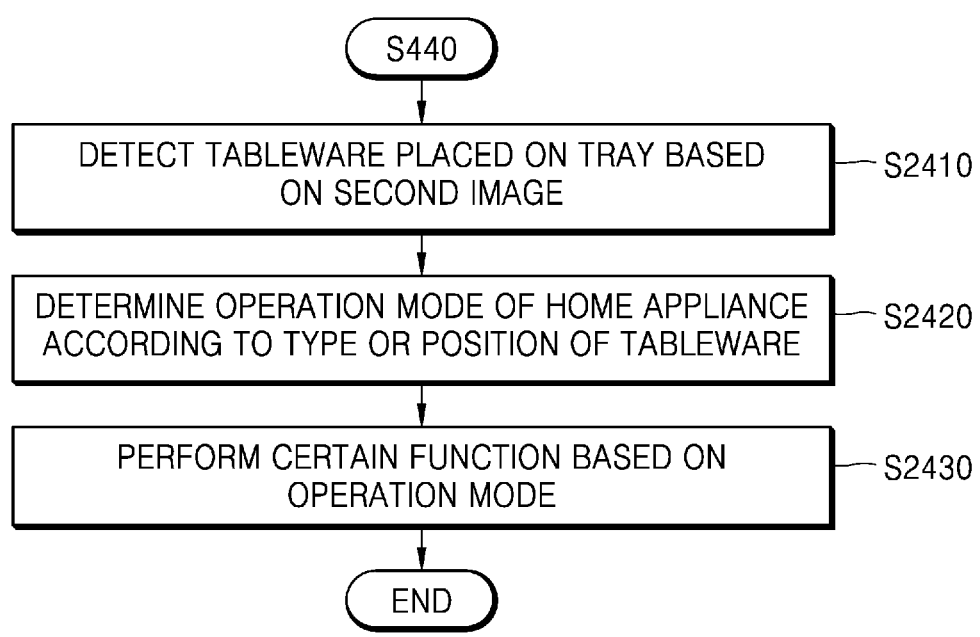
FIG. 24 is a diagram for describing a method of determining, by a home appliance, an operation mode thereof according to a type or position of tableware placed on a tray, according to an embodiment of the disclosure.

FIG. 24 is a flowchart of a method of determining, by a home appliance, an operation mode according to a type or position of tableware placed on a tray, according to an embodiment of the disclosure. In FIG. 24, a case in which the home appliance 1000 is a dishwasher is described as an example.

According to an embodiment of the disclosure, through operations S410 to S440 in FIG. 4 described above, the home appliance 1000 may obtain the second image including the contents placed on the tray 1001 based on the setting value determined according to the height at which the tray 1001 is inserted.

In operation S2410, the home appliance 1000 according to an embodiment of the disclosure may detect the tableware placed on the tray 1001 based on the second image. In this case, the tray 1001, on which tableware is to be placed, may be provided in plurality in the home appliance 1000. The tableware may include a pot, a frying pan, a plate, a cup, a bowl, a spoon, chopsticks, a ladle, a spatula, etc., but is not limited thereto.

The second image may include an image to which the setting value related to capturing of an image of the interior space is applied, the setting value being determined according to the height of the tray 1001 on which the tableware is placed. For example, the second image may include an image which is obtained after the brightness of the lamp 1700 is adjusted according to the height of the tray 1001. The second image may include an image which is post-processed based on the size of the crop area or distortion correction value determined according to the height of the tray 1001.

According to an embodiment of the disclosure, the home appliance 1000 may recognize the tableware placed on the tray 1001 by comparing the second image with a pre-stored tableware image list, or may recognize the tableware by using an AI model for object recognition. In this case, when the second image of a similar state to a state of a training image of the AI model is obtained, the tableware recognition rate of the home appliance 1000 may be improved.

For example, when the brightness of the lamp 1700 is constant regardless of the height of the tray 1001, a tableware placed on the tray 1001 of the height of the fourth level is recognized to be too bright, and a tableware placed on the tray 1001 of the height of the first level is recognized to be too dark, and thus, even the same tableware may be recognized as different tableware according to the height of the tray 1001. In addition, when distortion varies depending on the height of the tray 1001, even the same tableware may be recognized as different tableware according to the height of the tray 1001. However, according to an embodiment of the disclosure, when the height of the tray 1001 is changed, the home appliance 1000 may adjust a setting value related to capturing of an image and obtain a second image of a uniform state (e.g., uniform brightness, uniform size, and uniform shape). In this case, a state of the second image may be similar to a state of a training image provided as training data for an AI model. For example, a size, distortion degree, and brightness of tableware included in the second image may be similar to a size, distortion degree, and brightness of tableware included in the training image for the AI model. Accordingly, the home appliance 1000 may well recognize a type of tableware placed on the tray 1001, regardless of the height of the tray 1001.

According to an embodiment of the disclosure, the home appliance 1000 may also recognize a position at which the tableware is placed. For example, the home appliance 1000 may analyze the second image and identify whether the tableware is placed on the first tray of the first level or the second tray of the second level. In addition, the home appliance 1000 may also identify whether the tableware is placed in a partial area of the tray or an entire area of the tray.

In operation S2420, the home appliance 1000 according to an embodiment of the disclosure may determine an operation mode thereof according to a type or a position of the tableware.

According to an embodiment of the disclosure, the home appliance 1000 may determine a customized washing mode corresponding to the type of the tableware. For example, the home appliance 1000 may, when the type of the tableware placed on the tray 1001 is a plate, determine the operation mode thereof as a plate washing mode, and when the type of the tableware placed on the tray 1001 is a pot, determine the operation mode thereof as a pot washing mode.

According to an embodiment of the disclosure, the home appliance 1000 may be operated in a specific area intensive washing mode according to the position of the tableware. For example, the home appliance 1000 may, when the tableware is placed on a first tray of the height of the first level, determine the operation mode thereof as a first tray intensive washing mode, and when the tableware is placed on a second tray of the height of the second level, determine the operation mode thereof as a second tray intensive washing mode.

In operation S2430, the home appliance 1000 according to an embodiment of the disclosure may perform a certain function based on the operation mode.

According to an embodiment of the disclosure, the home appliance may perform a tableware washing function according to a washing mode customized for the type of the tableware. For example, when the operation mode is determined as a plate washing mode, the home appliance 1000 may wash the plate placed on the tray 1001 according to the plate washing mode. In addition, when the operation mode is determined as a pot washing mode, the home appliance 1000 may wash the pot placed on the tray 1001 according to the pot washing mode.

According to an embodiment of the disclosure, the home appliance 1000 may perform a tableware washing operation in an intensive washing mode for a specific area according to the position of the tableware. For example, the home appliance 1000 may, when the operation mode is determined as an intensive washing mode for a first tray, intensively spray detergent, water, and wind to the first tray, and when the operation mode is determined as an intensive washing mode for a second tray, intensively spray detergent, water, and wind to the second tray.

Accordingly, according to an embodiment of the disclosure, the home appliance 1000 may be improved as to tableware washing function and energy efficiency by operating in accordance with the type or the position of the tableware.

FIG. 25 is a diagram for describing an operation of determining, by a home appliance, an operation mode according to a type or a position of tableware placed on a tray, according to an embodiment of the disclosure. In FIG. 25, a case in which the home appliance 1000 is a dishwasher 2500 is described as an example.

According to an embodiment, the dishwasher 2500 may analyze a monitoring image obtained through the camera 1100 and identify tableware and a position of the tray 1001 on which the tableware is placed.

Referring to 2510 of FIG. 25, the dishwasher 2500 may analyze a monitoring image obtained through the camera 1100 and identify that tableware are placed on each of a first tray 2501, a second tray 2502, and a third tray 2503. Because tableware are placed on all of the first tray 2501, the second tray 2502, and the third tray 2503 and there are various types of tableware, the home appliance 1000 may determine the operation mode thereof as a standard mode for an entire area.

Referring to 2520 of FIG. 25, the dishwasher 2500 may analyze a monitoring image obtained through the camera 1100 and identify that tableware are placed only on the first tray 2501. In this case, the dishwasher 2500 may determine the operation mode thereof as an intensive washing mode for the first tray 2501, and intensively spray detergent, water, and wind to the first tray 2501. In addition, because the tableware placed on the first tray 2501 are all pots, the home appliance 1000 may also be operated in a pot washing mode.

Figure 26:
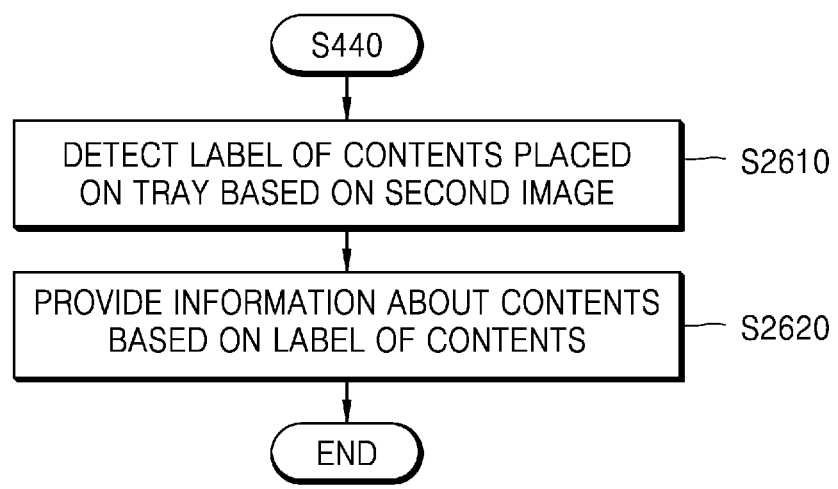
FIG. 26 is a flowchart of a method of providing, by a home appliance, information about contents placed on a tray, according to an embodiment of the disclosure.

FIG. 26 is a flowchart of a method of providing, by a home appliance, information about contents placed on a tray, according to an embodiment of the disclosure. In FIG. 26, a case in which the home appliance 1000 is a small refrigerator is described as an example.

According to an embodiment of the disclosure, through operations S410 to S440 in FIG. 4 described above, the home appliance 1000 may obtain the second image including the contents placed on the tray 1001 based on the setting value determined according to the height at which the tray 1001 is inserted.

In operation S2610, according to an embodiment of the disclosure, the home appliance 1000 may detect a label of the contents placed on the tray 1001, based on the second image. The contents may include wine, beverages, cosmetics, health functional foods, etc., but are not limited thereto.

The second image may include an image to which the setting value related to capturing of an image of an interior space is applied, the setting value being determined according to the height of the tray 1001 on which the contents are placed. For example, the second image may include an image which is obtained after the brightness of the lamp 1700 is adjusted according to the height of the tray 1001. The second image may include an image which is post-processed based on the size of the crop area or the distortion correction value determined according to the height of the tray 1001.

According to an embodiment of the disclosure, the home appliance 1000 may recognize the contents placed on the tray 1001 by comparing the second image with a prestored object list or by using an AI model for object recognition. In this case, the second image of a similar state to a state of a training image for the AI model is obtained, the object recognition rate of the home appliance 1000 may be improved.

For example, when the brightness of the lamp 1700 is constant regardless of the height of the tray 1001, a bottle of wine placed on the tray 1001 of the height of the fourth level is recognized to be too bright, and a bottle of wine placed on the tray of the height of the first level is recognized to be dark, and thus, even for the same wine bottle, it may be difficult to recognize the label thereof, according to the height of the tray 1001. In addition, when a distortion varies depending on the height of the tray 1001, it may be difficult to recognize the label according to the height of the tray 1001, even for the same wine bottle. According to an embodiment of the disclosure, when the height of the tray 1001 is changed, the home appliance may adjust the setting value related to capturing of an image and obtain the second image of a uniform state (e.g., uniform brightness, uniform size, and uniform shape). In this case, a state of the second image may be similar to a state of the training data provided as training data for an AI model. For example, a size, distortion degree, and brightness of contents (e.g., a wine bottle) included in the second image may be similar to a size, distortion degree, and brightness of contents (e.g., a wine bottle) included in the training data for the AI model. Accordingly, the home appliance 1000 may well recognize a label of the contents placed on the tray 1001, regardless of the height of the tray 1001.

According to an embodiment of the disclosure, the label of the contents may include, as non-limiting examples, text or images indicating a trademark, product name, classification number, handling precautions, product size, price, and the like. The label of the contents may also include a barcode, a two-dimensional code (e.g., a quick response (QR) code), color code, or the like.

In operation S2620, the home appliance 1000 according to an embodiment of the disclosure may provide information about the contents based on the label of the contents.

According to an embodiment of the disclosure, the home appliance 1000 may provide the information about the contents through the user interface 1600. In addition, the home appliance 1000 may provide the information about the contents through the display device 3000 (e.g., a mobile terminal) connected to the server device 2000.

The information about the contents may vary according to a type of the contents. For example, when the contents is a bottle of wine, the information about the contents may include a variety, country of origin, alcoholicity, amount, price, or the like, and when the contents is cosmetics, the information about the contents may include a product name, handling precautions, product size, ingredients, price, or the like. However, the disclosure is not limited thereto.

Figure 27:
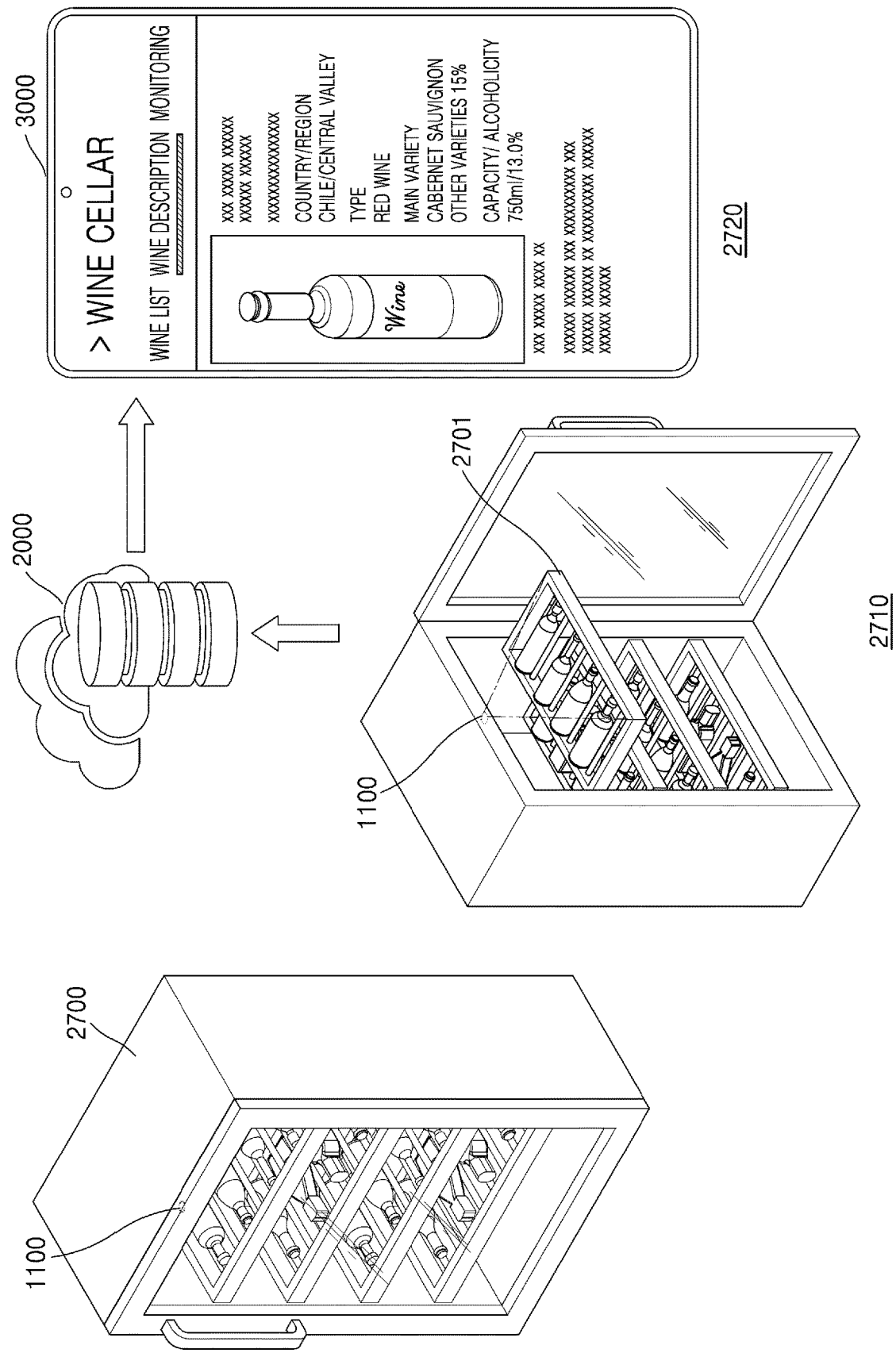
FIG. 27 is a diagram for describing an operation of providing, by a home appliance, information about contents placed on a tray, according to an embodiment of the disclosure.

FIG. 27 is a diagram for describing an operation of providing, by a home appliance, information about contents placed on a tray, according to an embodiment of the disclosure. In FIG. 27, a case in which the home appliance 1000 is as wine refrigerator 2700.

Referring to FIG. 27, the wine refrigerator 2700 may include a camera 1100 on the ceiling of the wine refrigerator 2700. In this case, the camera 1100 may be provided on the door side of the wine refrigerator 1700 so as to capture an image of the tray 1001 taken out from the interior space of the wine refrigerator 1700. According to an embodiment of the disclosure, the wine refrigerator 2700 may recognize that the tray 1001 is taken out, by using at least one sensor attached to the tray 1001. For example, the wine refrigerator 2700 may recognize that the tray 1001 is taken out, by using an infrared sensor, motion sensor, acceleration sensor, illumination sensor, or temperature sensor attached to the tray 1001.

Referring to 2710 of FIG. 27, when a user opens the door of the wine refrigerator 2700 and takes out a first tray 2701, the home appliance 1000 may obtain a monitoring image of the first tray 2701 through the camera 1100. In this case, the monitoring image of the first tray 2701 may include an image to which a setting value related to capturing of an image is applied, the setting value being determined based on a height of the first tray 2701. For example, because the first tray 2701 is positioned at the top from among the trays, the home appliance may adjust the brightness of the lamp 1700 to be relatively low and then, obtain the monitoring image of the first tray 2701. In addition, because the first tray 2701 is positioned at the top from among the trays, the home appliance 1000 may apply relatively large crop area size and distortion correction values and obtain the monitoring image of the first tray 2701.

The home appliance 1000 may recognize a label of at least one bottle of wine placed on the first tray 2701 from the monitoring image of the first tray 2701. In addition, the home appliance 1000 may transmit, to the server device 2000, a result of recognizing the label of the at least one bottle of wine. The result of recognizing the label of the at least one bottle of wine may include information about the wine, such as a type of wine, country of origin, variety, alcoholicity, capacity, and the like. The server device 2000 may provide, to the user, the result of recognizing the label of the at least one bottle of wine (e.g., the information about the wine) through an execution screen of an application installed in the display device 3000.

Referring to 2720 of FIG. 27, when the user executes the application installed on the display device 3000, the display device 3000 may display, on the execution screen of the application, information about the at least one wine (e.g., a country of origin, a type, a main variety, a capacity, an alcohol content, etc.) stored in the wine refrigerator 2700.

According to an embodiment of the disclosure, the display device 3000 may also provide a list of wine stored in the wine refrigerator 2700. For example, the display device 3000 may provide an entire wine list stored in the wine refrigerator 2700, or may provide a wine list for each tray. When the user selects one wine from the wine list, the display device 3000 may display detailed information of the selected wine on the execution screen of the application. Accordingly, according to an embodiment of the disclosure, the user may easily identify wine stored in the wine refrigerator 2700 without retrieving information about the wine.

Figure 28:
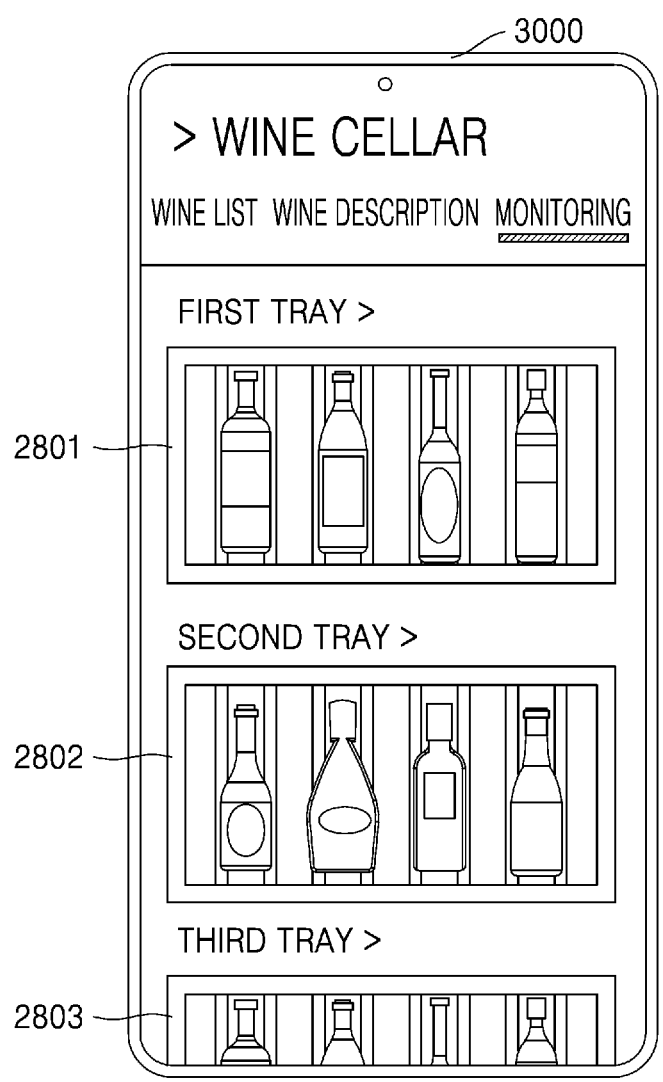
FIG. 28 is a diagram for describing an operation of providing, by a home appliance, a monitoring image for each tray through a display device, according to an embodiment of the disclosure.

FIG. 28 is a diagram for describing an operation of providing a monitoring image for each tray, by a home appliance through a display device. In FIG. 28, a case in which the home appliance 1000 is the wine refrigerator 2700 is described as an example.

According to an embodiment of the disclosure, the wine refrigerator 2700 may obtain a monitoring image of the tray 1001 every time the user opens the door of the wine refrigerator 2700 and takes out the tray 1001. For example, the wine refrigerator 2700 may, when the user takes out a first tray, obtain a first monitoring image 2801 of the first tray through the camera 1100, when the user takes out a second tray, obtain a second monitoring image 2802 of the second tray through the camera 1100, and when the user takes out a third tray, obtain a third monitoring image 2803 of the third tray through the camera 1100.

In this case, the first monitoring image 2801 may include an image to which a first setting value related to capturing of an image determined based on a height of the first tray is applied, the second monitoring image 2802 may include an image to which a second setting value related to capturing of an image determined based on a height of the second tray is applied, and the third monitoring image 2803 may include an image to which a third setting value related to capturing of an image determined based on a height of the third tray is applied. For example, the home appliance 1000 may, when the first tray is positioned at the top from among the trays, adjust the brightness of the lamp 1700 to be relatively low and then obtain the first monitoring image 2801 of the first tray, and when the third tray is positioned at the bottom from among the trays, adjust the brightness of the lamp 1700 to be relatively high and then obtain the third monitoring image 2803 of the third tray. In addition, the home appliance 1000 may, when the first tray is positioned at the top from among the trays, apply relatively high crop area size and distortion correction values and obtain the first monitoring image 2801 of the first tray, and when the third tray is positioned at the bottom from among the trays, apply relatively low crop area size and distortion correction values and obtain the third monitoring image 2803 of the third tray. Accordingly, wines included in each of the first monitoring image 2801 of the first tray, the second monitoring image 2802 of the second tray, and the third monitoring image 2803 of the third tray may maintain a uniform state (e.g., uniform brightness, uniform size, and uniform shape).

According to an embodiment of the disclosure, the home appliance 1000 may transmit, to the server device 200, the first monitoring image 2801 of the first tray, the second monitoring image 2802 of the second tray, and the third monitoring image 2803 of the third tray, and the server device 2000 may provide, to the user through the display device 3000, the first monitoring image 2801 of the first tray, the second monitoring image 2802 of the second tray, and the third monitoring image 2803 of the third tray.

For example, when the user executes an application installed in the display device 3000, the display device 3000 may display, on an execution screen of the application, the first monitoring image 2801 of the first tray, the second monitoring image 2802 of the second tray, and the third monitoring image 2803 of the third tray. Accordingly, even without looking directly into the interior space of the wine refrigerator 2700, the user may easily identify types and numbers of a wine placed on the first tray, the second tray, and the third tray through the first monitoring image 2801, the second monitoring image 2802, and the third monitoring image 2803 provided on the display device 3000.

The method according to an embodiment of the disclosure may be implemented in the form of program commands that may be performed through various computer means, and recorded on a computer-readable medium. The computer-readable medium may include a program command, a data file, and a data structure alone or in combination. The program commands recorded on the medium may be those specially designed and configured for the disclosure, or may be those well known to those skilled in the field of computer software. Examples of the computer-readable recording medium include a magnetic medium such as a hard disk, a floppy disk, or a magnetic tape, an optical medium such as a CD-ROM or a DVD, a magneto-optical medium such as a floptical disk, and a hardware device specially configured to store and execute program commands such as a ROM, a RAM, or a flash memory. Examples of the program commands include advanced language codes that may be executed by a computer by using an interpreter or the like as well as machine language codes made by a compiler.

Some embodiments of the disclosure may also be implemented in the form of a recording medium that includes instructions that are executable by a computer, such as a program module executed by a computer. A computer-readable medium may be an arbitrary available medium accessible by a computer, and includes all volatile and non-volatile media and separable and non-separable media. In addition, the computer-readable medium may include both a computer storage medium and a communication medium. Examples of the computer storage medium include all volatile and non-volatile media and separable and non-separable media, which have been implemented by an arbitrary method or technology, for storing information such as computer-readable instructions, data structures, program modules, and other data. Examples of the communication medium typically include computer-readable instructions, data structures, program modules, or other data in a modulated data signal, such as a carrier wave, or other transport mechanism, and include any information delivery medium. In addition, some embodiments of the disclosure may also be implemented as a computer program or computer program product which include instructions that is executable by a computer, such as a computer program executed by a computer.

A machine-readable storage medium may be provided in a form of a non-transitory storage medium. The term 'non-transitory storage medium' may mean a tangible device without including a signal, e.g., electromagnetic waves, and may not distinguish between storing data in the storage medium semi-permanently and temporarily. For example, the non-transitory storage medium may include a buffer that temporarily stores data.

In an embodiment of the disclosure, the aforementioned method according to the various embodiments of the disclosure may be provided in a computer program product. The computer program product may be a commercial product that may be traded between a seller and a buyer. The computer program product may be distributed in the form of a device-readable storage medium (e.g., compact disc read only memory (CD-ROM), or may be directly distributed (e.g., downloaded or uploaded) online through an application store or between two user devices (e.g., smartphones). In the case of online distribution, at least part of the computer program product (e.g., a downloadable app) may be at least temporarily stored or arbitrarily created in a storage medium that may be readable to a device such as a server of the manufacturer, a server of the application store, or a relay server.

What is claimed is:

1. A home appliance comprising:
an interior space;
a camera arranged in the interior space;
a plurality of shelves respectively arranged at different heights in the interior space, the plurality of shelves configured to receive a tray at any of the different heights;
a memory storing setting values related to capturing an image at a height corresponding to each shelf of the plurality of shelves, the setting values being configured so that items in an image captured at any of the different heights have a same size, brightness, or shape; and
at least one processor configured to:
obtain, through the camera, a first image including the tray while the tray is received in the interior space;
identify, by using the first image, a height among the different heights at which the tray is received in the interior space;
determine, according to the identified height at which the tray is received, a setting value related to capturing an image at the identified height among the stored setting values; and
based on the determined setting value, obtain a second image, different from the first image, including one or more items on the tray.

2. The home appliance of claim 1, further comprising:
shelves at the different heights in the interior space into which the tray is receivable,
markers at positions respectively corresponding to the shelves, and
wherein the at least one processor is further configured to identify the height among the different heights at which the tray is received based on a number of markers included in the first image.

3. The home appliance of claim 1, wherein the at least one processor is further configured to:
recognize an edge portion of the tray by performing edge detection on the first image;
determine an area of the tray based on the edge portion of the tray; and
identify the height among the different heights at which the tray is received by comparing the area of the tray with information of a prestored area table.

4. The home appliance of claim 1, wherein the at least one processor is further configured to:
recognize, in the first image, at least two markers included in the tray and positioned at intervals;
determine an interval between the at least two markers; and
identify the height among the different heights at which the tray is received by comparing the interval between the at least two markers with a prestored interval table.

5. The home appliance of claim 1, wherein the at least one processor is further configured to:
obtain, from a depth sensor arranged on a ceiling of the interior space, information about an interval between the ceiling and the tray; and
identify the height among the different heights at which the tray is received by further using information about the interval between the ceiling and the tray.

6. The home appliance of claim 2, wherein the at least one processor is further configured to identify the height among the different heights at which the tray is received by further using weight information obtained from a weight detection sensor included in the shelves at the different heights into which the tray is receivable.

7. The home appliance of claim 2, wherein the at least one processor is further configured to identify the height among the different heights at which the tray is received by further using infrared sensor information obtained from an infrared sensor included in the shelves at the different heights into which the tray is receivable.

8. The home appliance of claim 1, wherein the determined setting value comprises at least one of a lighting brightness value of the interior space, a size of a crop area, or a distortion correction value of the camera.

9. The home appliance of claim 1, wherein the at least one processor is further configured to:
determine a lighting brightness value of the interior space according to the identified height among the different heights at which the tray is received; and
control the camera to obtain the second image after adjusting a brightness of a lamp arranged in the interior space according to the determined lighting brightness value.

10. The home appliance of claim 1, wherein the at least one processor is further configured to:
determine a size of a crop area according to the identified height among the different heights at which the tray is received; and
obtain the second image by cropping a portion of a peripheral area of the first image based on the determined size of the crop area.

11. The home appliance of claim 1, wherein the at least one processor is further configured to:
determine a distortion correction value of the camera according to the identified height among the different heights at which the tray is received; and
obtain the second image by applying the determined distortion correction value to the first image.

12. The home appliance of claim 1, further comprising a user interface configured to output the second image.

13. The home appliance of claim 12, wherein the at least one processor is further configured to:
recognize, from the second image, a food ingredient placed on the tray; and
provide recipe information for the food ingredient through the user interface.

14. The home appliance of claim 13, wherein the at least one processor is further configured to:
determine an adjustment value of a cooking temperature included in the recipe information according to the identified height among the different heights at which the tray is received; and
provide the determined adjustment value of the cooking temperature through the user interface.

15. A method of obtaining an image of an interior space of a home appliance including a camera arranged in the interior space, a plurality of shelves respectively arranged at different heights in the interior space, the plurality of shelves being configured to receive a tray at any of the different heights, and a memory storing setting values related to capturing an image at a height corresponding to each shelf of the plurality of shelves, the setting values being configured so that items in an image captured at any of the different heights have a same size, brightness, or shape, the method comprising:
obtaining, through the camera, a first image including the tray while the tray is received in the interior space;
identifying, by using the first image, a height among the different heights at which the tray is received in the interior space;

determining, according to the identified height at which the tray is received, a setting value related to capturing-Of-a-second an image at the identified height among the stored setting values; and based on the determined setting value, obtain a second image, different from the first image, including one or more items on the tray.

16. The method of claim 15, wherein the home appliance comprises shelves of different heights into which the tray is receivable, and markers at positions respectively corresponding to the shelves, and the identifying of the height at which the tray is received comprises identifying the height among the different heights at which the tray is received based on a number of markers included in the first image.

17. The method of claim 15, wherein the identifying of the height among the different heights at which the tray is received comprises:

recognizing an edge portion of the tray by performing edge detection on the first image;

determining an area of the tray based on the edge portion of the tray; and identifying the height among the different heights at which the tray is received by comparing the area of the tray with information of a prestored area table.

18. The method of claim 15, wherein the identifying of the height among the different heights at which the tray is received comprises:

recognizing, in the first image, at least two markers included in the tray and positioned at intervals;

determining an interval between the at least two markers; and identifying the height among the different heights at which the tray is received by comparing the interval between the at least two markers with a prestored interval table.

19. The method of claim 15, wherein the determining of the setting value related to capturing of the image of the interior space comprises determining at least one of a lighting brightness value of the interior space, a size of a crop area, or a distortion correction value of the camera according to the identified height among the different heights at which the tray is received.

20. The method of claim 15, further comprising:

outputting the second image through a user interface;

recognizing, from the second image, a food ingredient placed on the tray;

providing recipe information appropriate for the food ingredient through the user interface;

determining an adjustment value of a cooking temperature included in the recipe information according to the identified height among the different heights at which the tray is received; and providing the determined adjustment value of the cooking temperature together with the recipe information through the user interface.

* * * * *